(12) United States Patent
Matsuno

(10) Patent No.: US 8,390,862 B2
(45) Date of Patent: Mar. 5, 2013

(54) SCAN SOLUTION SYSTEM

(75) Inventor: Yoichiro Matsuno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/094,442

(22) Filed: Apr. 26, 2011

(65) Prior Publication Data

US 2011/0199651 A1 Aug. 18, 2011

Related U.S. Application Data

(62) Division of application No. 11/558,685, filed on Nov. 10, 2006, now Pat. No. 7,957,023.

(30) Foreign Application Priority Data

| Nov. 17, 2005 | (JP) | 2005-333386 |
| Nov. 17, 2005 | (JP) | 2005-333387 |
| Nov. 22, 2005 | (JP) | 2005-336870 |
| Nov. 2, 2006 | (JP) | 2006-299651 |
| Nov. 2, 2006 | (JP) | 2006-299652 |
| Nov. 2, 2006 | (JP) | 2006-299653 |

(51) Int. Cl.
*H04N 1/40* (2006.01)
(52) U.S. Cl. ..................... 358/1.15; 358/1.18
(58) Field of Classification Search ........... 358/3.28, 358/1.9, 2.1, 468, 1.15, 1.18
See application file for complete search history.

(56) References Cited

U.S. PATENT DOCUMENTS

| 5,075,787 A | 12/1991 | Shaughnessy et al. |
| 5,126,858 A | 6/1992 | Kurogane et al. |
| 5,444,779 A * | 8/1995 | Daniele ........................ 399/366 |
| 2003/0229705 A1 | 12/2003 | Yohichiroh |
| 2004/0138910 A1 | 7/2004 | Matsuno et al. |
| 2004/0199778 A1 | 10/2004 | Wernet et al. |
| 2004/0260709 A1 | 12/2004 | Matsuno et al. |
| 2005/0128510 A1 | 6/2005 | Campbell |
| 2005/0162699 A1 | 7/2005 | Fukunaga et al. |
| 2005/0198025 A1 | 9/2005 | Matsuno |
| 2005/0219616 A1 | 10/2005 | Furuta et al. |

FOREIGN PATENT DOCUMENTS

| EP | 1 447 767 A2 | 8/2004 |
| EP | 1 583 348 A1 | 10/2005 |
| GB | 2 355 358 A | 4/2001 |
| GB | 2 371 385 A | 7/2002 |
| JP | 2001-229341 | 8/2001 |
| JP | 2005-50017 | 2/2005 |

(Continued)

OTHER PUBLICATIONS

Office Action issued May 17, 2011 in Japan Application No. 2006-299653.

Yoshiaki Terada, et al., "Interstage FormCoordinator, a New Web-based System Building Tool for XML", PFU Technical Review, Nov. 2001, vol. 12, No. 2, pp. 50-55 (With English Abstract).

Office Action issued Jun. 14, 2011, in Japan Patent Application No. 2006-299652.

(Continued)

*Primary Examiner* — Thomas D Lee
*Assistant Examiner* — Stephen M Brinich
(74) *Attorney, Agent, or Firm* — Oblon, Spivak, McClelland, Maier & Neustadt, L.L.P.

(57) ABSTRACT

A document data producing part produces document data in which first meta data is embedded based on a document template and a data source; a printing part prints the document data in a paper document; a scanning part obtains a scanned image from scanning the paper document after predetermined processing is carried out thereon after the printing, and obtains various sorts of information provided at the time of the scanning as second meta data; and a processing part carries out predetermined processing according to the paper document with reference to the document template, based on the first meta data obtained decoded from the scanned image and the second meta data obtained at the time of scanning.

14 Claims, 68 Drawing Sheets

FOREIGN PATENT DOCUMENTS

| | | |
|---|---|---|
| JP | 2005-122682 | 5/2005 |
| JP | 2005-262754 | 9/2005 |
| JP | 2005-285106 | 10/2005 |
| JP | 2007-26110 | 2/2007 |
| WO | WO 02/23884 A2 | 3/2002 |
| WO | WO 02/23884 A3 | 3/2002 |

OTHER PUBLICATIONS

European Office Action issued Apr. 19, 2012, in Patent Application No. 06 255 905.9.

"Adobe Photoshop 6.0, User Guide", Adobe Systems Incorporated, Oct. 31, 2000, XP 002638296, 188 pages.

\* cited by examiner

FIG.10

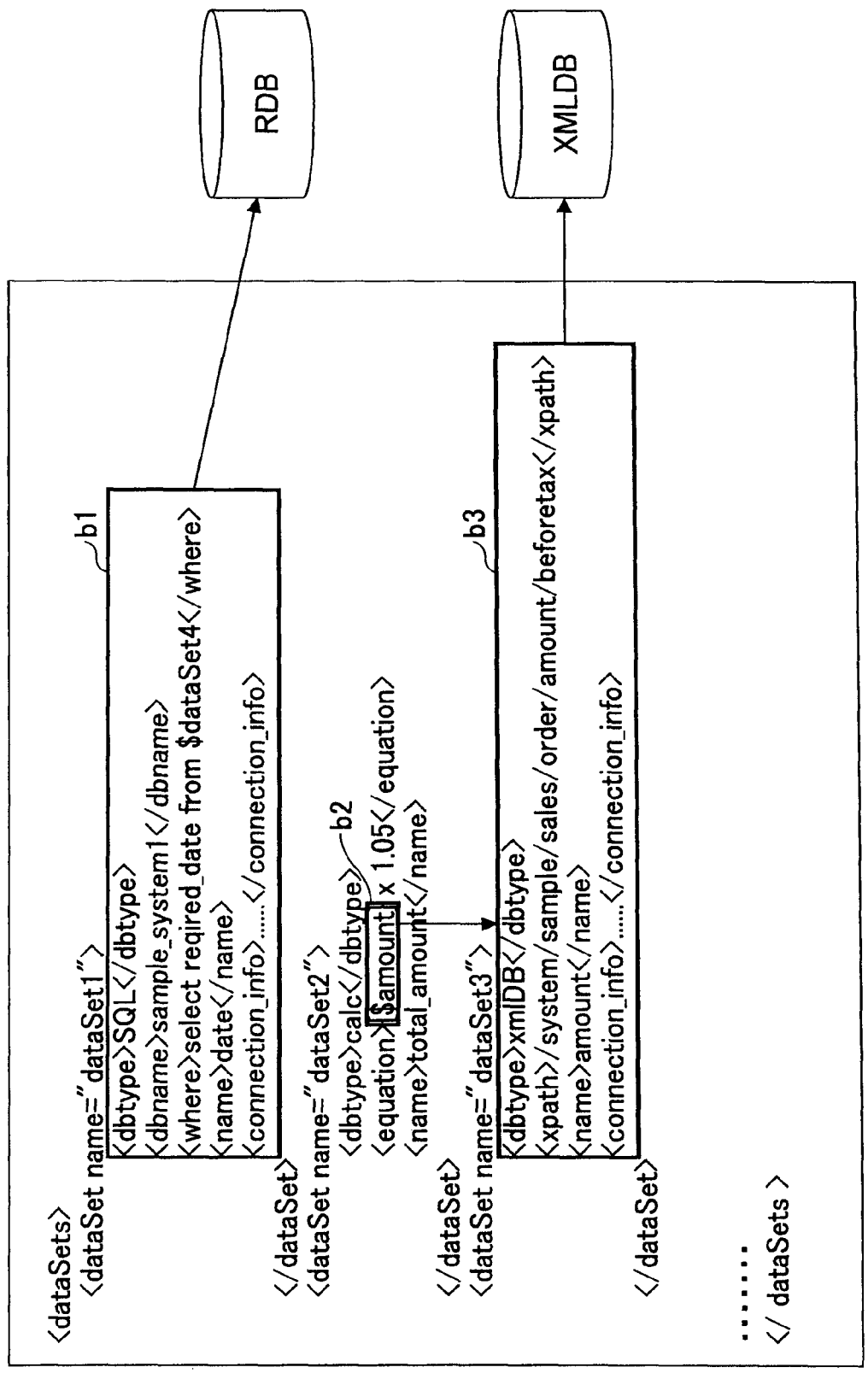

FIG.12

```
<embed>
    <data>
              <encodeType>QRcode</ encodeType >        } c1
              <localtion>
                       <left>890</left>
                       <top>44</top>                   } c2
                       <right>961</right>
                       <bottom>61</bottom>
              </ localtion >
              <embedtype>reference</ embedtype >
              <referenceType>id</referenceType>
              <referencedb>datamanage1</referencedb>   } c3
              <idformat>urn:[$autogenerated-guid]</idformat>
              <datatype>text<datatype>
              <source>dynamic</source>
              <value>                                    c4
                     <![CDATA[
                          <document>
                                <agent>
                                        <type>javaPlugin</type>
                                        <param>jp.co.ricoh.rdh.bpel.bpelBootStrap</param>
                                </agent>
                                <process id="uuid919193>
                                        < senddate >$date</ senddate >
                                        < total_ammount >$total_ammount</ total_ammount >
                                </process>                                    c41
                          </document>
                     ]]>
              </value>
    </data>
    <data>
              <encodeType>dotted</ encodeType >        } c5
              <algo>XXXXXX</algo>                      } c6
              <localtion>background</ localtion >
              <embedtype>raw</ embedtype >             } c7
              <datatype>text<datatype>
              <source>static</source>
              <value>IT IS EMBEDDING DATA.</value>
    </data>                       c8
    ........
</ embed >
```

FIG.14

```
<document>
<plugin type="javaplugin" implclass="jp.co.ricoh.plugin.ExecSOAPMessage">
<param>
  <S:Envelope xmlns:S="http://www.w3.org/2003/05/soap-envelope"
   xmlns:wsa="http://www.w3.org/2005/08/addressing" xmlns:fabrikam="http://example.com/fabrikam">
   <S:Header> ...
     <wsa:To>http://example.com/fabrikam/acct</wsa:To>
     <wsa:Action>...</wsa:Action>
     <fabrikam:CustomerKey wsa:IsReferenceParameter="true">123456789</fabrikam:CustomerKey>
     <fabrikam:ShoppingCart wsa:IsReferenceParameter="true">ABCDEFG</fabrikam:ShoppingCart>
     ...
   </S:Header>
   <S:Body> ... </S:Body>
  </S:Envelope>
</param>
</plugin>
</document>
``` d3 : `<S:Envelope ...` line (header portion)
d4 : CustomerKey / ShoppingCart reference parameter lines

FIG.15

```
<document>
<sequence>
<plugin type="javaplugin" implclass="jp.co.ricoh.plugin.repository">
<param>
<server>
<name>B Co. repository 1</name>
<url>http://hoge/storage</url>
</server>
<folder>/2005-04-03/yamada</folder>
<certification>jioj20992-03-0 iop@pi</certification>
<format>content/jpeg</format>
</param>
</plugin>
<plugin type="javaplugin" implclass="jp.co.ricoh.plugin.BpelAgentImpl">
<param>
<process id="uuid919193">
<variables>
< variable name="date" >$date</ variable >
< variable name="total_ammount" >$total_ammount </ variable >
</variables>
<sequence>
<flow>......</flow>
</sequence>
..........
</process>
</param>
</plugin>
</sequence>
</document>
``` d5 (upper portion), d6 (lower portion)

FIG.16

```
<id-ref>
<id>uuid:9809901-1920489040</id>  ~d7
<resource>http://datamanage1/uuid:9809901-1920489040</resource>  ~d8
</id-ref>
```

```
<embed>
  <data>
    <encodeType>dotted</encodeType>  ⎫ c1
    <algo>XXXXXX</algo>              ⎭
    <localtion>background</localtion>   } c2
    <embedtype>raw</embedtype>       ⎫ c3
    <datatype>text<datatype>         ⎬
    <source>static</source>          ⎭
    <value>
      <document>
        <plugin type="javaplugin" implclass="jp.co.ricoh.plugin.CripItemsByTemplate">
          <param>
            <templateid>uuid:88398912</templateid>     ← c41
            <acceptable-server>xxx.xxx.xxx</acceptable-server>
          </param>
        </plugin>
      </document>
    </value>
  </data>
</embed>
```

(c4 bounding the <document>...</document> block)

FIG.36

BUSINESS FORM TEMPLATE

<template id="uuid:88398912">

LAYOUT INFORMATION

DATA SET INFORMATION

</template>

FIG.48

(a) BEFORE CORRECTION (b) AFTER CORRECTION

```
<document>
  <plugin type="javaplugin" implclass="jp.co.ricoh.plugin.UIGenerate">
    <param>
      <bpel-integration>
        <destination>http://xxx.xxxx.xx.x/bpelservlet/hogehoge</destination>
      </bpel-integration>
    </param>
  </plugin>
</document>
```

FIG.60

```
<pluginName>jp.co.ricoh.rdh. executeSOAP</pluginName>
<![CDATA[
POST /StockQuote HTTP/1.1
Host: www.stockquoteserver.com
Content-Type: text/xml; charset="utf-8"
Content-Length: nnnn
SOAPAction: "Some-URI"

<SOAP-ENV:Envelope
  xmlns:SOAP-ENV="http://schemas.xmlsoap.org/soap/envelope/"
  SOAP-ENV:encodingStyle="http://schemas.xmlsoap.org/soap/encoding/">
  <SOAP-ENV:Body>
    <m:GetLastTradePrice xmlns:m="Some-URI">
      <symbol>DIS</symbol>
    </m:GetLastTradePrice>
  </SOAP-ENV:Body>
</SOAP-ENV:Envelope>
]]>
```

FIG.61

```
<pluginName>jp.co.ricoh.rdh.BPELEngine</pluginName>
<process id="uuid919193">
<sequence>
<receive name="Receive Price Check Request" partnerLink="client"
operation="requestPriceASync" createInstance="true" >
<correlations>
<correlation set="client" initiate="yes"/>
</correlations>
<output part="request" variable="request"/>
</receive>
<invoke name="Lookup Price" partnerLink="backend"
operation="requestPriceSync">
<input part="request" variable="request"/>
<output part="response" variable="response"/>
</invoke>
</process>
```

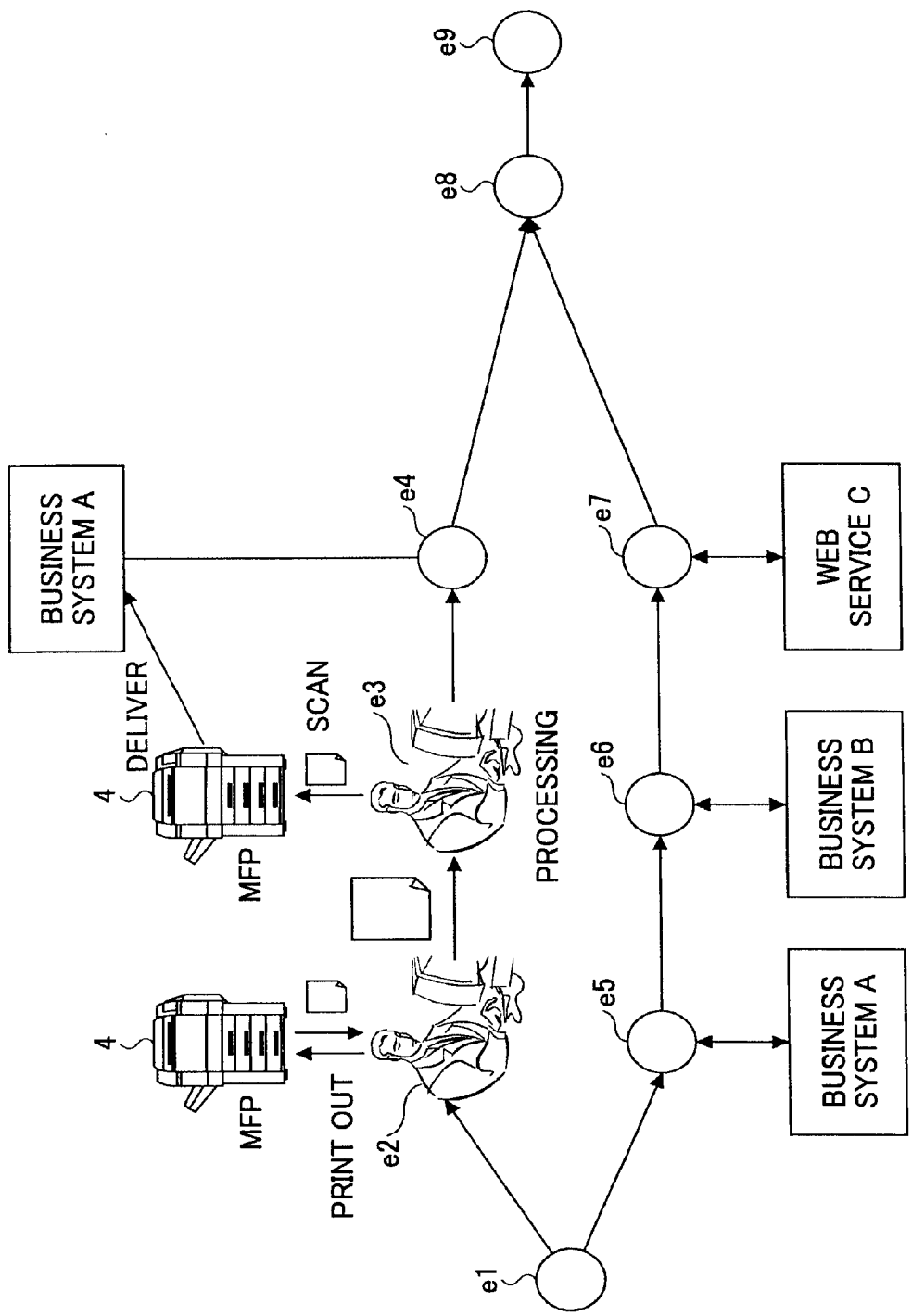

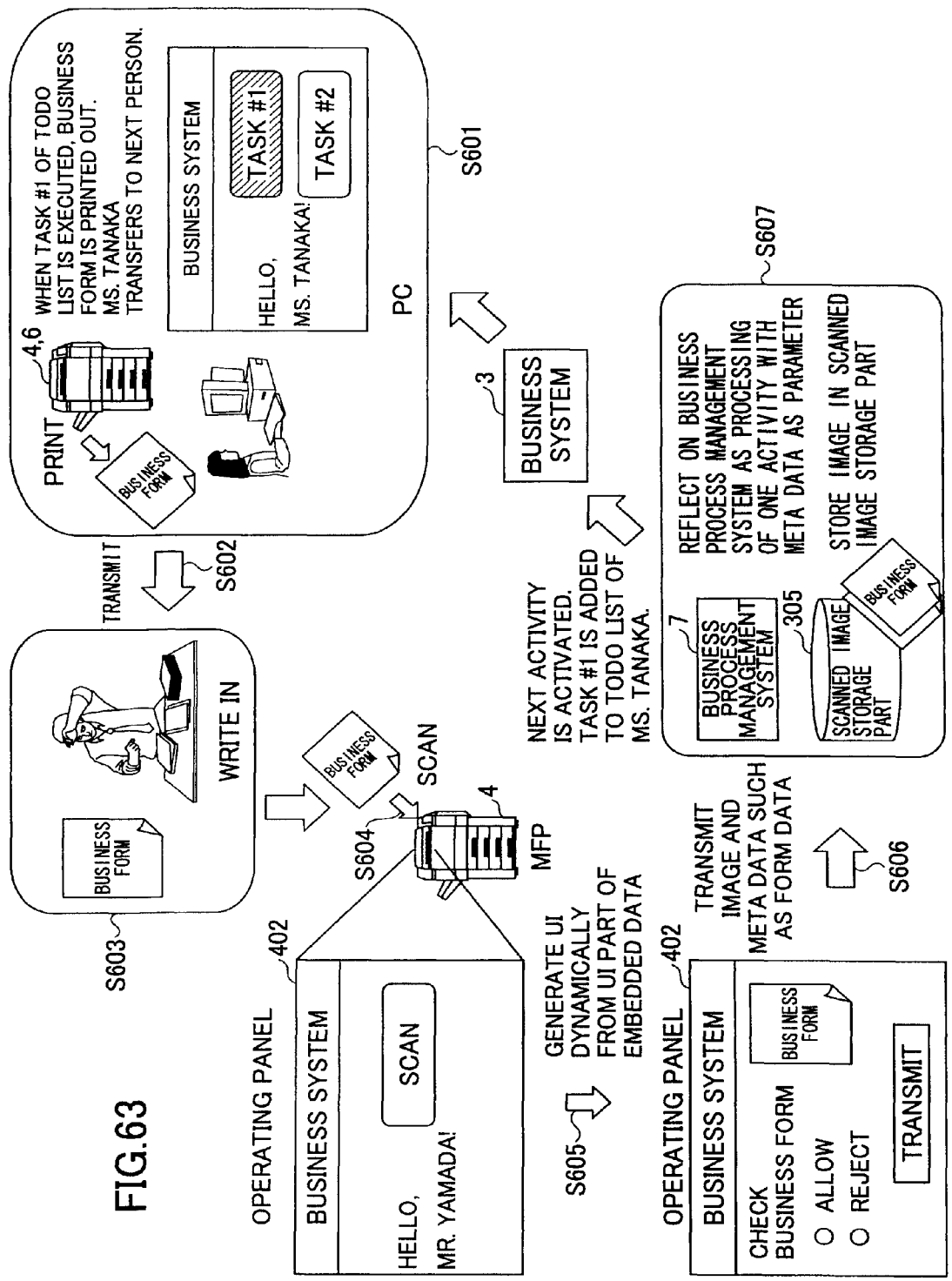

FIG.68

```
POST /hogehoge.jsp HTTP/1.1
Content-Type: multipart/form-data; boundary=-------7d537a254e076c
Content-Length: 152
Connection: Keep-Alive
Cache-Control: no-cache
-------7d537a254e076c
Content-Disposition: form-data; name="process"

Processid=199032;activityid=93029039;image="http://repository/83998"
-------7d537a254e076c
Content-Disposition: form-data; name="status"

"approve"
-------7d537a254e076c--
```

SCAN SOLUTION SYSTEM

CROSS-REFERENCE TO RELATED APPLICATIONS

This patent application is a division of and claims the benefit of priority under 35 U.S.C. §120 from U.S. application Ser. No. 11/558,685 filed Nov. 10, 2006, (now U.S. Pat. No. 7,957,023), and claims the benefit of priority under 35 U.S.C. §119 from Japanese patent application nos. JP 2006-299653, JP 2006-299652, and JP 2006-299651, filed on Nov. 2, 2006, and Japanese patent application nos. JP 2005-336870, JP 2005-333387, and JP 2005-333386, filed on Nov. 17, 2005 in the Japan Patent Office, the entire contents of each of which are incorporated by reference herein.

BACKGROUND OF THE INVENTION

1. Field of the Invention

The present invention relates to a scan solution system, in which, a paper document after being printed out, is managed in such a manner that, a connection with corresponding business is provided.

The present invention also relates to a scan solution system providing input assistance for inputting, from a paper document to a business system or such.

The present invention further relates to a scan solution system by which a business process carried out by a human being with the use of a paper document can be managed.

2. Description of the Related Art

FIG. 1 shows a general configuration of a business form management system for producing a business form. In FIG. 1, the business form management system previously produces a business form template (including layout information for items, and data set information for connecting to a data source and dynamically generating a data value therefrom) by means of an internal designer, and outputs a corresponding business form according to the business form template if necessary.

Patent documents 1 and 3 (listed below) disclose a configuration in which a barcode is attached to a document to be copied or transmitted via a copier or a facsimile machine, the barcode is read so that a copying requirement, a transmission destination or such, set by a user, may be easily set in the copier or the facsimile machine. Patent document 2 (also listed below) discloses an art for extracting a barcode printed on a document.

Although a business has been computerized or incorporated in a network environment in some business field, almost all the businesses have been still carried out based on paper documents, i.e., in such a manner that, a business form is mailed, transmitted via facsimile, a scanned image is attached to an electronic mail, or so.

A plurality of business forms handled in a business, although they relate to a common case, are physically independent documents, and thus, not by means of an electronic linkage but an operator should understand the linkage by himself of herself manually. Also, after that, in the following processing, the operator should input the same data to a computer again. Thus, troublesome operation may be still required. Further, a business form which has been sent, may then be modified, have information additionally written thereto, or so, by another person. In such a case, the operator should refer to the thus-returned business form with referring to a computer display, to input such data as that required due to the above-mentioned modification, adding the information or such made by the other person, to the computer. Thus, work efficiency may be degraded.

The inventor of the present invention proposed an art in Japanese Patent Application No. 2005-207652, in which an image of an identification code is attached to a business form, the business form is identified from the identification code when the business form is scanned by a scanner, so that corresponding stored data can be re-used. Also, in this art, layout information is used for each item included in the business form, the corresponding item part is excised from the scanned image of the business form, thus-excised image part is displayed as a reference image on a computer, and thus, input of modification, added information, or such, to the computer can be effectively aided.

FIG. 27 shows a page in which the above-mentioned reference image is displayed on the computer corresponding to the input item of the business form for inputting to a corresponding business system. When the input item z11 of an input form z1 shown is selected, the corresponding reference image z12 is displayed nearby, and also, a reference source indicating frame z21 is displayed in a scanning result displaying pane z2. FIG. 28 partially and magnifying shows page examples of display/not display states of this reference source indicating frame. FIG. 28 (a) shows a state in which the input item z11 of the input form z1 is not selected, while FIG. 28 (b) shows a state in which the input item z11 of the input form z1 is selected, and also, the reference image z12 and the reference source indicating frame z21 are displayed.

Recently, a system association has been able to be designed/managed, while the efficiency thereof being evaluated as a result of the association among various systems being designed and simulated. However, most of the systems, which can be thus designed, are such as those of automated services in the related art. Recently, also processing of such activities, as those for which human beings are involved, should be considered in this term.

Patent document 1: Japanese Laid-Open Patent Application 11-119597;
Patent document 2: Japanese Laid-Open Patent Application 2004-303223; and
Patent document 3: Japanese Laid-Open Patent Application 2004-343564

SUMMARY OF THE INVENTION

In an actual business using a business form, the business form is sent (i.e., directly handed, via a mail, via a facsimile, via an electronic mail or such in a manner that a scanned image of the business form is attached) to a person, necessary information is then written in the business form or the business form is modified by the person, and after that, the business form is returned. Then, based on the thus-returned business form, the necessary input operation is carried out to a corresponding business system, and the same is managed as a master copy.

The above-mentioned business form management system in the related art is configured specially for outputting a business form. Accordingly, no consideration has been made for providing a connection to a corresponding business which should be carried out after the business form is output.

A scanned image may be displaced or shifted in its position from an expected position due to a cause such as a displacement or a positional error of a feeder of a scanner, occurring when the business form is actually scanned. FIG. 29 shows a state in which the scanned image is thus displaced. In a state of FIG. 29 (a) in which no displacement occurs, image excision therefrom can be carried out properly, and the reference source indicating frame z21 and the reference image z12 can be displayed properly as shown. However, when a displacement occurs, as shown in FIG. 29 (b), image excision therefrom may not be carried out properly, the reference source indicating frame z21 and the reference image z12 may not be displayed properly, and thus, sufficient input assistance may not be achieved. Thus, in an application which utilizes such a scanned image for such a case that a business is to be automatically carried out thereafter, or a part the scanned image is excised, such degradation in a quality of the scanned image may cause a problem.

Further, for a case where a UI (i.e., User interface) is provided from a business system, a plurality of systems such as a slit management system, a business management system and so forth, should be associated with each other, and thus, a design therefor may be difficult.

In many cases, business forms (paper) are utilized in such a business as that in which human beings are involved.

However, it has been difficult to build and manage such a business as that in which the human beings are involved and also, paper is involved, in an electronic system such as a business management system.

According to Patent documents 1 through 3 listed above, nothing has been discussed for directly processing the business form or the business document itself.

The present invention has been devised in consideration of the situation, and, an object of the present invention is to provide a scan solution system, by which, a paper document after being output can be managed in a condition in which a connection is provided to a corresponding business.

Another object of the present invention is to provide a scan solution system by which, a quality of a scanned image can be improved, and input assistance to a business system from a paper document can be effectively achieved.

Further another object of the present invention is to provide a scan solution system in which business process involving paper documents carried out by human beings can be effectively managed.

According to the present invention, a scan solution system has a document data producing part producing document data in which first meta data is embedded based on a document template and a data source; a printing part printing the document data in a paper document; a scanning part obtaining a scanned image from scanning the paper document after predetermined processing is carried out thereon after the printing, and obtaining various sorts of information provided at the time of the scanning, as second meta data; and a processing part carrying out predetermined processing according to the paper document with reference to the document template, based on the first meta data decoded from the scanned image and the second meta data obtained at the time of the scanning.

According to another aspect to the present invention, a scan solution system has a document data producing part producing document data in which first meta data is embedded based on a document template and a data source; a printing part printing out the document data in a paper document; a scanning part obtaining a scanned image from scanning the paper document after predetermined processing is carried out thereon after the printing, and obtaining various sorts of information provided at the time of the scanning, as second meta data; and a processing part carrying out predetermined processing according to the paper document without reference to the document template, but based on the first meta data decoded from the scanned image and the second meta data obtained at the time of the scanning.

In any one of these systems, a designing part designing the document template may be provided.

Further, in any one of these systems, the document template may have layout information indicating a position of an item; data set information connecting to the data source and generating a data value dynamically; and embedding information supporting various sorts of embedding formats, and capable of describing meta data to embed.

Further, in any one of these system, the embedding information may have a description indicating an encode type; a description indicating a place to embed at; a description indicating a type of data to embed; and a description indicating the data itself to embed.

According to another aspect of the present invention, any one of the above-mentioned configurations may be configured in a form of a scan solution managing apparatus.

According to another aspect of the present invention, any one of the above-mentioned configurations may be configured in a form of a scan solution managing method.

In the scan solution system according to the present invention, a paper document after being output can be managed in such a manner that it has a connection to a corresponding business.

According to another aspect of the present invention, a scan solution system has a document data producing part producing document data in which first meta data is embedded based on a document template and a data source; a printing part printing out the document data in a paper document; a scanning part obtaining a scanned image from scanning the paper document after predetermined processing is carried out thereon after the printing, and obtaining various sorts of information provided at the time of the scanning, as second meta data; and an image excision part excising a predetermined part from the scanned image with reference to layout information of the document template, based on the first meta data decoded from the scanned image, and the second meta data obtained at the time of the scanning, and also, correcting a displacement in the scanned image.

In this system, a designing part designing the document template may be provided.

Further, in this system, the document template may have layout information indicating a position of an item; data set information connecting to the data source and generating a data value dynamically; and embedding information supporting various sorts of embedding formats, and capable of describing meta data to embed.

In this system, the embedding information may have a description indicating an encode type; a description indicating a place to embed at; a description indicating a type of data to embed; and a description indicating the data itself to embed.

In this system, the embedding information may have a description indicating a template ID specifying the document template.

In this system, the embedding information may have UI data generating a UI for a user to carry out processing according to a business flow at the time of scanning the paper document.

In any one of these systems, the image excision part may carry out automatic correction comprising any one of position adjustment, distortion correction and vertically inverting correction based on an edge part of a document or a characteristic image part, and also, allowing a user to manually carry out correction comprising any one of moving, magnifying, reducing, rotating and making distortion correction of an image.

According to another aspect of the present invention, any one of the above-mentioned configurations may be configured in a form of a scan solution managing apparatus.

According to another aspect of the present invention, any one of the above-mentioned configurations may be configured in a form of a scan solution managing method.

In the scan solution system according to the present invention mentioned above, an interactive image excision, or a correction of an input, can be easily carried out, thus quality of a scanned image is improved, and appropriate input assistance to a business system or such, from a paper document, can be achieved.

According to another aspect of the present invention, a scan solution system has a document data producing part producing document data in which first meta data is embedded based on a document template and a data source; a printing part printing out the document data in a paper document; a process managing part managing a business process; a scanning part obtaining a scanned image from scanning the paper document after predetermined processing is carried out thereon after the printing, and obtaining various sorts of information provided at the time of the scanning, as second meta data; and a business processing reflecting part reflecting business processing contents on said business process managing part, based on the first meta data decoded from the scanned image and the second meta data obtained at the time of the scanning.

In this system, a designing part designing the document template may be provided.

In any of these systems, a designing part designing the business process may be provided.

In any of these systems, the document template has layout information indicating a position of an item; data set information connecting to the data source and generating a data value dynamically; and embedding information supporting various sorts of embedding formats, and capable of describing meta data to embed.

In this system, the embedding information may have a description indicating an encode type; a description indicating a place to embed at; a description indicating a type of data to embed; and a description indicating the data itself to embed.

In this system, the embedding information may have UI data generating a UI for a user to carry out processing according to a business flow at the time of scanning the paper document.

According to another aspect of the present invention, any one of the above-mentioned configurations may be configured in a form of a scan solution managing apparatus.

According to another aspect of the present invention, any one of the above-mentioned configurations may be configured in a form of a scan solution managing method.

According to the present invention mentioned above, a business logic can be easily described even for a business involving a paper document, and can be designed/managed by a business process management system. Further, it is possible to hide, as much as possible, settings or such of the business form management system or a scanning system, which is utilized for changing paper information into electronic information, or changing electronic information into paper information, and thus, it is possible to easily build the corresponding system.

Other objects and further features of the present invention will become more apparent from the following detailed description when read in conjunction with the accompanying drawings:

BRIEF DESCRIPTION OF THE DRAWINGS

FIG. 10 shows an example of layout information;

FIG. 11 shows an example of data set information;

FIG. 12 shows an example of embedding information;

FIGS. 13 through 16 show examples of embedding data;

Figure 29:
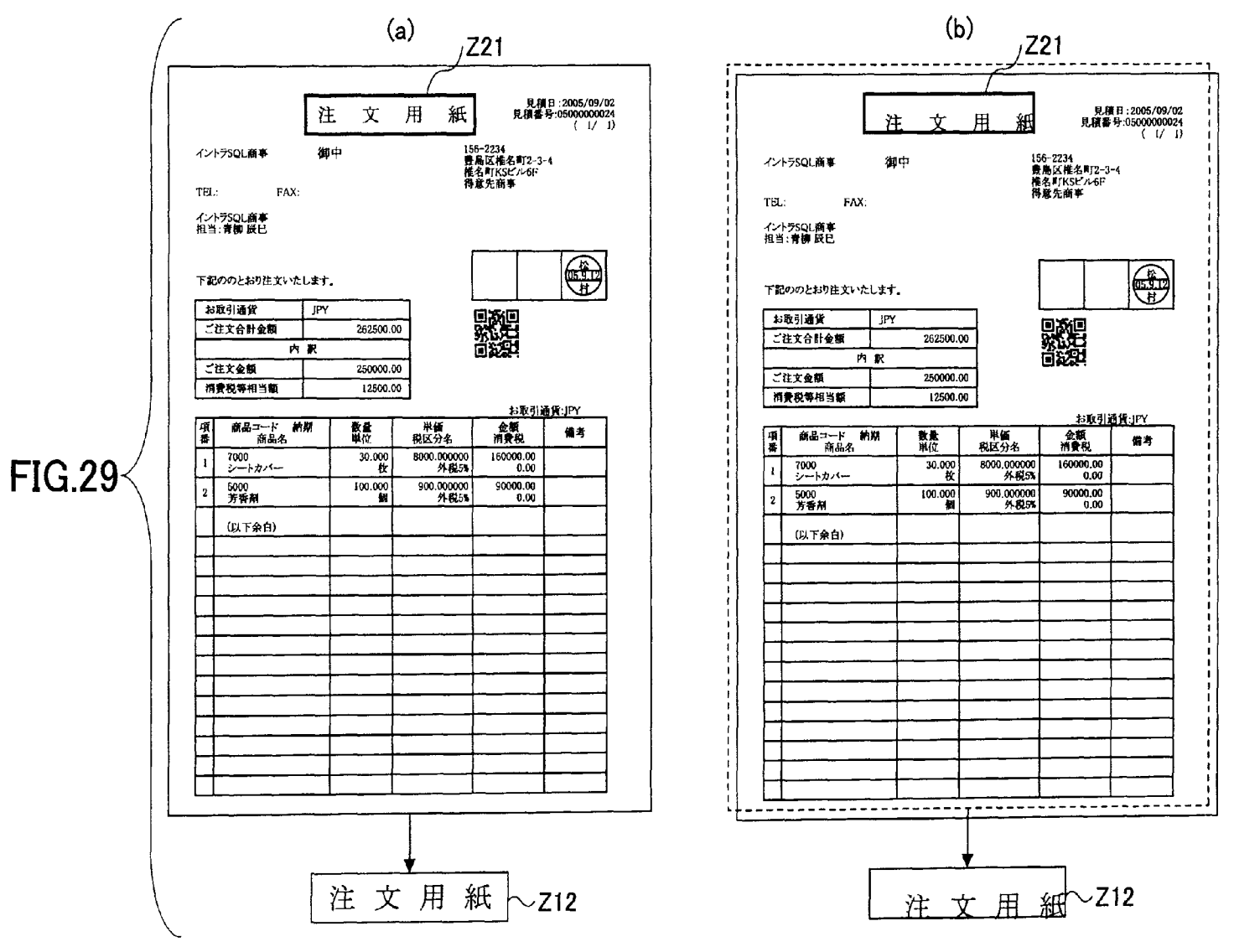

FIG. 29 shows a state in which a scanned image is displaced;

FIG. 31 shows an example of a configuration of an image excision plug-in;

FIG. 33 shows an example of layout information;

FIG. 35 shows an example of embedding information;

FIGS. 36 and 37 show other examples of the business form template;

FIG. 45 shows a general configuration of item excision processing by means of the image excision plug-in;

FIG. 48 shows an example of the scanned image after the correction;

FIG. 51 shows an example in which an input form corresponding to each business form is automatically generated;

FIG. 55 shows an example of layout information;

FIGS. 59 thorough 61 show examples of data for a business process associating plug-in;

FIG. 62 shows an example of a business flow including processing of the business form by human beings;

FIG. 63 shows a specific example of the business flow;

FIG. 68 shows an example of a transmission message; and

DETAILED DESCRIPTION OF THE PREFERRED EMBODIMENTS

Below, preferable embodiments of the present invention are described.

Figure 1:
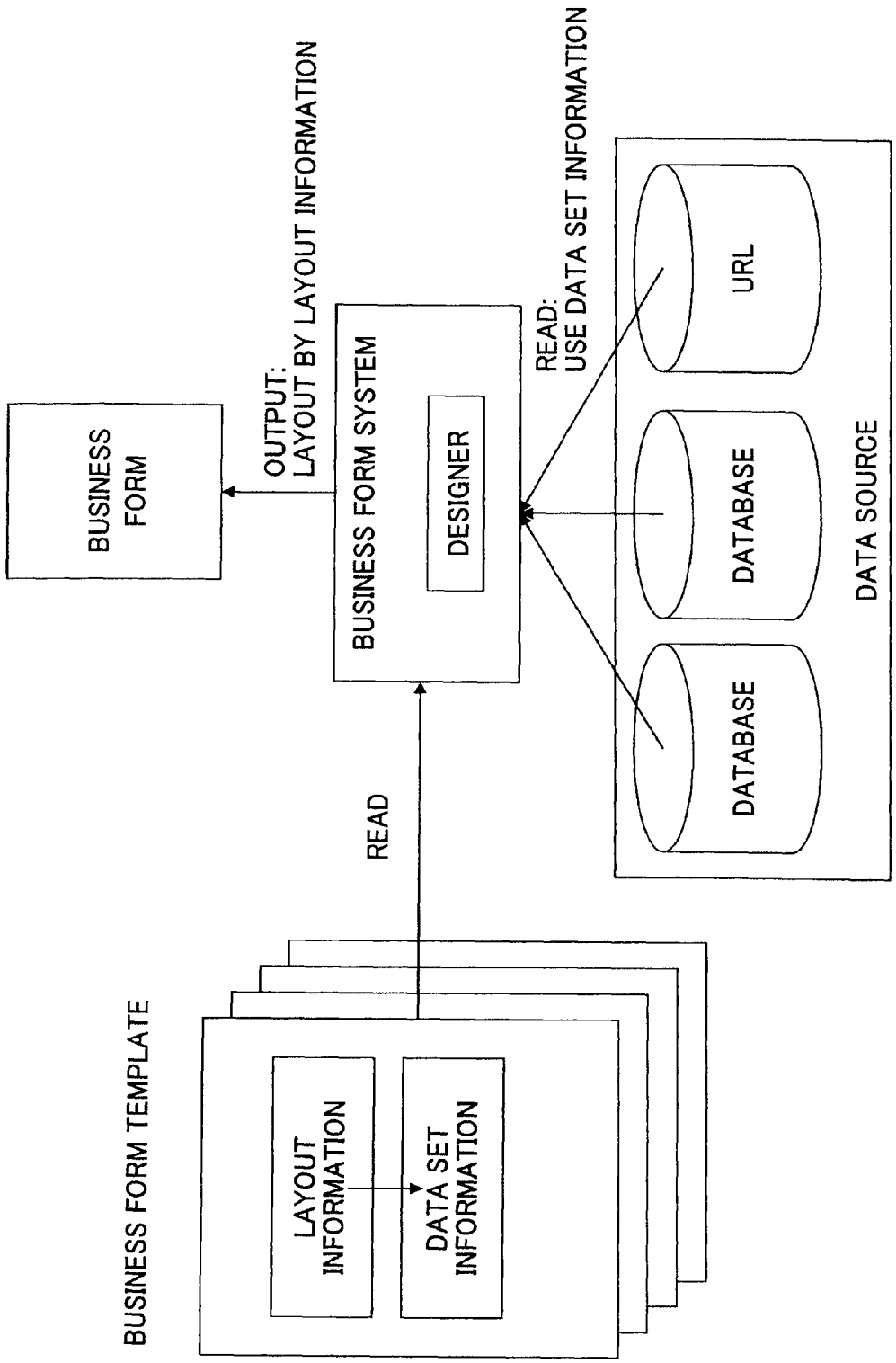
FIG. 1 shows a general configuration of business form generation in a business form management system in the related art.
Figure 2:
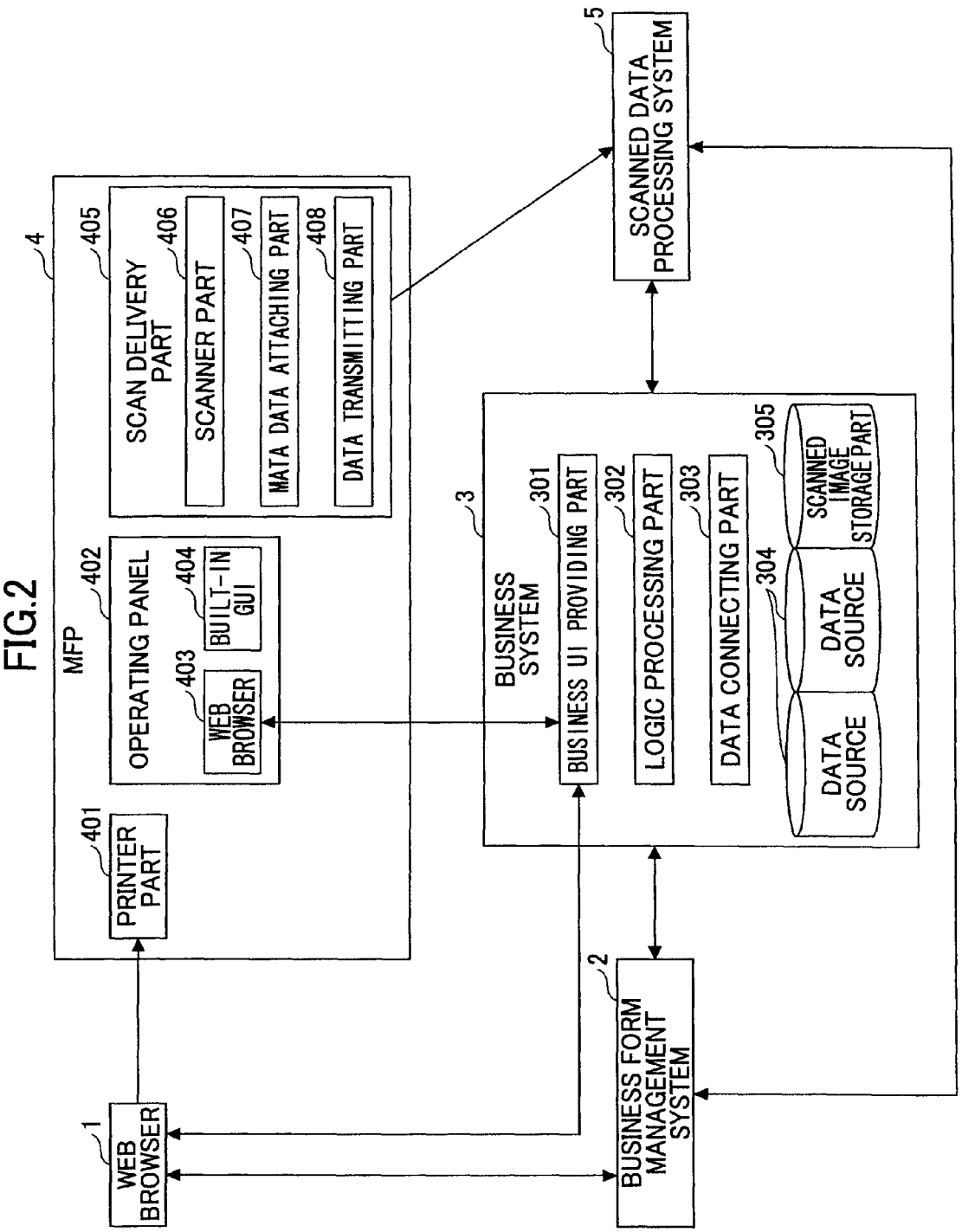
FIG. 2 shows an example of a configuration of a scan solution system in a first embodiment of the present invention.

FIG. 2 shows an example of a configuration of a scan solution system according to a first embodiment of the present invention. In FIG. 2, the scan solution system includes a Web browser 1 acting as a client a user operates; a business form management system 2 generating business form data; a business system 3 managing business including issuance of the business form and reception of the same; an MFP (Mufti-function printer) 4 carrying out printing out of the business form and scanning of the same; and a scanned data processing system 5 carrying out predetermined processing based on a scanned image delivered from the MFP 4 and meta data (described later).

The MFP 4 includes a printer part 401 carrying out printing out of the business form; an operating panel 402 a user operates; and a scan delivery part 405 carrying out scanning of the business form and delivery of the scanned image and meta data. The operating panel 402 has a Web browser 403 displaying a UI (user interface); and a built-in GUI (Graphical user interface) 404. The scan delivery part 405 includes a scanner part 406 scanning the business form; a meta data attaching part 407 attaching various sorts of information (login user information, operation date/time, selected contents from the operating panel 402, an IP address of the MFP 4 or such) upon scanning, to a file name of the scanned image as the meta data, or attaching the same in a separate file of XML (extendible markup language) or such; and a data transmitting part 408 transmitting the scanned image and meta data to the scanned data processing system 5.

The business system 3 includes a business UI providing part 301 providing a business UI; a logic processing part 302 carrying out data processing according to a logic in line with the business contents; a data connecting part 303 connecting to a data storage inside or outside of the system; a data source 304 such as various sorts of databases; and a scanned image storage part 305 storing the scanned image of the business form.

Figure 3:
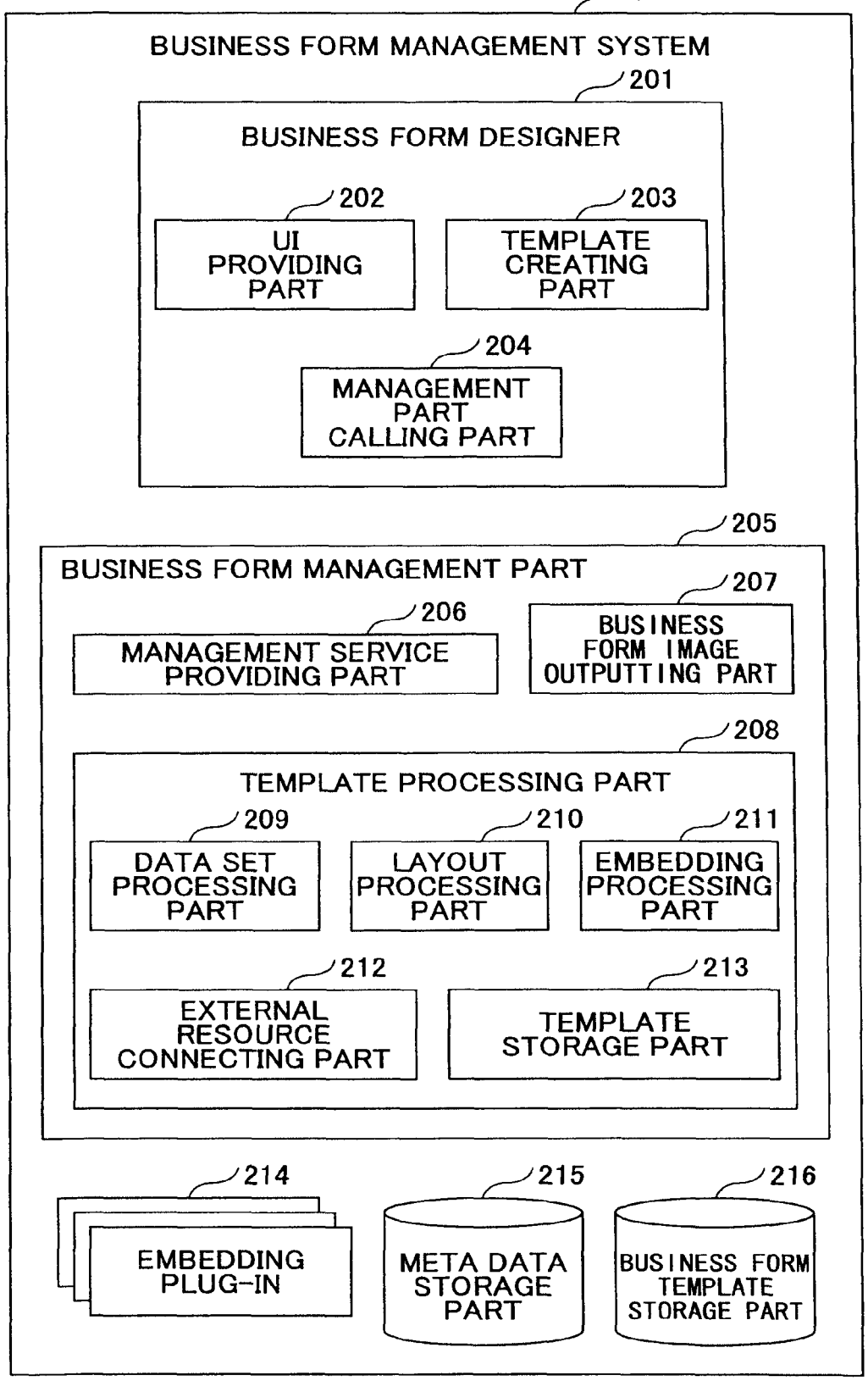
FIG. 3 shows an example of a configuration of a business form management system.

FIG. 3 shows an example of a configuration of the business form management system 2. In FIG. 3, the business form management system 2 includes a business form designer 201 carrying out design of the business form according to operation made by a business management user; a business form management part 205 carrying out management of the business forms; an embedding plug-in 214 executing embedding of the meta data in the business form image; a meta data storage part 215 holding the meta data embedded in the business form image; and a business form template storage part 216 holding the business form template. The business form designer 201 includes a UI providing part 202 providing a UI; a template creating part 203 creating the business form template; and a management part calling part 204 calling the business form management part 205 for processing various sorts of inquiries or registration of the created business form template. The business form management part 250 includes a management service providing part 206 providing the business form management service; a business form image outputting part 207 outputting the created business form data in a form of a PDF (Portable document file) or such; a template processing part 208 carrying out processing of generating the business form according to the business form template; an external resource connecting part 212 connecting to an external resource for including data of the external resource in the business form; and a template storage part 213 storing the business form template created by the business form designer 210 in the business form template storage part 216. The template processing part 208 includes a data set processing part 209 carrying out processing of a data set which is used as a source of data to be included in the business form; a layout processing part 210 carrying out layout processing for respective items included in the business form; and an embedding processing part 211 carrying out embedding data in the business form in various manners such as a two-dimension barcode (QR code) or such.

Figure 4:
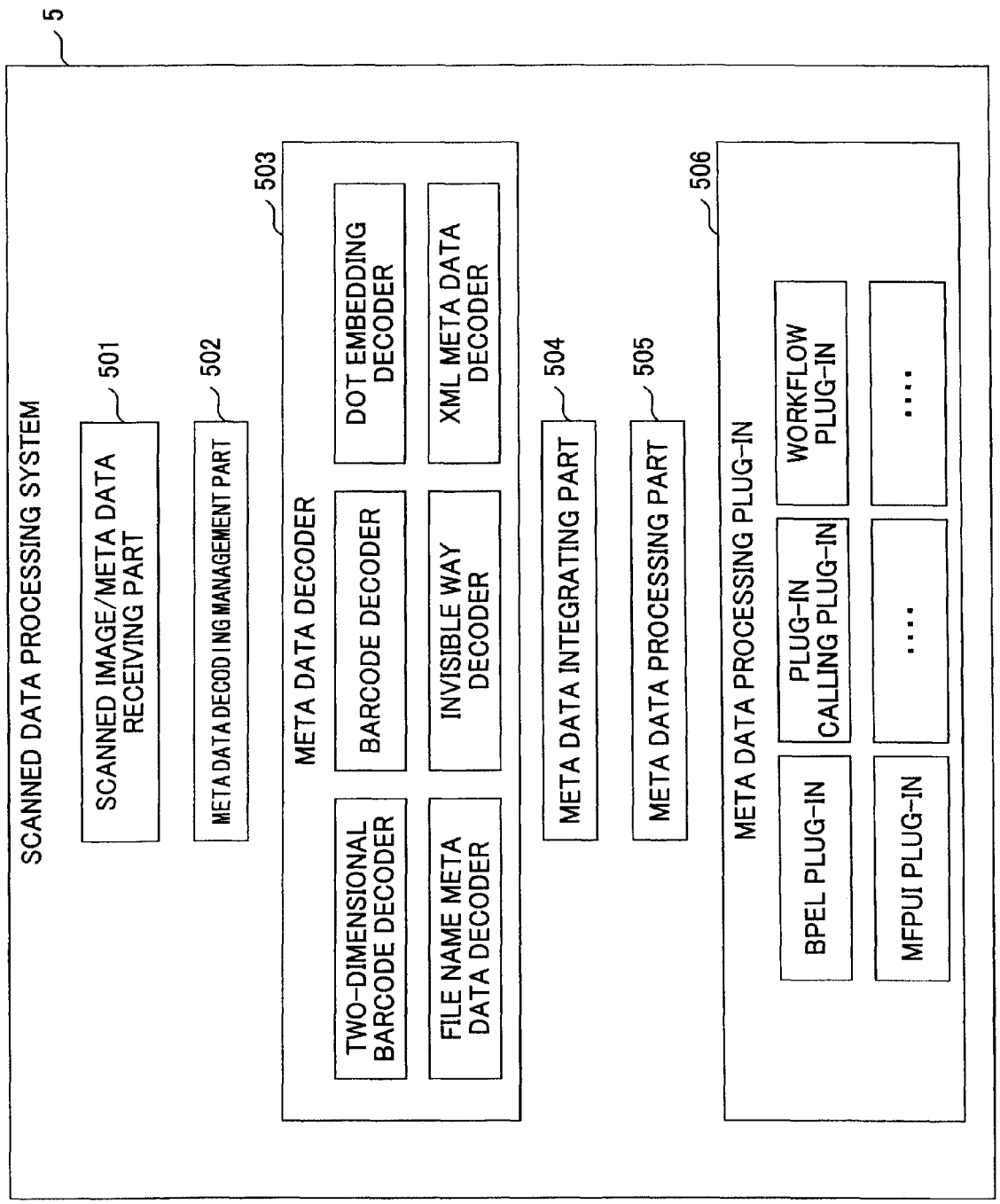
FIG. 4 shows an example of a configuration of a scanned data processing system.

FIG. 4 shows an example of the scanned data processing system 5. In FIG. 4, the scanned data processing part 5 includes a scanned image/meta data receiving part 501 receiving the scanned data or the meta data from the MFP 5; a meta data decoding management part 502 managing decoding of the meta data which is embedded in the scanned image or the file name, or, attached in a form of a separate file; a meta data decoder 503 including various types of decoders for decoding, such as a two-dimension barcode decoder, a barcode decoder, a dot embedding decoder, a file name meta data decoder, an invisible way decoder, an XML decoder and so forth; and a meta data integrating part 504 integrating the meta data decoded by the various types of decoders. Further, the scanned data processing system 5 includes a meta data processing part 505 carrying out predetermined processing corresponding to the thus-integrated meta data; and a meta data processing plug-in 506 including various types of plug-ins, for actually executing the predetermined processing corresponding to the meta data, i.e., a BPEL (Business process execution language) plug-in, a plug-in calling plug-in, a business flow plug-in, an MFPUI (Multi-function printer user interface) plug-in, and so forth.

Figure 5:
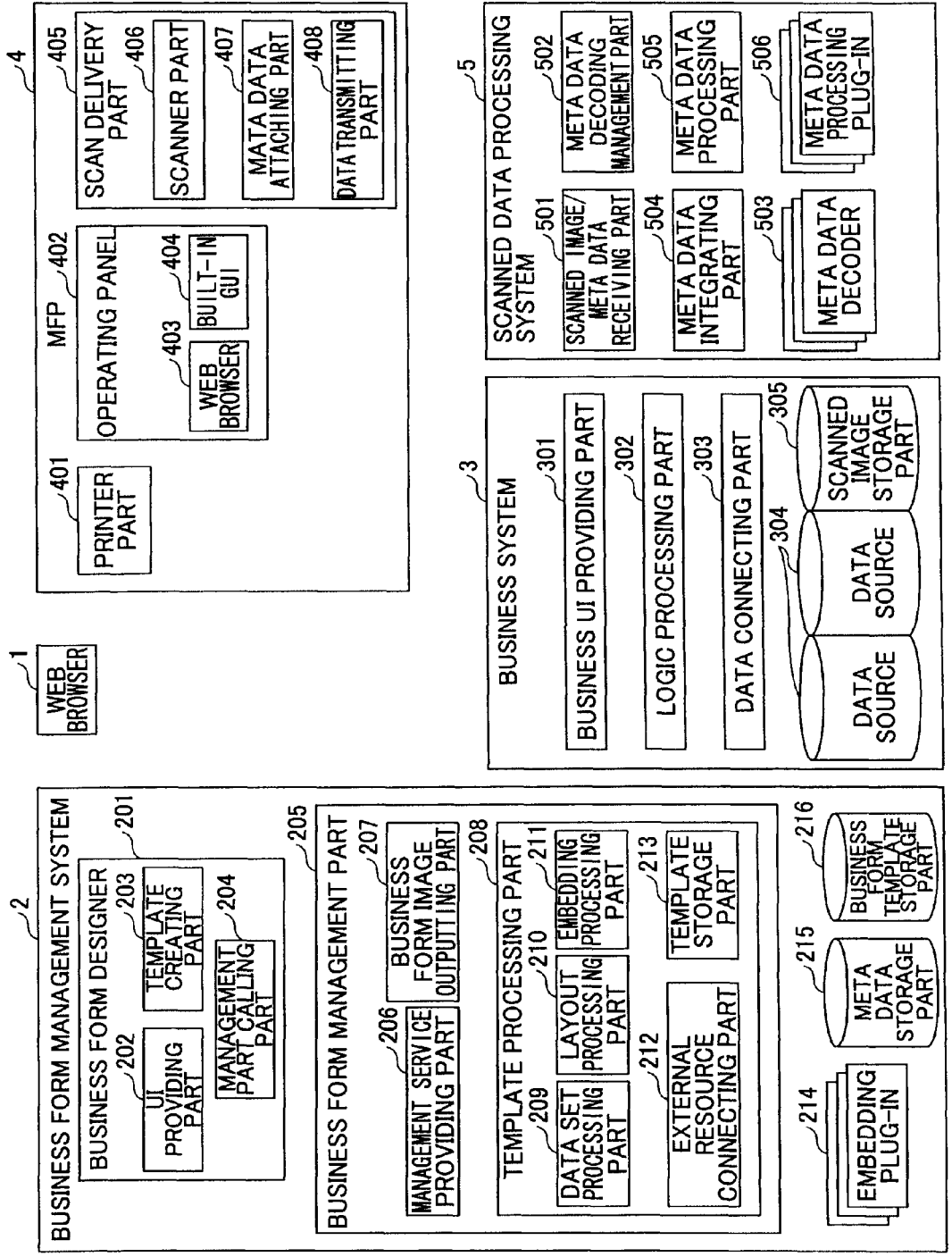
FIGS. 5 through 8 show examples of a pattern of a configuration of the scan solution system.
Figure 6:
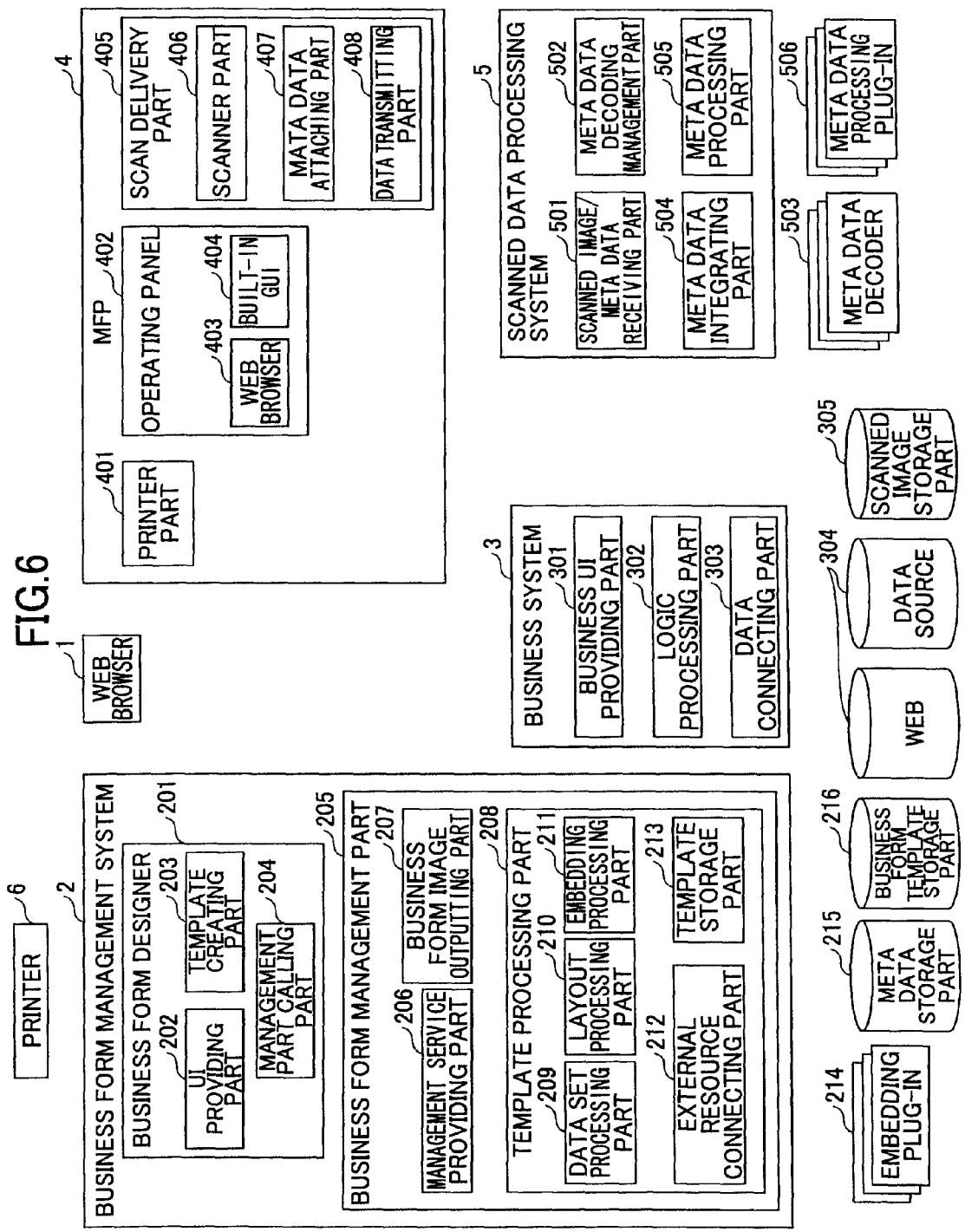
Figure 7:
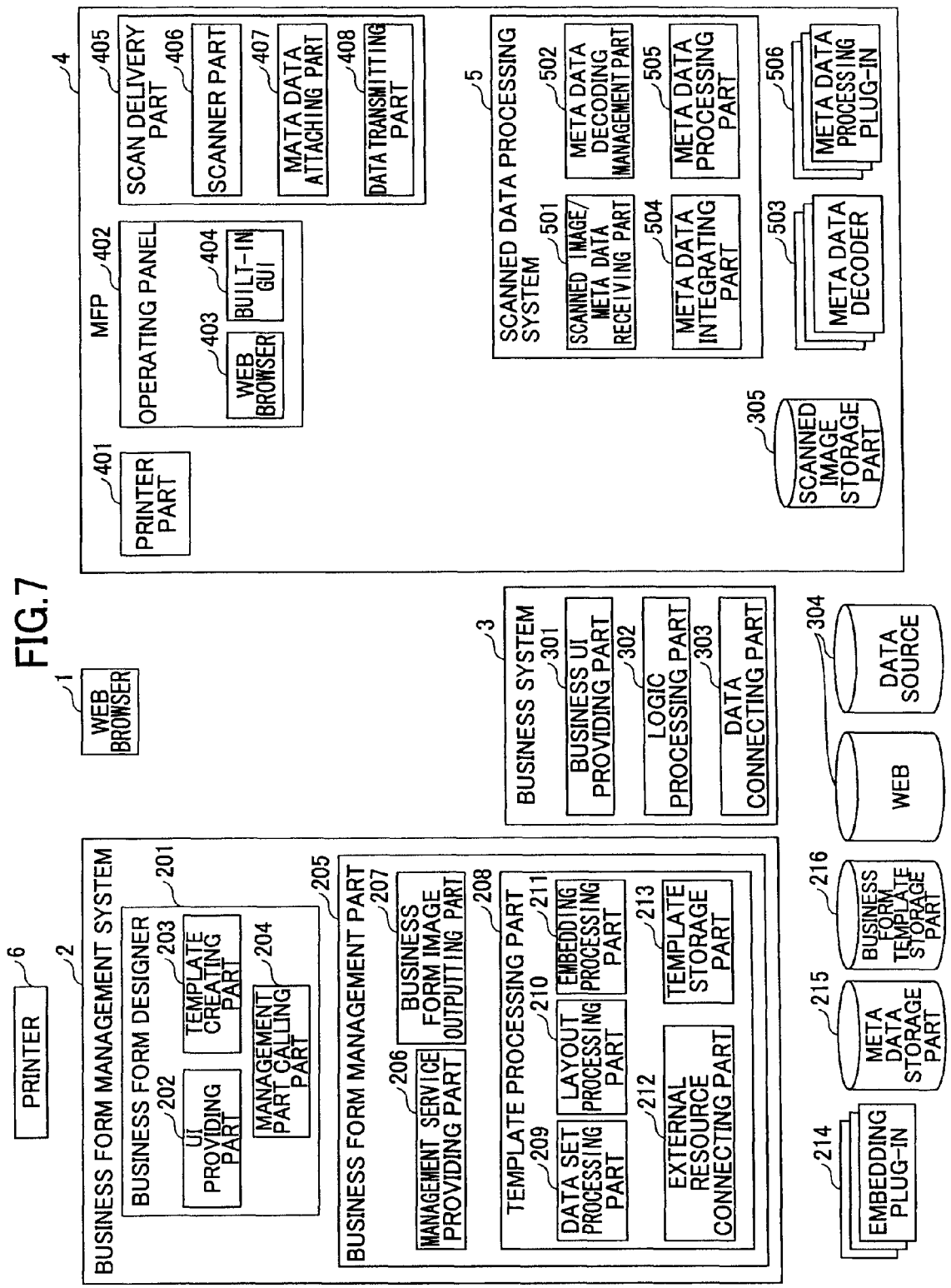
Figure 8:
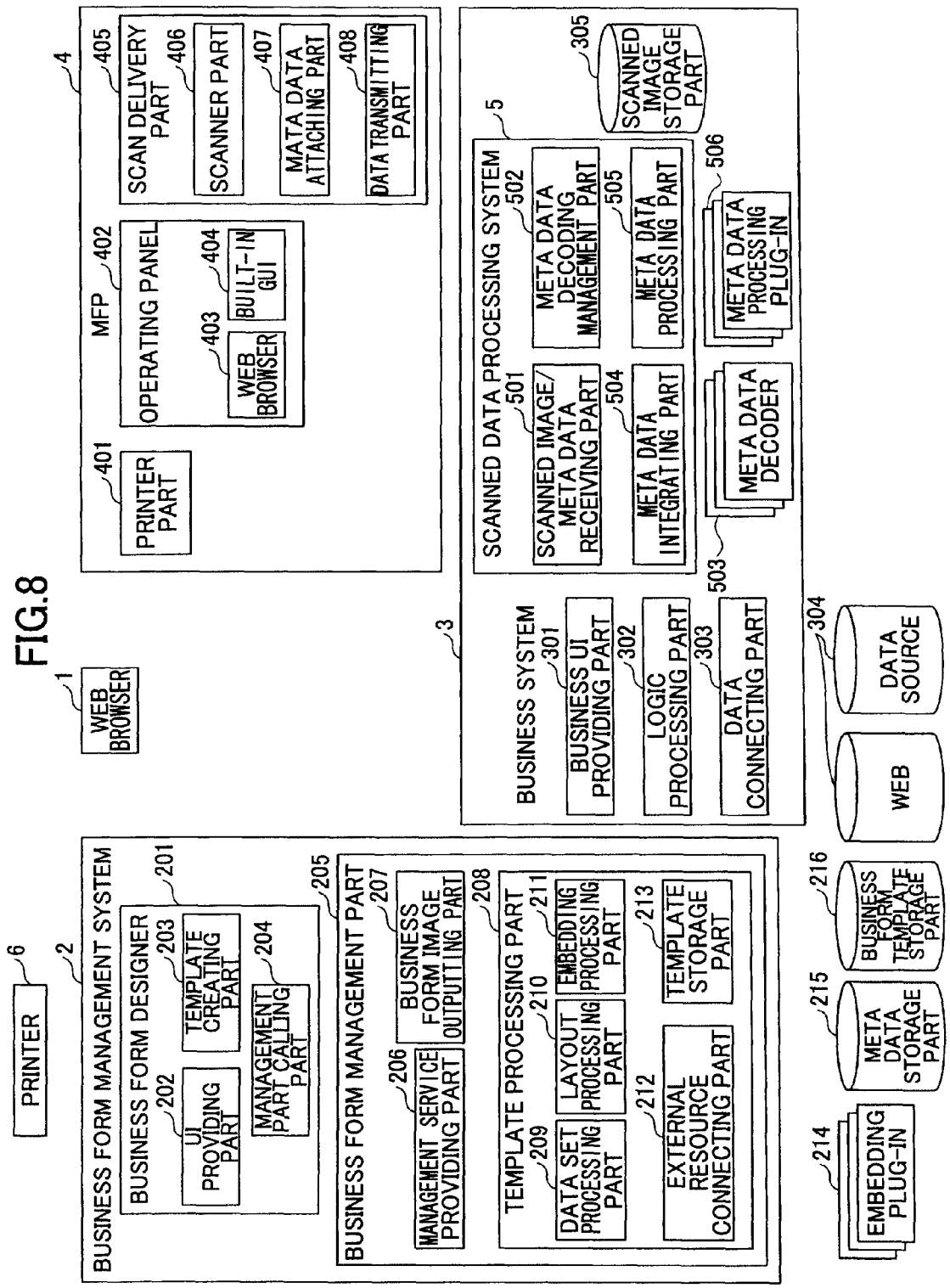

FIGS. 5 through 8 show examples of a configuration pattern of the scan solution system in the first embodiment. FIG. 5 shows a basic configuration of those shown in FIGS. 2 through 4. FIG. 6 shows a configuration in which, a printer 6 for printing out the business form is provided separately from the MFP 4, also the embedding plug-in 214, the meta data storage part 215, the business form template storage part 216, the data source 304, the scanned image storage part 305, the meta data decoder 503 and the meta data processing plug-in 506 are placed in other separate systems. FIG. 7 shows a configuration in which the scanned data processing system 5 and the scanned data storage part 305 are placed in the MFP 4. In this case, since the scanned data storage part 305 in FIG. 5 is included in the MFP 4, server management can be omitted, and also, it is possible to improve a processing speed and operation efficiency for when the scanned image and the UI of the MFP 4 have a close relationship. FIG. 8 shows a configuration in which, in the business system 3 of FIG. 5, the scanned data processing system 5 is placed as a component. In this case, it is possible to reduce overhead costs occurring between this system and the business system 3, such as those for authentication, network boundary, and so forth.

Figure 9:
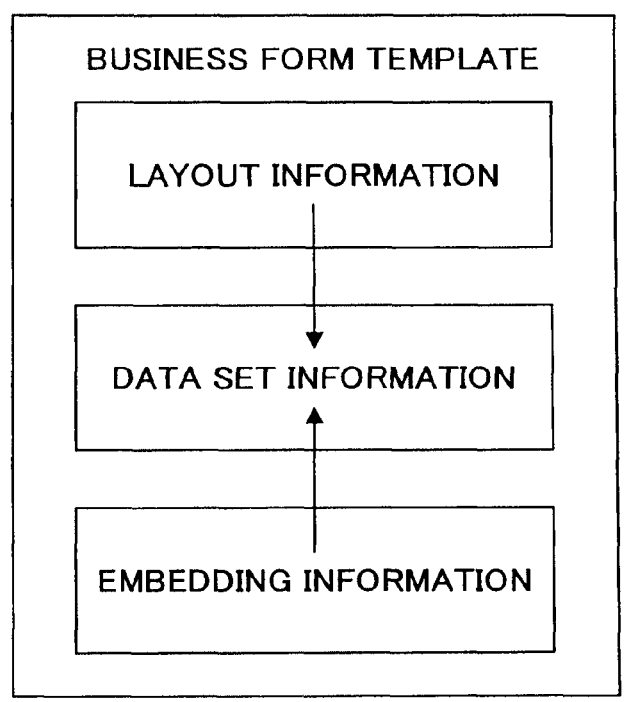
FIG. 9 shows an example of a business form template.

FIG. 9 shows an example of the business form template managed by the business form management system 2. In FIG. 9, the business form template includes layout information for internally referring to the data set information and designating a location of each item; the data set information for dynamically generating a data value by connecting to the corresponding data source; and embedding information for supporting various types of embedding formats, and describing the embedding meta data. It is noted that, the embedding information may be configured in such a manner that it merely refers to the data set information.

Figure 10:
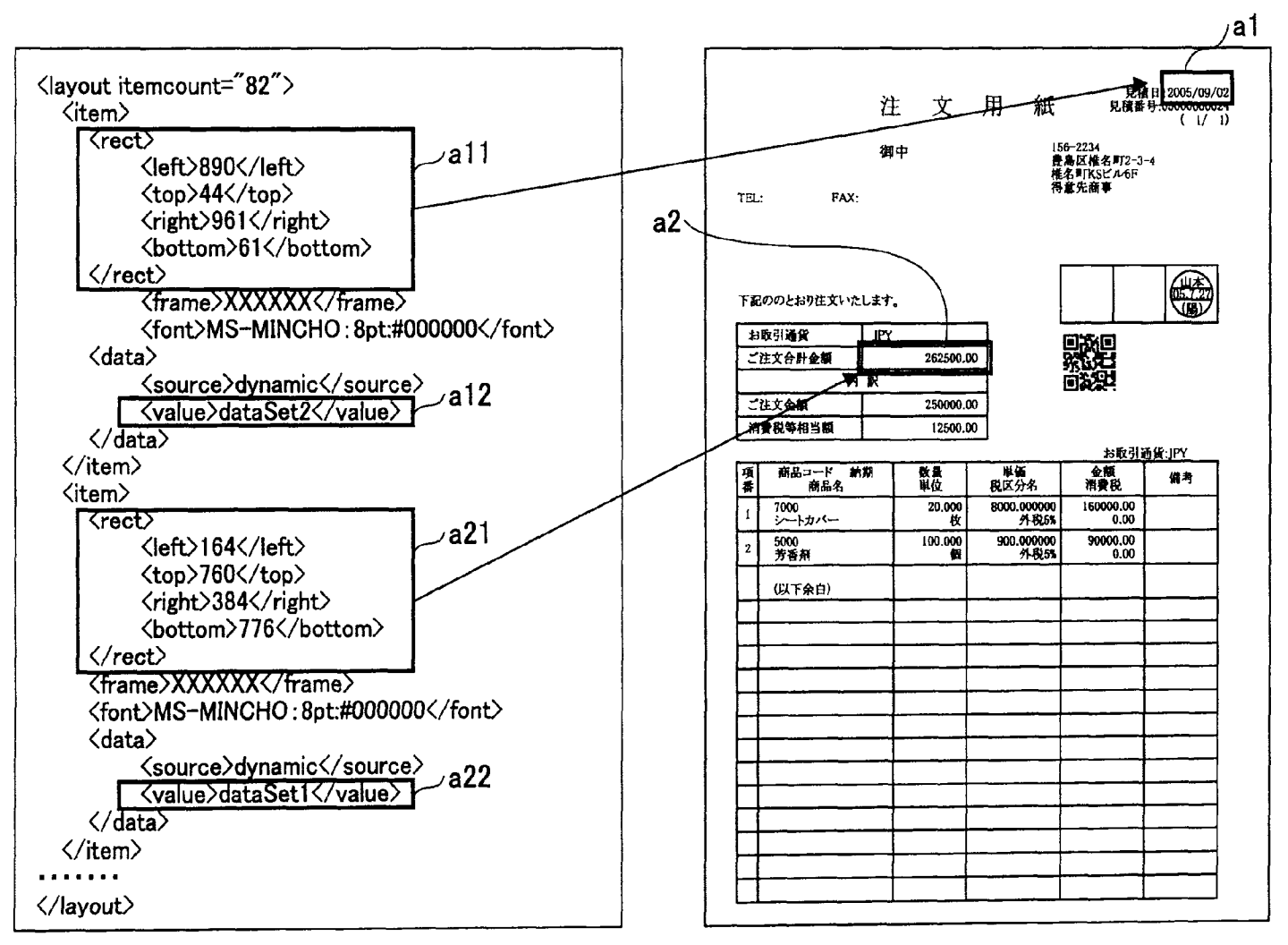

FIG. 10 shows an example of the layout information. The left side shows the layout information, and the right side shows the corresponding business form. In this example, a position corresponding to an item a1 of the business form and the data set to refer are described by a11 and a12, respectively, and a position corresponding to an item a2 of the business form and the data set to refer are described by a21 and a22, respectively.

FIG. 11 shows an example of the data set information, which includes a description b1 for referring to an external RDB (Relational database), a description b3 for referring to an external XMLDB, and a description b2 for referring to the data set from the description b3.

FIG. 12 shows an example of the embedding information, which includes descriptions c1, c5 indicating encode types; descriptions c2, c6 indicating locations to embed; descriptions c3, c7 indicating types of the embedding data (ID, raw text, parameter, or such); and descriptions c4, c8 indicating the embedding data itself. It is noted that, a description c41 included in the embedding data c4 is a description for referring to the corresponding data set.

FIGS. 13 through 16 show examples of the embedding data included in the embedding information.

Figure 13:
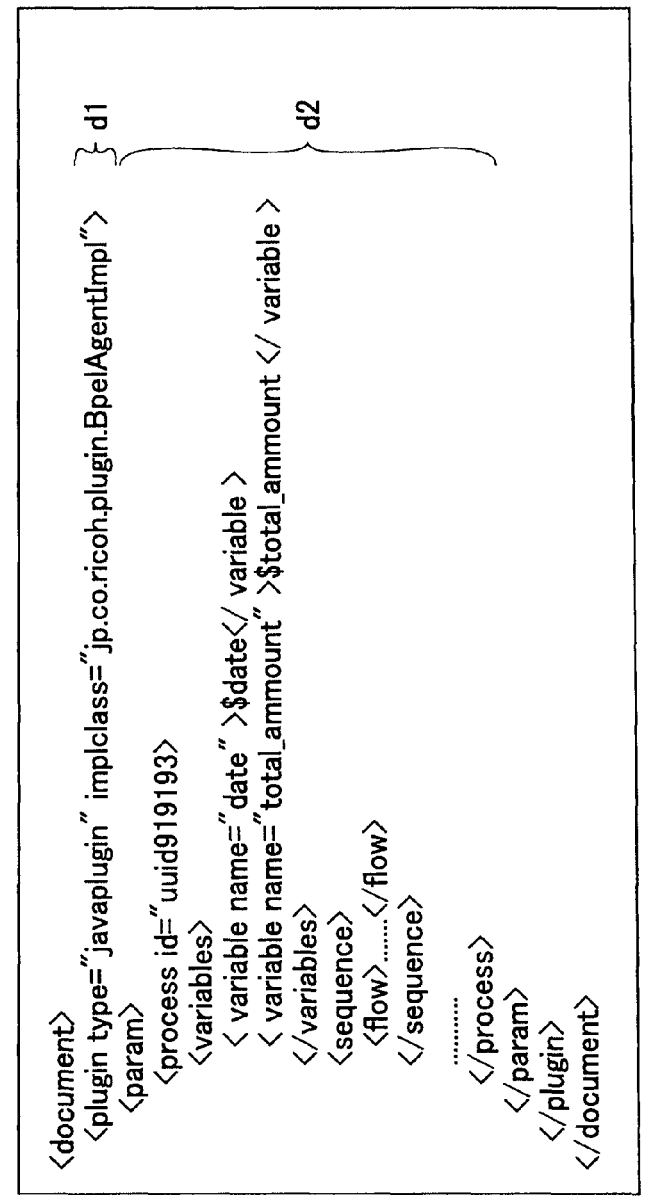

FIG. 13 shows an example of data calling a BPEL plug-in, and including a description d1 indicating an execution class of the plug-in; and a description d2 indicating data for the plug-in execution. The plug-in receiving this data carries out processing according to the description d2 by means of a BPEL execution system.

FIG. 14 shows an example of data calling a plug-in with a SOAP (Simile object access protocol) message, and includes a description d3 indicating a plug-in execution class and a description d4 indicating the SOAP message for the plug-in execution. The plug-in receiving this data functions as a repeating server for the SOAP message.

FIG. 15 shows an example of data executing a plurality of plug-ins in sequence, and, including a description d5 for a first plug-in and a description d6 for a second plug-in. in this example, the first plug-in stores an image in the document management system which is connectable in a repository document class, and calls the BPEL plug-in, i.e., the second plug-in. It is noted that it is also possible to cause a plurality of plug-ins to be executed in parallel.

FIG. 16 shows an example of data for embedding an ID, including a description d7 indicating the ID and a description d8 indicating a location of a resource identified by the ID. In this case, the ID of the description d7 is used as a key, and a value is inquired from the location of the description d8, so that, data the same as that of FIGS. 13 through 15 can be obtained. Date embedded in the business form is one which is the minimum one. However, depending on an actual embedding manner, a storage capacity may become short. In such a case, only the ID is embedded so as to save the capacity.

Figure 17:
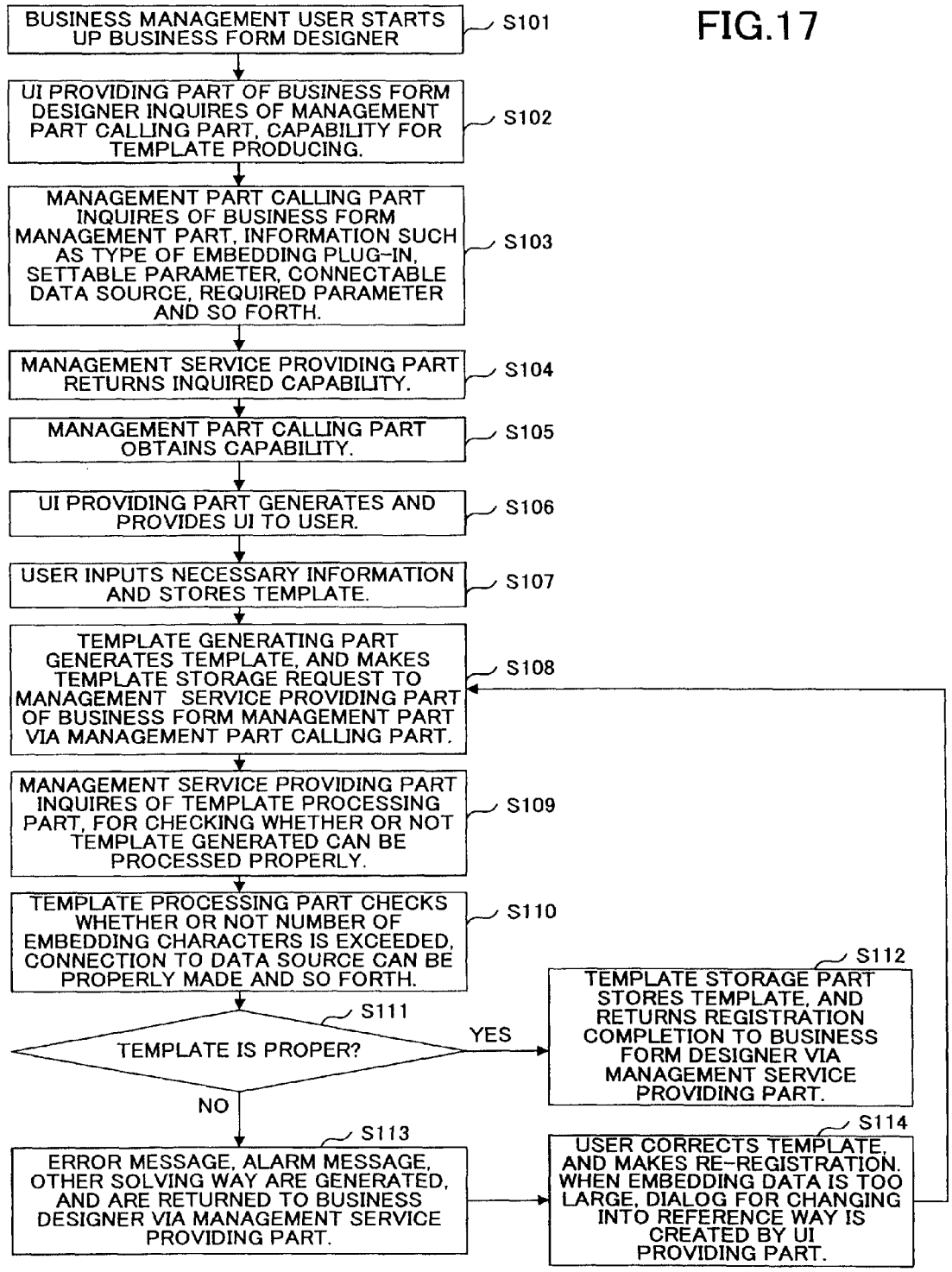
FIG. 17 shows a flow chart of an example of processing of business form template creation and storage.

FIG. 17 shows an operating flow chart of an example of processing of the business form template creation/storage. In FIG. 17, the business management user starts up the business form designer 201 of the business form management system 2 (Step S101).

The UI providing part 202 of the business form designer 201 inquires a capability (function details) for creating the business form template of the management part calling part 204 (Step S102), the management part calling part 204 then inquires of the business form management part 205 information such as the types of the embedding plug-ins, settable parameters, connectable data sources, required parameters, and so forth (Step S103).

Figure 18:
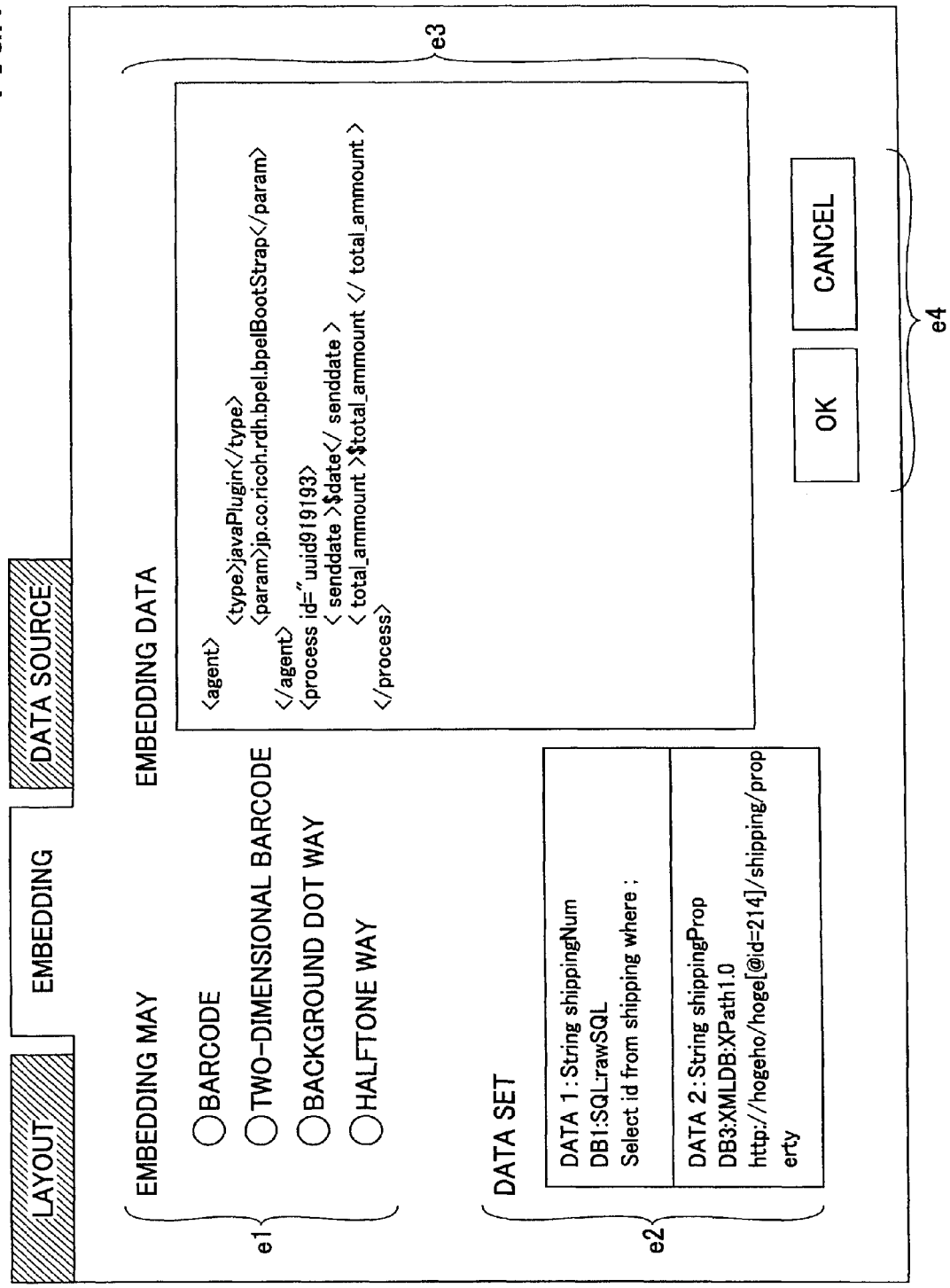
FIGS. 18 and 19 show examples of information embedding dialog.

The management service providing part 206 of the business form management part 205 returns the inquired capability (Step S104), the management part calling part 204 of the business form designer 201 thus obtains the capability from the business form management part 205 (Step S105), the UI providing part 204 generates a UI, and provides the same to the user (Step S106). FIG. 18 shows an example of a dialog as the UI, including a radio button e1, a display e2 for referring to the data set, an area e3 for inputting the embedding data, and a button e4 for indicating, to store or to cancel.

Return to FIG. 17, the user inputs necessary information, and stores (i.e., requests to store) the business form template (Step S107).

The template creation part 206 generates the business form template (data), and makes a template storage request to the management service providing part 206 of the business form management part 205 via the management part calling part 204 (Step S108).

The management service providing part 206 inquires of the template processing part for checking whether or not the thus-generated business form template is a proper one (Step S109).

The template processing part 208 thus checks whether or not the number of embedding characters is exceeded, connection to the data source is failed in, or such (Step S110), and thus, determines whether or not the business form template is a proper one (Step S111).

When it is determined that the business form template is a proper one, the template storage part 213 stores the business form template in the business form template storage part 216, and returns to the business form designer 201 by stating that the registration has been finished, via the management service providing part 206 (Step S112).

When it is determined that the business form template is not a proper one, an error message, an alert message, or a message suggesting another solution, is generated, and is returned to the business form designer 201 via the management service providing part 206 (Step S113).

Figure 19:
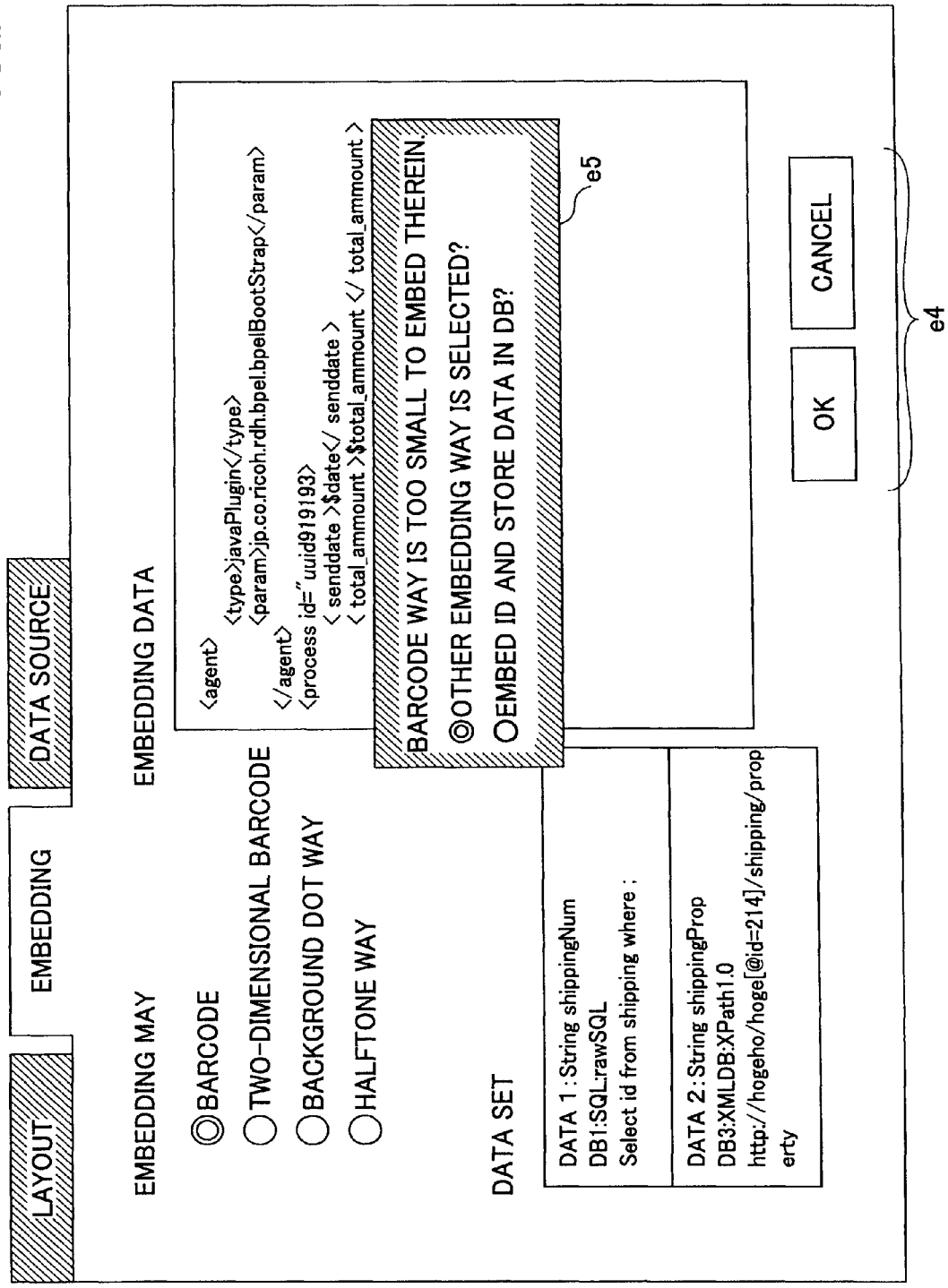

In this case, the user modifies the businesses form template according to the message, and re-registers the same (Step S114). It is noted that, when the embedding data is too large in its data size, a dialog for changing into a reference manner (i.e., a manner in which an ID is embedded for referring to the corresponding data, instead of the data itself being embedded) is created by the UI providing part 202, and, re-registration is carried out according to corresponding instructions. FIG. 19 shows an information embedding dialog in a state in which a message for a case where the embedding data size is too large is displayed.

FIGS. 20 through 23 show a general configuration of processing of the scan solution system carried out after the business form template is thus created.

Figure 20:
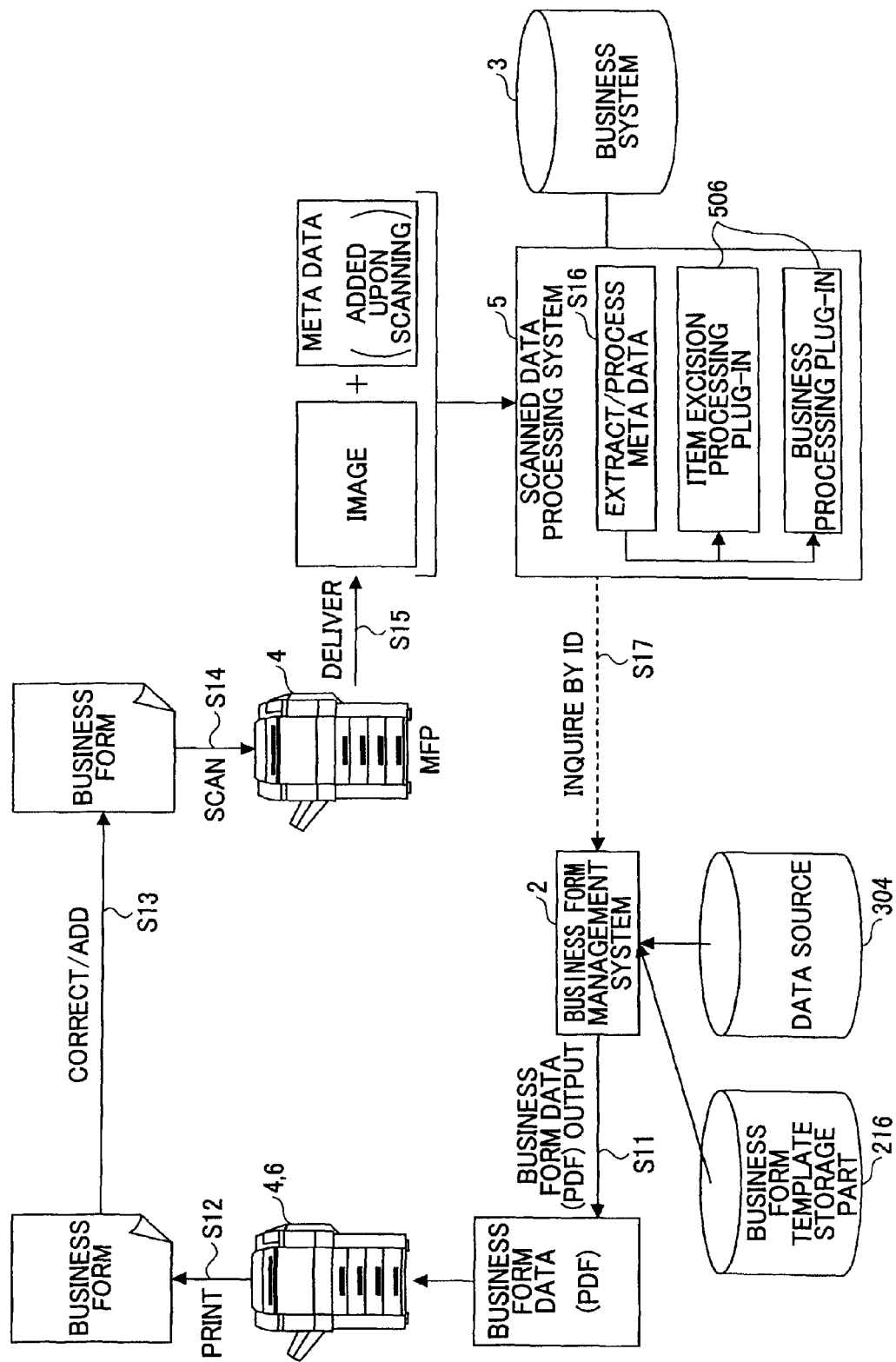
FIGS. 20 through 23 show general configurations of processing of the scan solution system.

FIG. 20 shows processing in which, the meta data is not embedded in the image of the business form itself, but the meta data is attached when the business form is scanned by the MFP 4.

In FIG. 20, an ordinary user accesses the business system 3 from the Web browser 1, and gives instructions for outputting (printing out) the business form. Thereby, under the control of the business system 3, the business form management system 2 creates the business form data based on the business form template stored in the business form template storage part 216 and the data source 304, and outputs the same (Step S11).

The business form data is thus printed out by means of the MFP 4 or the printer 6, via the Web browser 1 or such, or, directly from the business form management system 2 (Step S12).

The thus-printed out business form undergoes modification, adding information thereto, or such, made by a user appropriately (Step S13). It is noted that the modification, adding information thereto, or such, may be carried out by the user at a location near the location at which the business form is thus printed out, or, may be carried out by the user after the business form is sent thereto via mail, by hand, via face mile, or such.

Next, as a business flow after the modification, adding information thereto or such is carried out by the user on the printed out business form, the thus-processed business form is scanned by the MFP 4 (Step S14).

The MFP 4 thus obtains the scanned image of the business form, and also, attaches to the file name of the thus-obtained image, or as a separate file of XML or such, the login user information, the operation date/time, the contents selected on the operating panel 402 by the user (including the template ID indicating the type of the business form), the IP address of the MFP 4 itself, and so forth (i.e., information obtained when the business form is scanned) as the meta data, and then, delivers the same to the scanned data processing system 5 (Step S15).

The scanned data processing system 5 then extracts the meta data from the received data, also transfers the meta data to the meta data processing plug-in 506 to cause it to carry out corresponding predetermined processing (Step S16). In FIG. 20, an item excision processing plug-in for carrying out excision of the item according to the layout information of the business form template obtained from the scanned image, and carrying out input assistance for a user to input information to the business system 3, and a business processing plug-in for carrying out business processing including storage of the scanned image in the business system 3, are shown as an example of the above-mentioned predetermined processing.

It is noted that, in the meta data extracting processing carried out by the scanned data processing system 5, when the business form template should be referred to, an inquiry to the business form management system 2 is made based on the template ID (Step S17).

Figure 21:
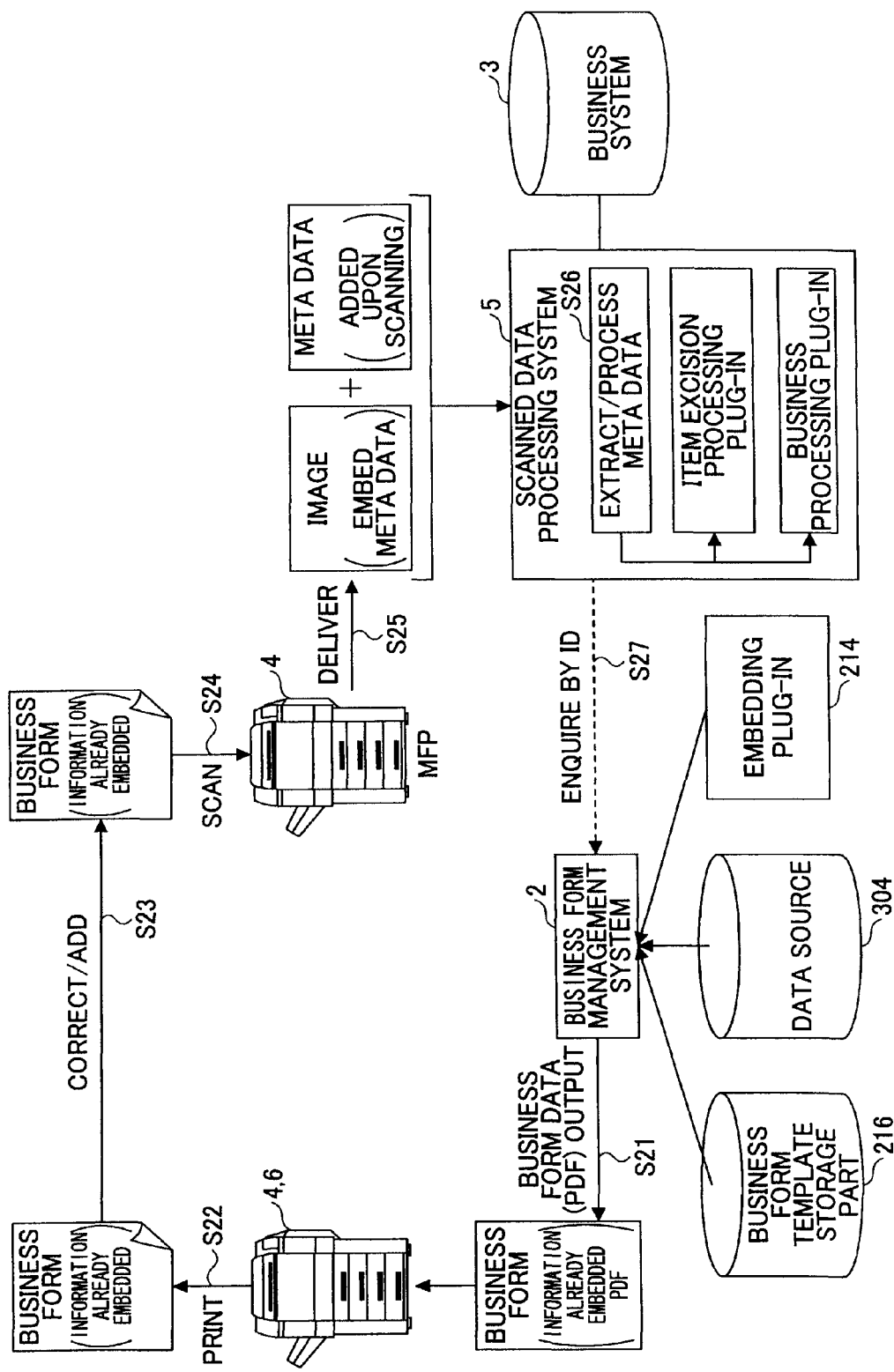

FIG. 21 shows a configuration in which the meta data is embedded in the image of the business form.

In FIG. 21, an ordinary user accesses the business system 3 from the Web browser 1, and gives instructions thereto, for outputting (printing out) the business form. Thereby, under the control of the business system 3, the business form management system 2 creates the business form data based on the business form template stored in the business form template storage part 216 and the data source 304, also creates the meta data, embeds the thus-created meta data in the business form image by means of the embedding plug-in 214, and outputs the same (Step S21).

The business form data is thus printed out by means of the MFP 4, the printer 6, via the Web browser 1 or such, or, directly, from the business form management system 2 (Step S22).

The thus-printed out business form undergoes modification, adding information thereto, or such, by a user appropriately (Step S23). It is noted that the modification, adding information, or such, to the printed out business form, may be carried out at a location near the location at which the business form is thus printed out, or may be carried out by the person after the business form is sent thereto via mail, by hand, via face mile, or such.

Next, as a business flow after the modification, adding information thereto or such is carried out by the user, the thus-obtained business form is scanned by the MFP 4 (Step S24).

The MFP 4 thus obtains the scanned image of the business form, and also, attaches to the file name of the image, or as a separate file of XML or such, the login user information, the operation date/time, the contents selected on the operating panel 402 by the user (including the template ID indicating the type of the business form), the IP address of the MFP 4 itself, and so forth (i.e., information obtained when the business form is scanned) as the meta data, and then, delivers the same to the scanned data processing system 5 (Step S25).

The scanned data processing system 5 then extracts the meta data from the received data (i.e., the scanned image file, the file name, the attached file or such), also transfers the meta data to the meta data processing plug-in 506 to cause it to carry out corresponding predetermined processing (Step S26). In FIG. 21, an item excision processing plug-in for carrying out excision of the item from the business form image according to the layout information of the business form template obtained from the scanned image, and carrying out input assistance to the business system 3, and a busyness processing plug-in for carrying out business processing including storage of the scanned image in the business system 3, are shown as an example of the above-mentioned predetermined processing.

It is noted that, in the meta data extracting processing carried out by the scanned data processing system 5, when the business form template should be referred to, an inquiry to the business form management system 2 is made based on the template ID (Step S27).

Figure 22:
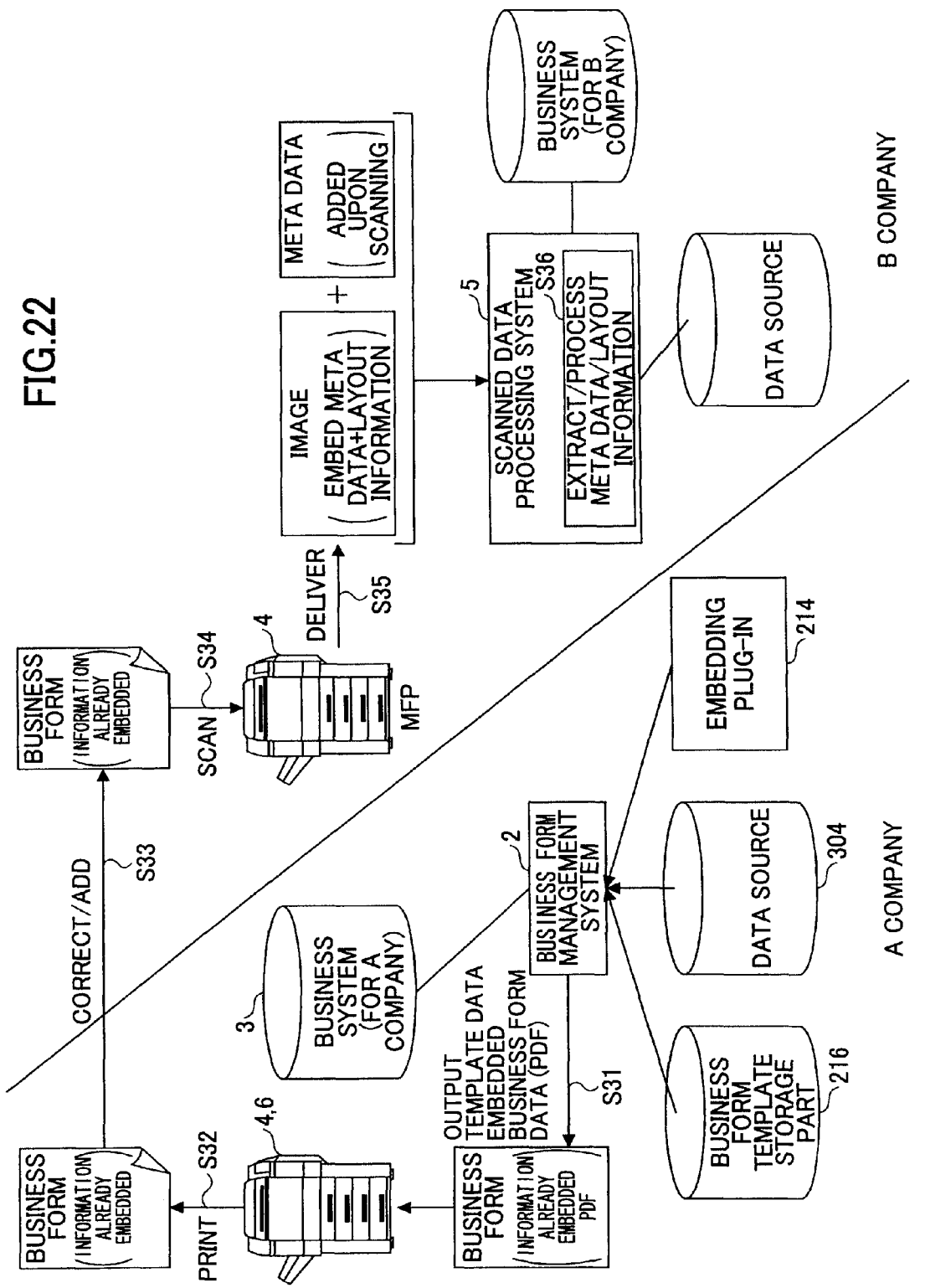

FIG. 22 shows a configuration in which application is made between an A company and a B company having no system connection therebetween. In this configuration, other than the ordinary meta data, the business form layout information is embedded in the business form image.

In FIG. 22, in the A company, an ordinary user accesses the business system 3 from the Web browser 1, and gives instructions thereto, for outputting (printing out) the business form. Thereby, under the control of the business system 3, the business form management system 2 creates the business form data based on the business form template stored in the business form template storage part 216 and the data source 304, also creates the meta data (including the layout information), embeds the thus-created meta data in the business form image by means of the embedding plug-in 214, and outputs the same (Step S31).

The business form data is thus printed out by means of the MFP 4 or the printer 6, via the Web browser 1 or such, or, directly, from the business form management system 2 (Step S32).

The thus-printed out business form is sent to the B company from the A company via mail, by hand, via facsimile or such, and, then, undergoes modification, adding information thereto, or such by the person in the B company appropriately (Step S33).

Next, as a business flow after the modification, adding information thereto or such is carried out by the person of the B company, the thus-obtained business form is scanned by the MFP 4 there (Step S34).

The MFP 4 thus obtains the scanned image of the business form, and also, attaches, to the file name of the image, or as a separate file of XML or such, the login user information, the operation date/time, the contents selected on the operating panel 402 by the user (including the template ID indicating the type of the business form), the IP address of the MFP 4 itself, and so forth (i.e., information obtained when the business form is scanned) as the meta data, and then, delivers the same to the scanned data processing system 5 in the B company (Step S35).

The scanned data processing system 5 then extracts the meta data including the layout information from the received data (i.e., the scanned image file, the file name, the attached file or such), and causes a predetermined plug-in to carry out predetermined processing (Step S36). It is noted that, since the business form layout information can be thus extracted, the B company can carry out excision of the item from the scanned image, or such, without inquiring of the A company therefor.

Figure 23:
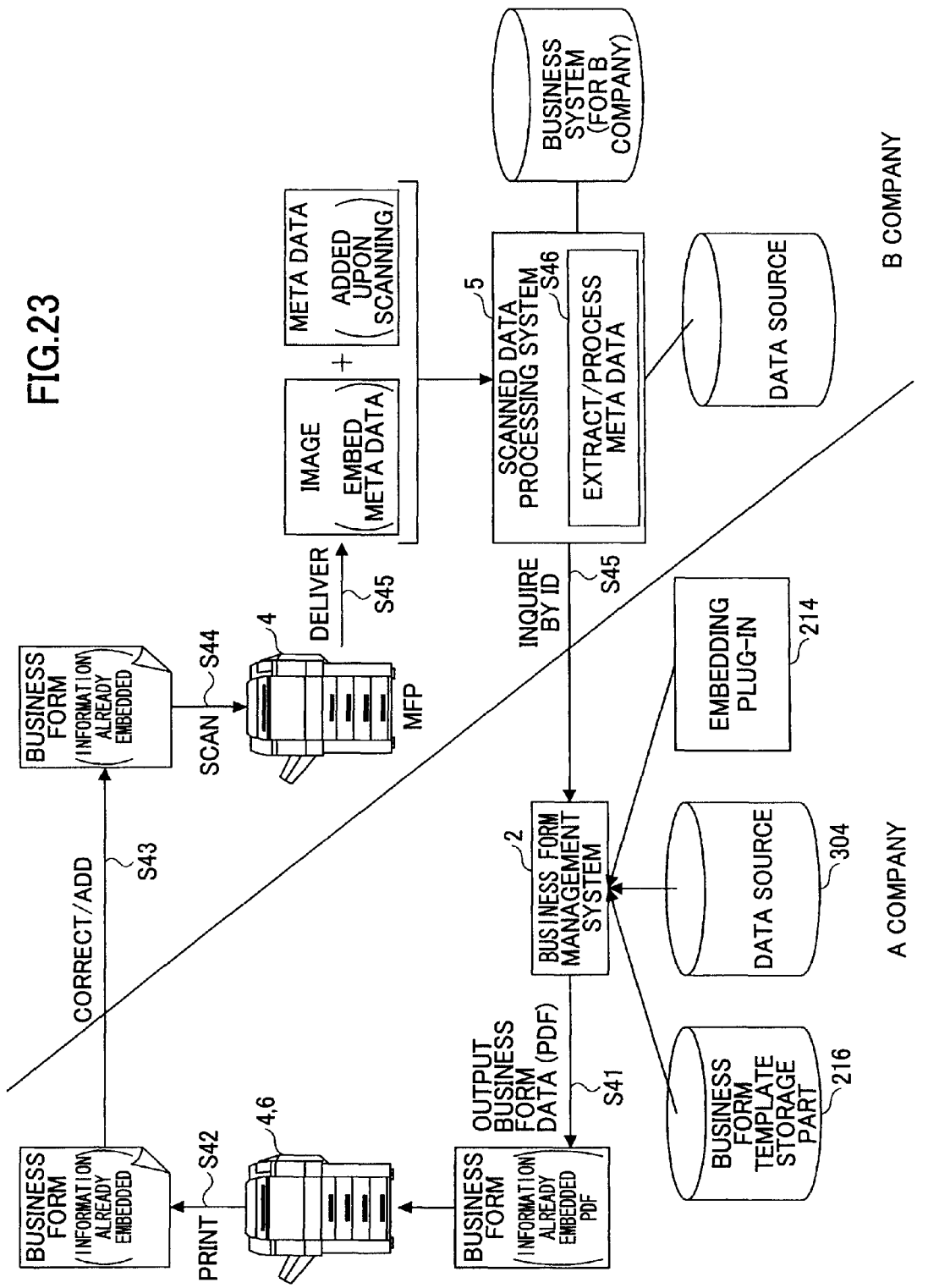

FIG. 23 shows a configuration in which application is made between an A company and a B company, between which, system connection can be made. In this configuration, the template ID of the business form data is embedded as the meta data in the business form image.

In FIG. 23, in the A company, an ordinary user accesses the business system 3 from the Web browser 1, and gives instructions thereto, for outputting (printing out) the business form. Thereby, under the control of the business system 3, the business form management system 2 creates the business form data based on the business form template stored in the business form template storage part 216 and the data source 304, also creates the meta data, embeds the thus-created meta data in the business form image by means of the embedding plug-in 214, and outputs the thus-processed business form (Step S41).

The business form data is thus printed out by means of the MFP 4 or the printer 6, via the Web browser 1 or such, or, directly, from the business form management system 2 (Step S42).

The thus-printed out business form is sent to the B company from the A company via mail, by hand, via facsimile or such, and, then, undergoes modification, adding information thereto, or such, appropriately, by a user in the B company (Step S43).

Next, as a business flow after the modification, adding information thereto or such is carried out, the thus-obtained business form is scanned by the MFP 4 in the B company (Step S44).

The MFP 4 thus obtains the scanned image of the business form, and also, attaches to the file name of the image, or as a separate file of XML or such, the login user information, the operation date/time, the contents selected on the operation panel 402 by the user (including the template ID indicating the type of the business form), the IP address of the MFP 4 itself, and so forth (i.e., information obtained when the business form is scanned) as the meta data, and then, delivers the same to the scanned data processing system 5 (Step S45).

The scanned data processing system 5 then extracts the meta data including the layout information from the received data (i.e., the scanned image file, the file name, the attached file or such), and causes a predetermined plug-in to carry out predetermined processing in the B company (Step S46).

It is noted that, in the meta data extracting processing carried out by the scanned data processing system 5, when the business form template should be referred to, an inquiry to the business form management system 2 is made based on the template ID, to the business form management system 2 of the A company (Step S47).

Figure 24:
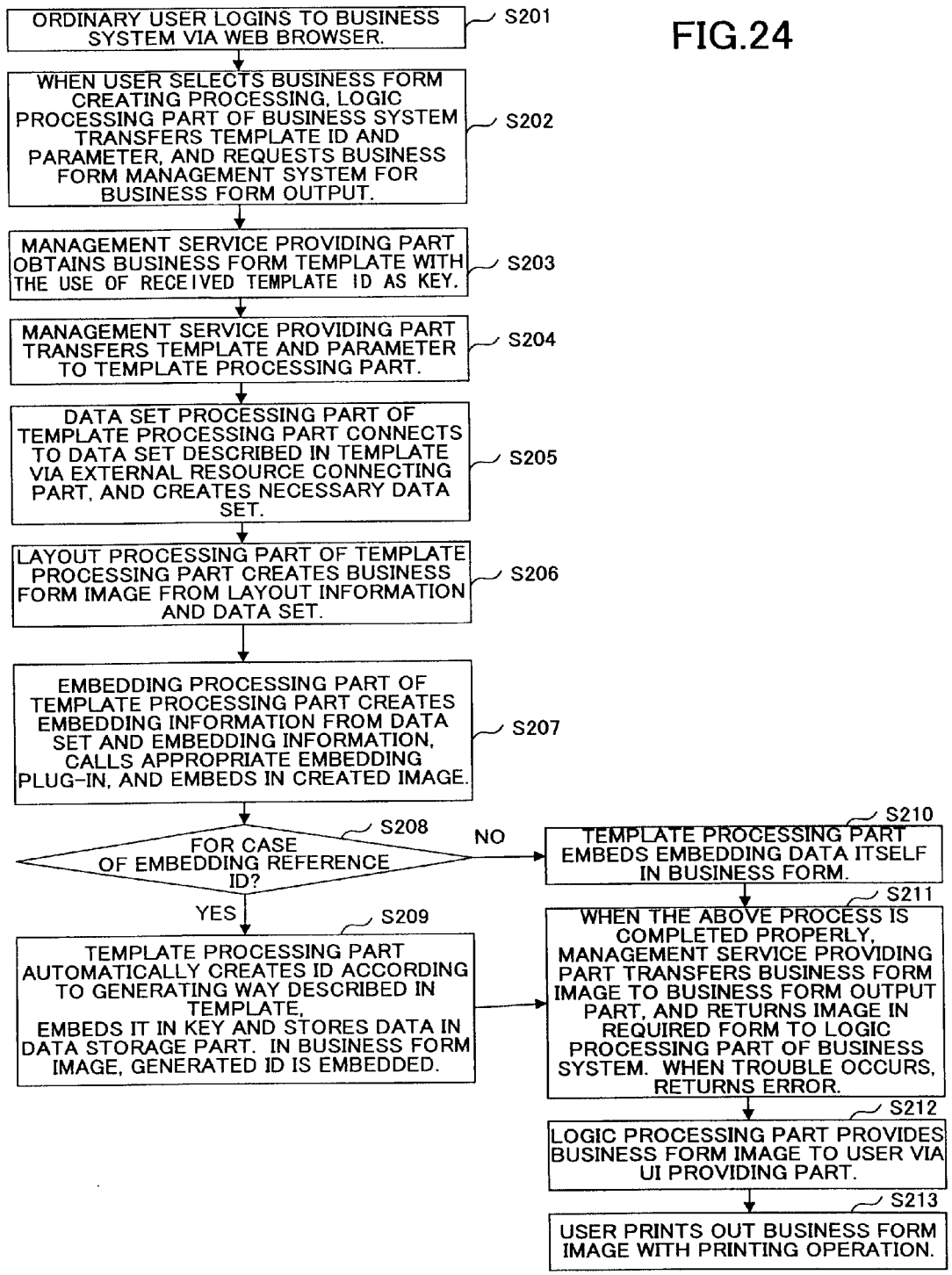
FIG. 24 shows a flow chart of an example of processing of business form creation.

FIG. 24 shows an operation flow chart of an example of processing of the business form creation. In FIG. 24, an ordinary user logins to the business system 3 via the Web browser 1 (Step S201).

When the user selects business form creating processing from the UI, the logic processing part 302 of the business system 3 transfers the template ID and parameter, and requests the business form management system 2 for outputting the business form (Step S202).

The management service providing part 206 of the business form management system 2 obtains the business form template from the template storage part 216 with the use of the thus-received template ID as a key (Step S203).

The management service providing part 206 transfers the thus-obtained template and the parameter, to the template processing part 208 (Step S204).

The data set processing part 209 of the template processing part 208 connects to the data set, described in the template, via the external source connecting part 212, and creates a necessary data set therefrom (Step S205).

The layout processing part 210 of the template processing part 208 creates the business form image according to the layout information and the data set (Step S206).

The embedding processing part 211 of the template processing part 208 generates the embedding data to embed, from the data set and the embedding information, calls the appropriate embedding plug-in 214, and therewith, embeds the thus-generated embedding data in the thus-created image.

At this time, it is determined whether or not this embedding corresponds to the reference ID embedding (Step S208), and, when this embedding corresponds to the reference ID emceeing, the template processing part 208 automatically generates an ID according to a generating method described in the template, and stores the embedding data in the meta data storage part 215 with the use of the thus-generated ID as a key. In the business form image, the generated ID is thus embedded (Step S209).

When the embedding does not correspond to the reference ID embedding, the template processing part 208 embeds the embedding data itself (Step S210).

Then, after the above-mentioned processing is properly finished, the management service providing part 206 transfers the business form image to the business form image outputting part 207, and returns the image to the logic processing part 302 of the business system 2 in a requested form. However, when a trouble occurs, an error is returned thereto instead (Step S211).

The logic processing part 302 provides the business form image to the user via the business UI providing part 301 (Step S212), and the user prints out the business form image from the printer by making corresponding printing operation to the printer (Step S213).

Figure 25:
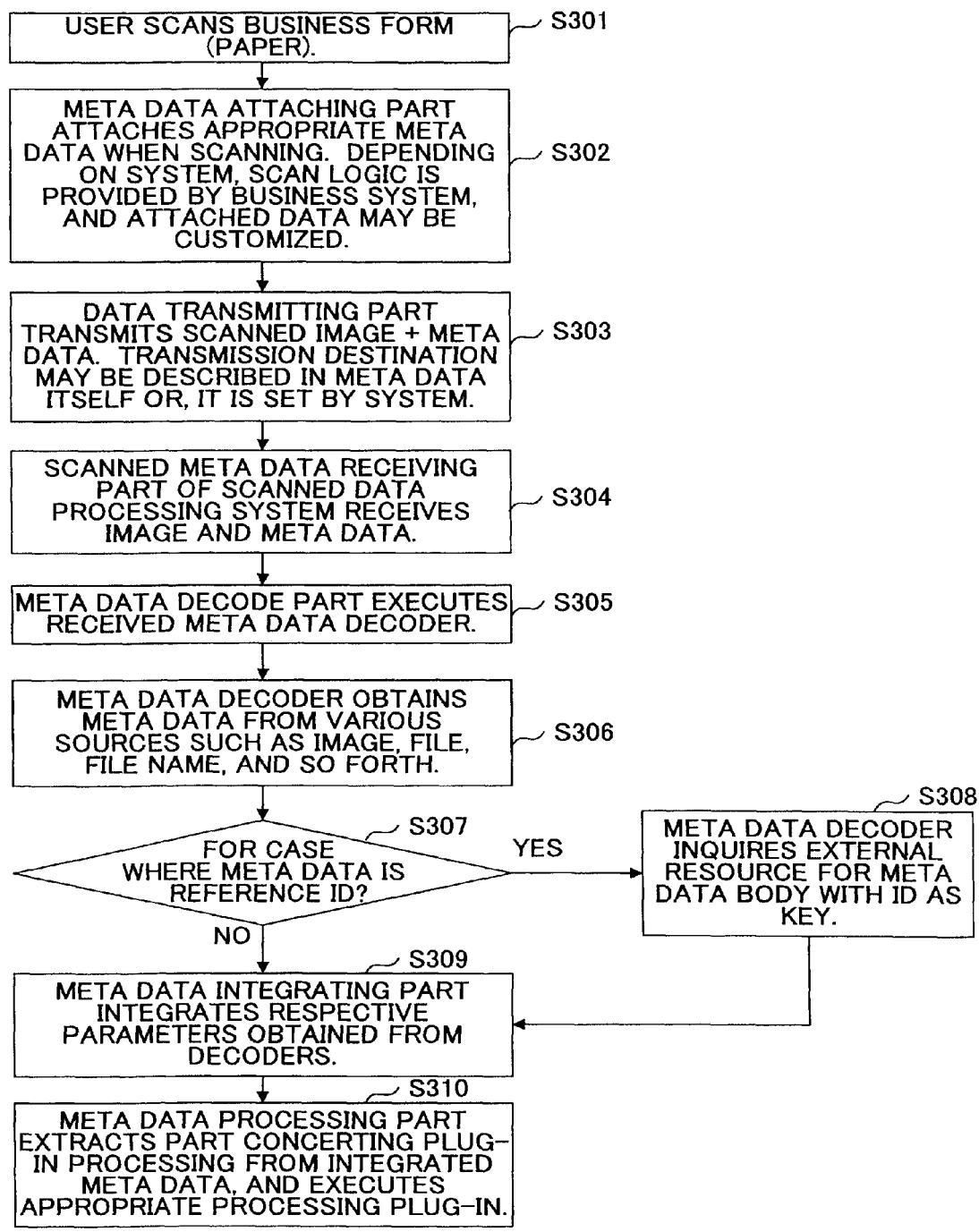
FIG. 25 shows a flow chart of an example of processing of business form scanning and processing the scanned data.
Figure 26:
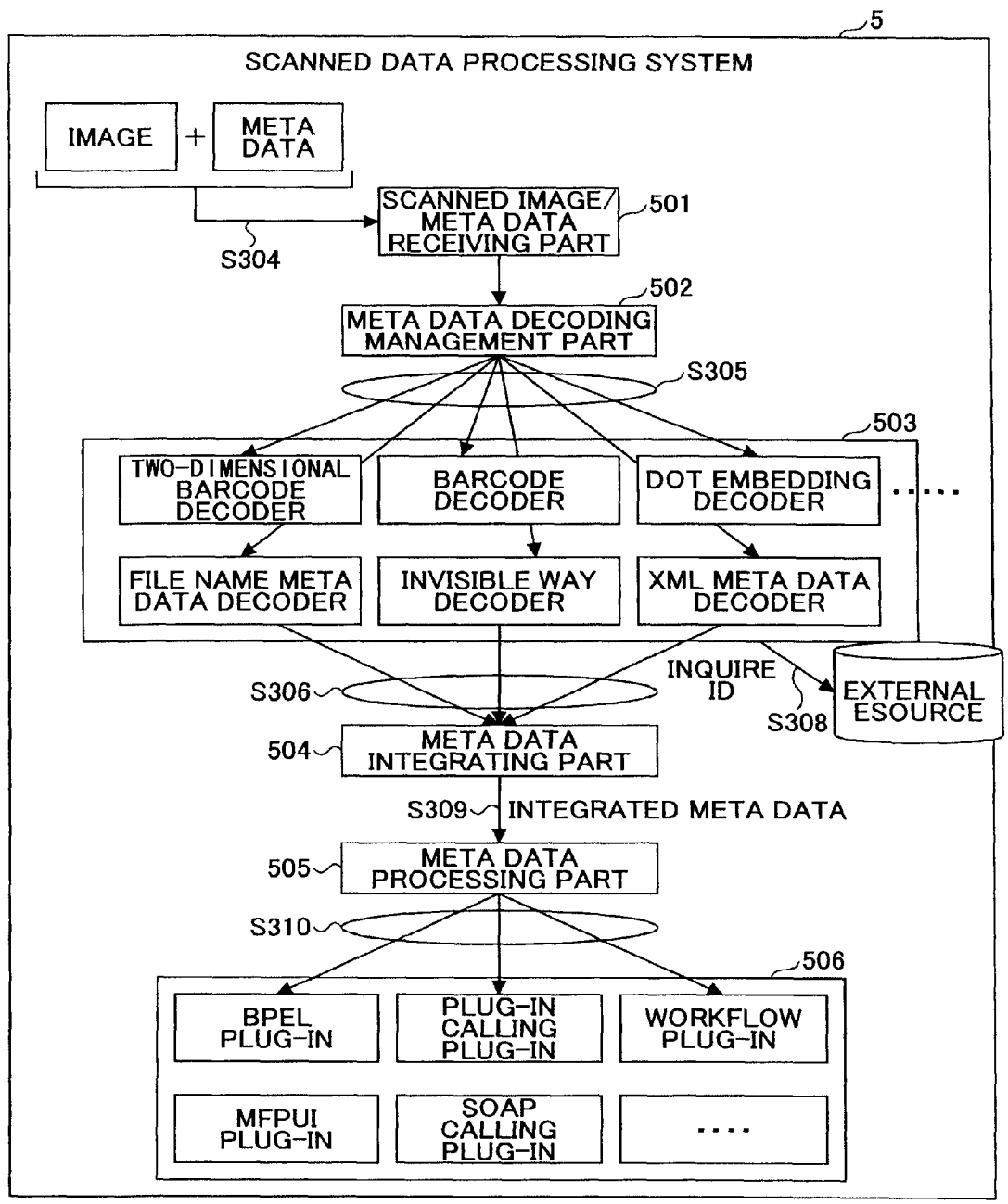
FIG. 26 shows a flow of processing in the scanned data processing system.
Figure 27:
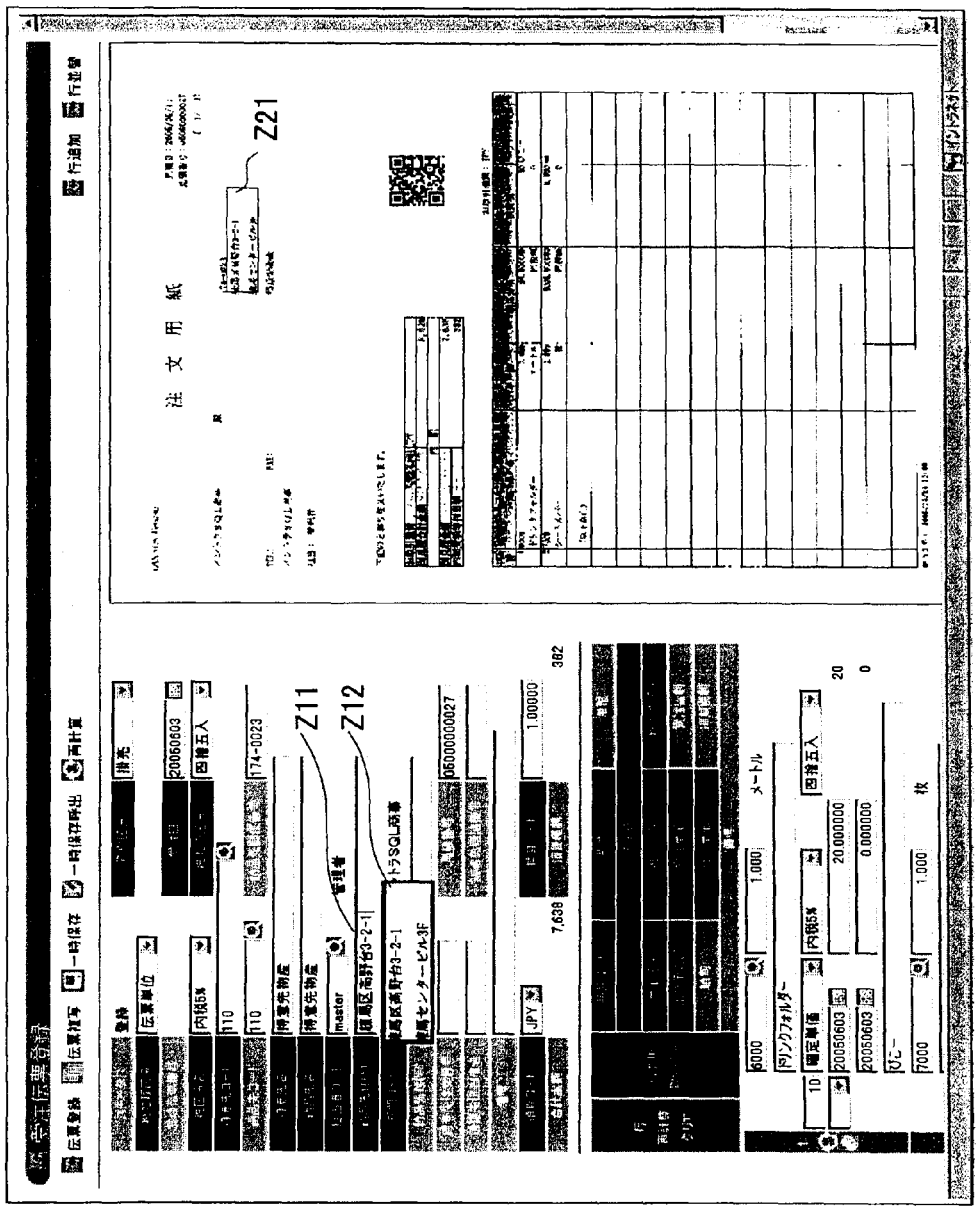
FIG. 27 shows an example of a page in which a reference image is displayed corresponding to an input item for when input to a business system is carried out.
Figure 28:
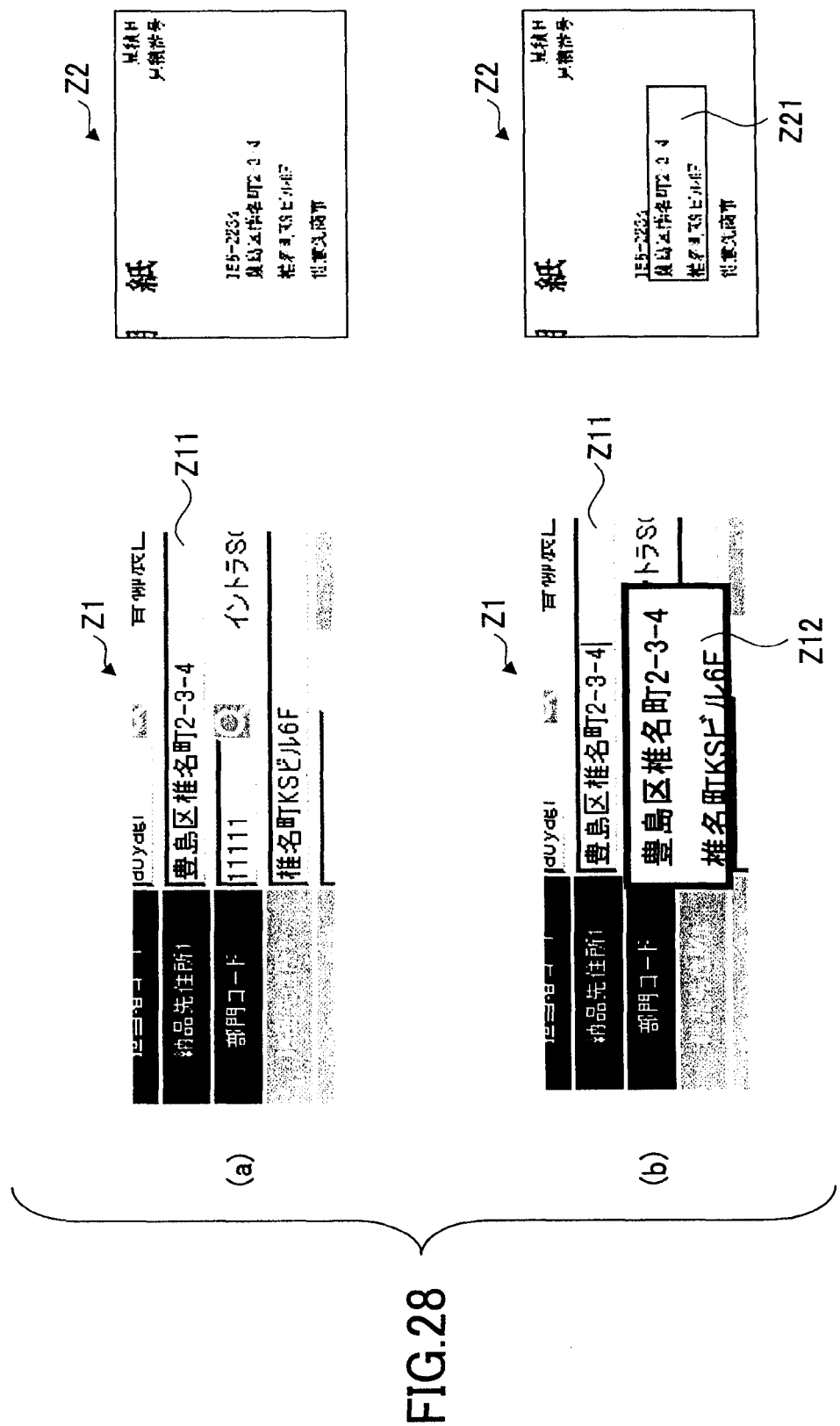
FIG. 28 partially and magnifyingly shows an example of non-display/display of the reference image and a reference source indicating frame.

FIG. 25 shows a flow chart of scanning the business form and processing the scanned data. FIG. 26 shows a flow of processing carried out by the scanned data processing system 5.

In FIG. 25, when a user scans the business form (paper) by means of the MFP 4 (Step S301), the meta data attaching part 407 attaches appropriate meta data when the scanning is carried out (Step S302). Depending on the system, a scanning logic may be provided by the business system, and therewith, the attached data can be customized.

The data transmitting part 408 of the MFP 4 transmits the scanned image as well as the meta data, to the scanned data processing system 5 (Step S303). It is noted that, in some case, the transmission destination may be written in the meta data, or, the same may be set by the system.

The scanned image/meta data receiving part 501 of the scanned data processing part 5 receives the scanned image and the meta data from the MFP 4 (Step S304).

The meta data decoding management part 502 executes the registered corresponding meta data decoder 503 (Step S305).

The meta data decoder 503 thus obtains the meta data from various sources such as the scanned image, the file, the file name, or such (Step S306).

At this time, it is determined whether or not the meta data is the reference ID (Step S307). When the meta data is the reference ID, the meta data decoder 503 inquires of the external resource the meta data body with the use of the reference ID as a key (Step S308).

After that, the meta data integrating part 504 integrates the respective meta data, thus obtained from the meta data decoder 503 (Step S309).

Then, the meta data processing part 505 extracts a part concerning the processing of the plug-in, from the thus-integrated meta data, and executes the corresponding meta data processing plug-in (Step S310).

A second embodiment of the present invention will now be described.

Figure 30:
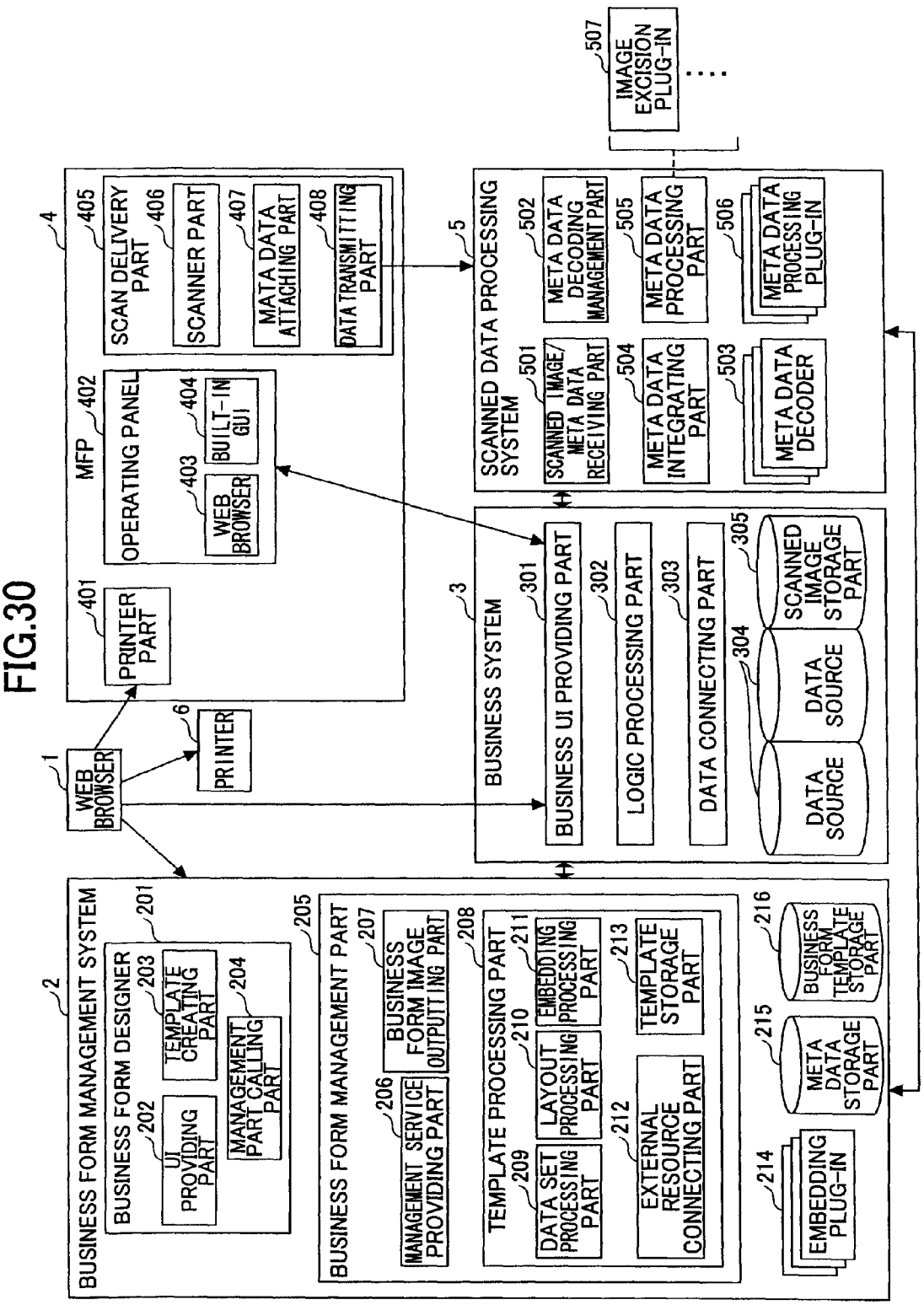
FIG. 30 shows an example of a configuration of an input assistance scan solution system in a second embodiment of the present invention.

FIG. 30 shows an example of a configuration of an input assistance scan solution system according to the second embodiment of a scan solution system according to the present invention. In FIG. 30, the input assistance scan solution system includes a Web browser 1 acting as a client a user operates; a business form management system 2 generating the business form data; a business system 3 managing a business including issuance of the business form and reception of the same; an MFP (Mufti-function printer) 4 carrying out printing out of the business form and scanning of the same; a printer 6 carrying out printing out of the business form; and a scanned data processing system 5 carrying out predetermined processing based on a scanned image delivered from the MFP 4 and meta data (described later).

The business form management system 2 includes a business form designer 201 carrying out design of the business form according to an operation made by a business management user; a business form management part 205 carrying out management of the business forms; an embedding plug-in 214 executing embedding of the meta data in the business form image; a meta data storage part 215 holding the meta data embedded in the business form image; and a business form template storage part 216 holding the business form template. The business form designer 201 includes a UI providing part 202 providing a UI; a template creating part 203 creating the business form template; and a management part calling part 204 calling the business form management part 205 for processing various sorts of inquiries or registration of the created business form template. The business form management part 250 includes a management service providing part 206 providing a business form management service; a business form image outputting part 207 outputting the created business form data in a form of a PDF (Portable document file) or such; a template processing part 208 carrying out processing of generating the business form according to the business form template; an external resource connecting part 212 connecting to an external resource for including data of the external resource in the business form; and a template storage part 213 storing the business form template created by the business form designer 210 in the business form template storage part 216. The template processing part 208 includes a data set processing part 209 carrying out processing of a data set which is used as a source of data included in the business form; a layout processing part 210 carrying out layout processing for respective items of the business form; and an embedding processing part 211 carrying out embedding data in the business form in various sorts of manners such as that for a two-dimensional barcode (QR code) or such.

The business system 3 includes a business UI providing part 301 providing a business UI; a logic processing part 302 carrying out data processing according to a logic in line with business contents; a data connecting part 303 connecting to a data storage inside or outside of the system; a data source 304 such as various sorts of databases; and a scanned image storage part 305 storing scanned images of the business forms.

The MFP 4 includes a printer part 401 carrying out printing out of the business form; an operating panel 402 a user operates; and a scan delivery part 405 carrying out scanning of the business form and delivery of the scanned image and meta data. The operating panel 402 has a Web browser 403 displaying a UI (user interface); and a built-in GUI (Graphical user interface) 404. The scan delivery part 405 includes a scanner part 406 scanning the business form; a meta data attaching part 407 attaching various sorts of information (login user information, operation date/time, selected contents from the operating panel 402, an IP address of the MFP 4 or such, as will be described later) upon scanning, to a file name of the scanned image as the meta data, or attaching the same in a separate file of XML (extendible markup language) or such; and a data transmitting part 408 transmitting the scanned image and the meta data to the scanned data processing system 5.

The scanned data processing part 5 includes a scanned image/meta data receiving part 501 receiving the scanned data or the meta data from the MFP 5; a meta data decoding management part 502 managing decoding of the meta data which is embedded in the scanned image or the file name, or, attached in a form of a separate file; a meta data decoder 503 including various types of decoders for decoding, such as a two-dimension barcode decoder, a barcode decoder, a dot embedding decoder; a file name meta data decoder, an invisible way decoder, an XML decoder and so forth; and a meta data integrating part 504 integrating the meta data decoded by the various types of decoders. Further, the scanned data processing system 5 includes a meta data processing part 505 carrying to predetermined processing corresponding to the thus-integrated meta data; and a meta data processing plug-in 506 including various types of plug-ins, for actually executing the predetermined processing on corresponding to the meta data. In the second embodiment, in particular, an image excision plug-in 507 has functions to excise an item image part from the scanned business form image according to the layout information, and to correct a displacement of the scanned image if any.

It is noted that, layout of the respective parts shown in FIG. 30 may be flexibly changed depending on the environment if necessary. For example, the embedding plug-in 214, the meta data storage part 215, the business form template storage part 216, the data source 304, the scanned image storage part 305, the meta data decoded 503, and the meta data processing plug-in 506 may be separated from the respective systems, and may be located in other systems, respectively. Further, the scanned data processing system 5 and the scanned image storage part 305 may be located in the MFP 4. Further, the scanned data processing system 5 may be located in the businesses system as a component thereof.

Figure 31:
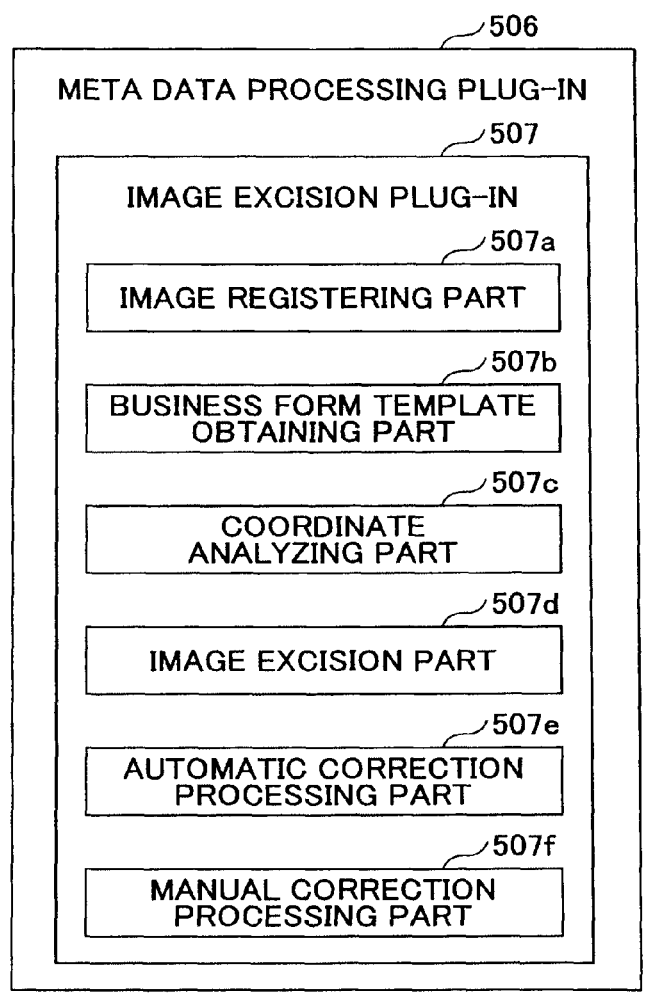

FIG. 31 shows an example of a configuration of the image excision plug-in 507 included in the meta data processing plug-in 506. In FIG. 31, the image excision plug-in 507 includes an image registering part 507a registers the scanned image of the business form obtained from a calling part and an item image excised from the business form; a business form template obtaining part 507b obtaining the business form template; a coordinate analyzing part 507c analyzing for an excising coordinate from which the image part is excised from the business form according to the thus-obtained business form template; an image excising part 507d excising the image part, i.e., the item image from the scanned image of the business form; an automatic correction processing part 507e automatically correcting a displacement if any included in the scanned image of the business form; and a manual correction processing part 507f for a user to manually correct a displacement if any included in the scanned image of the business form.

Figure 32:
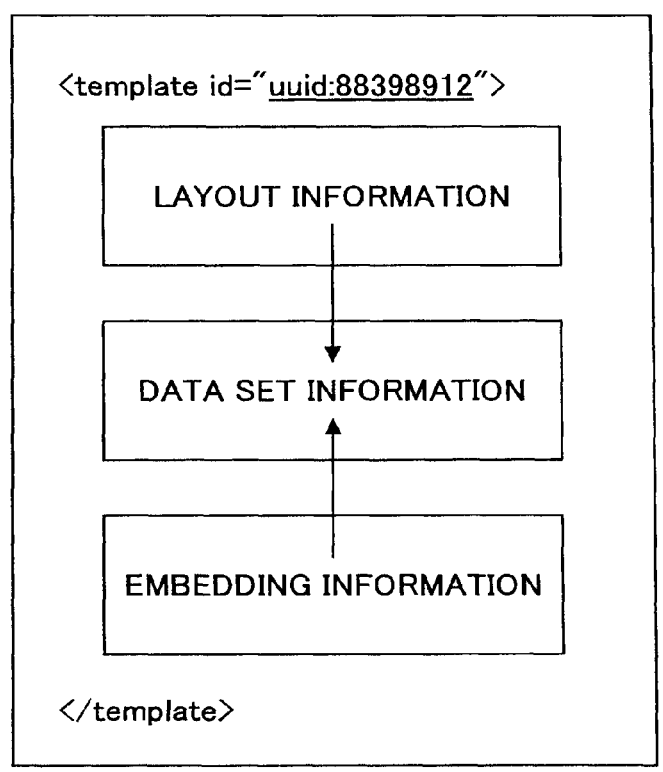
FIG. 32 shows an example of a business form template.

FIG. 32 shows an example of the business form template managed by the business form management system 2. in FIG. 32, the business form template includes the layout information for internally referring to the data set information and designating a location of each item; the data set information for dynamically generating a data value by connecting to the data source; and embedding information for supporting various types of embedding formats, and describing the embedding meta data. It is noted that, the embedding information may be configured in such a manner that it merely refers to the data set information.

Figure 33:
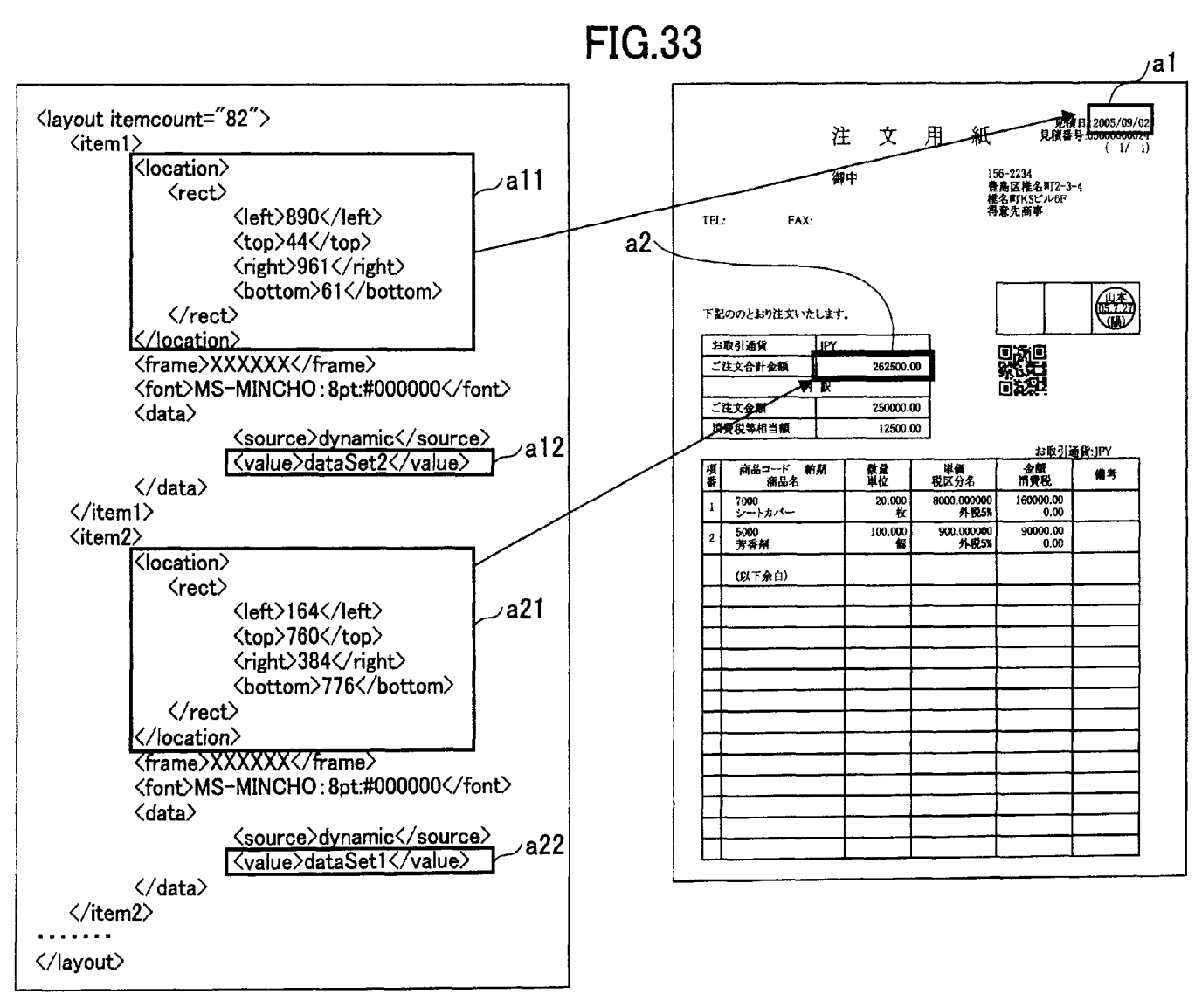

FIG. 33 shows an example of the layout information. The left side shows the layout information, and the right side shows a corresponding business form. In this example, a position corresponding to an item a1 of the business form and the data set to refer are described by a11 and a12, respectively, and a position corresponding to an item a2 of the business form and the data set to refer are described by a21 and a22, respectively.

Figure 34:
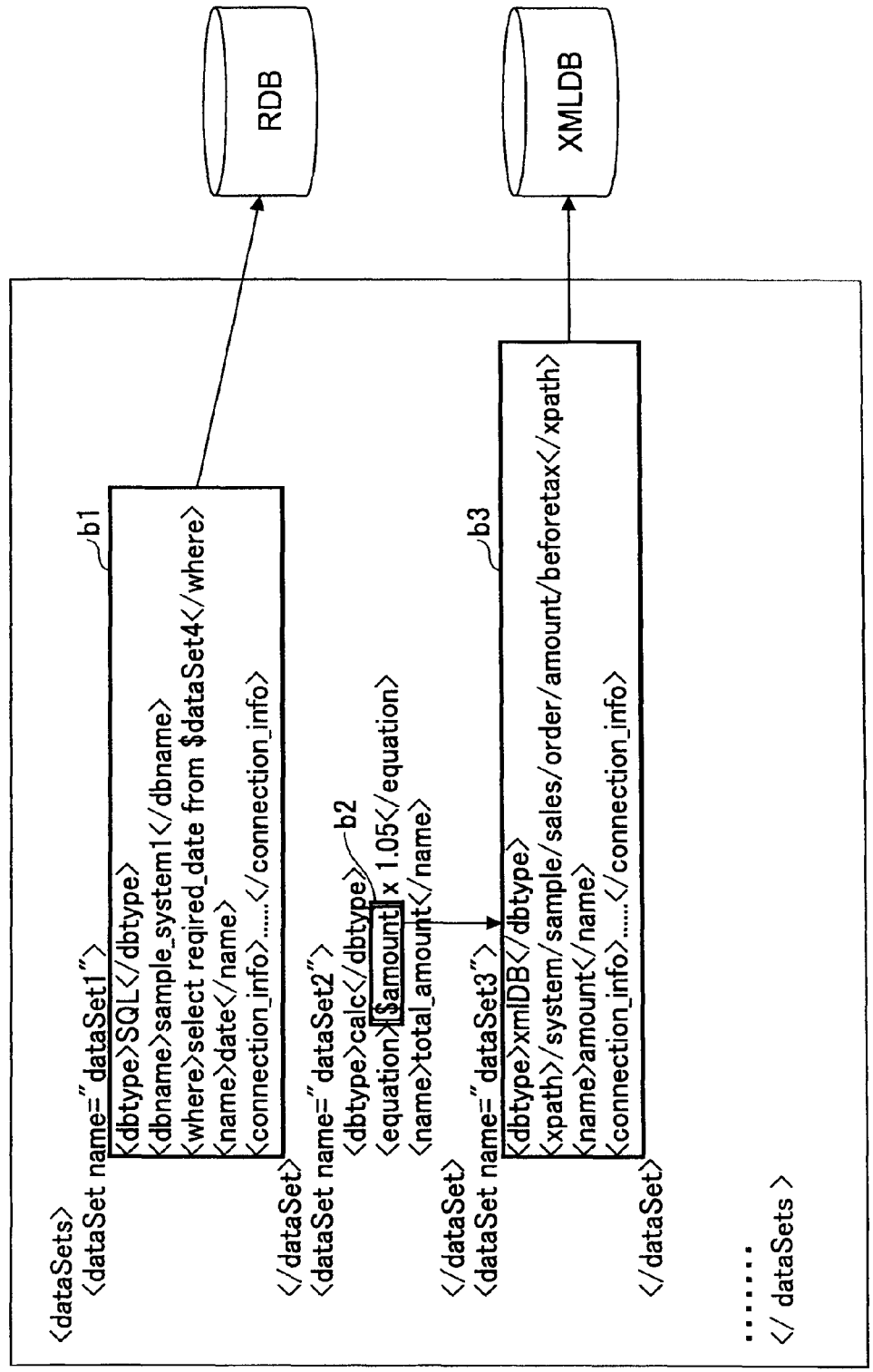
FIG. 34 shows an example of data set information.

FIG. 34 shows an example of the data set information, which includes a description b1 for referring to an external RDB (Relational database), a description b3 for referring to an external XMLDB, and a description b2 for referring to the data set from the description b3.

FIG. 35 shows an example of the embedding information, which includes a description c1 indicating an encode type; a description c2 indicating a location to embed; a description c3 indicating a type of the embedding data (ID, raw text, parameter and so forth); and a description c4 indicating the embedding data itself. It is noted that, a description c41 included in the embedding data c4 is a description for referring to the data set.

FIG. 36 shows another example of the business form template, which includes the layout information and the data set information, but does not include the embedding information itself.

Figure 37:
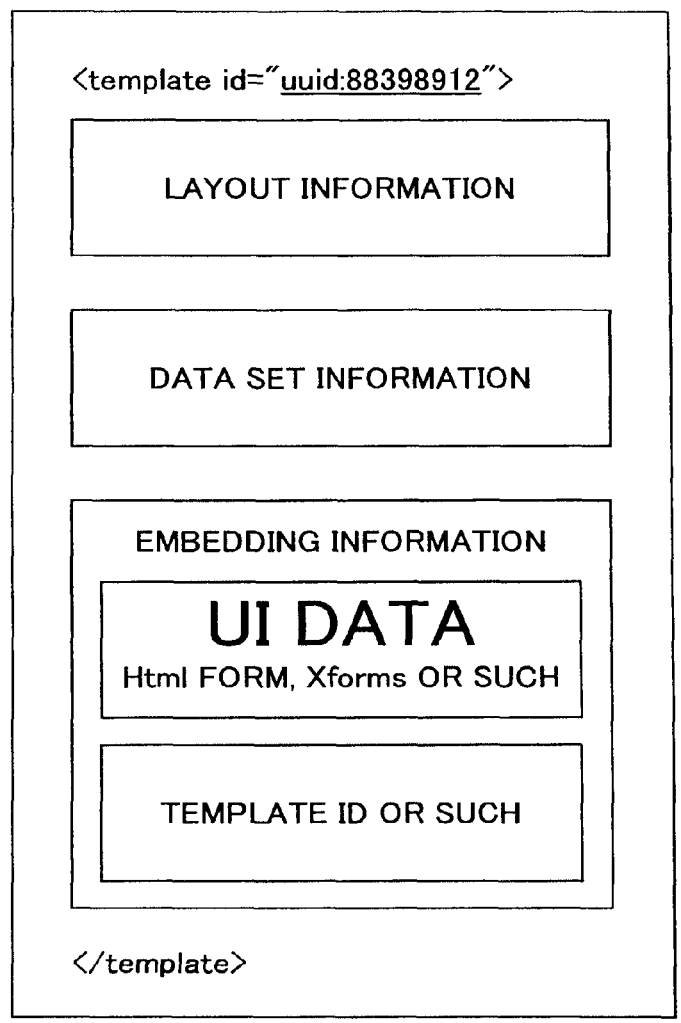
Figure 38:
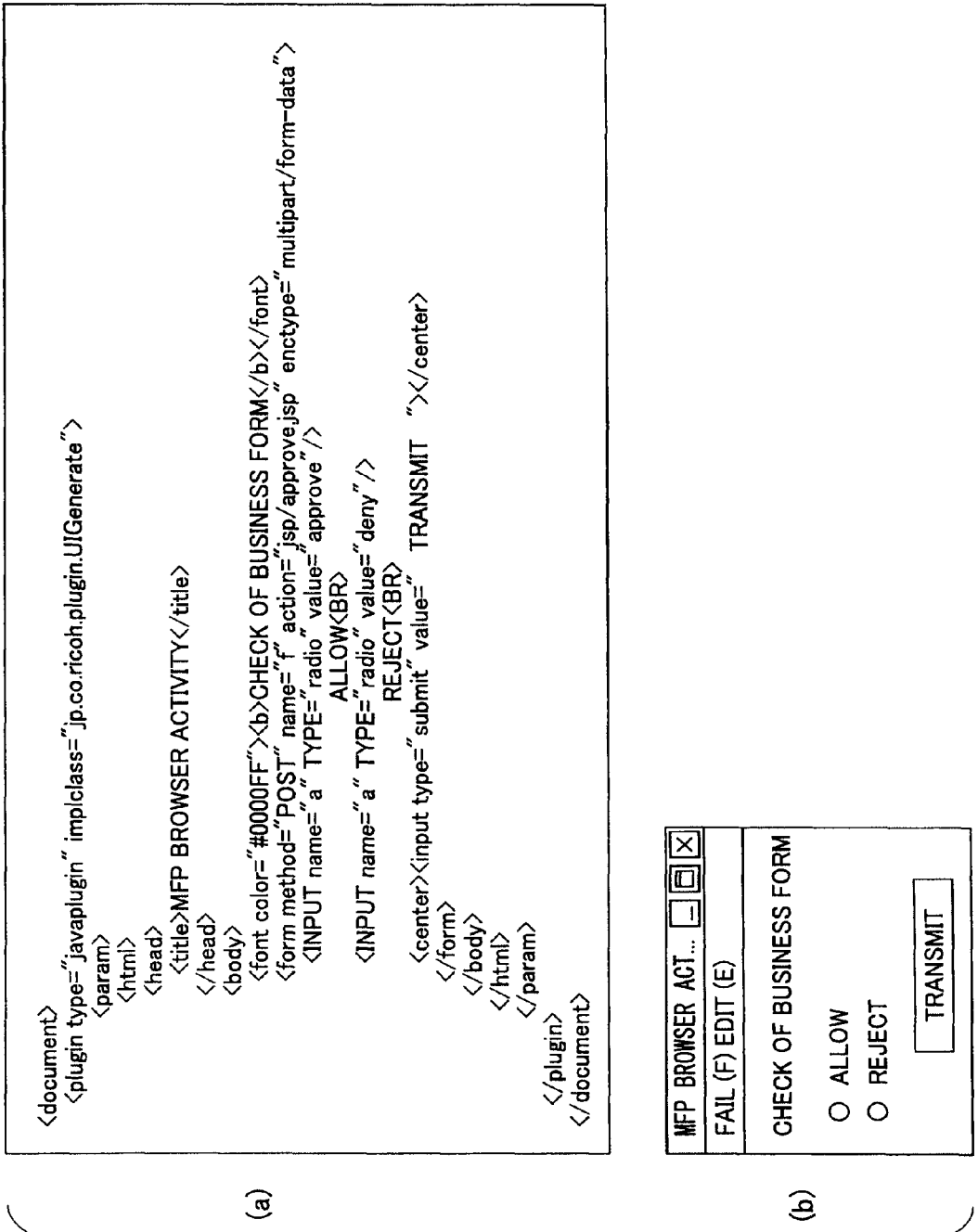
FIG. 38 shows an example of UI data.

FIG. 37 shows further another example of the business form template, which included the layout information, the data set information and the embedding information. However, as the embedding information, UI data of an Html (Hyper text markup language) form, an Xforms or such, a template ID, and so forth, are included. FIG. 38 (a) shows an example of the UI data, and FIG. 38 (b) shows an UI displayed based on the UI data of FIG. 38 (a).

Below, operation of the second embodiment will be described.

Figure 39:
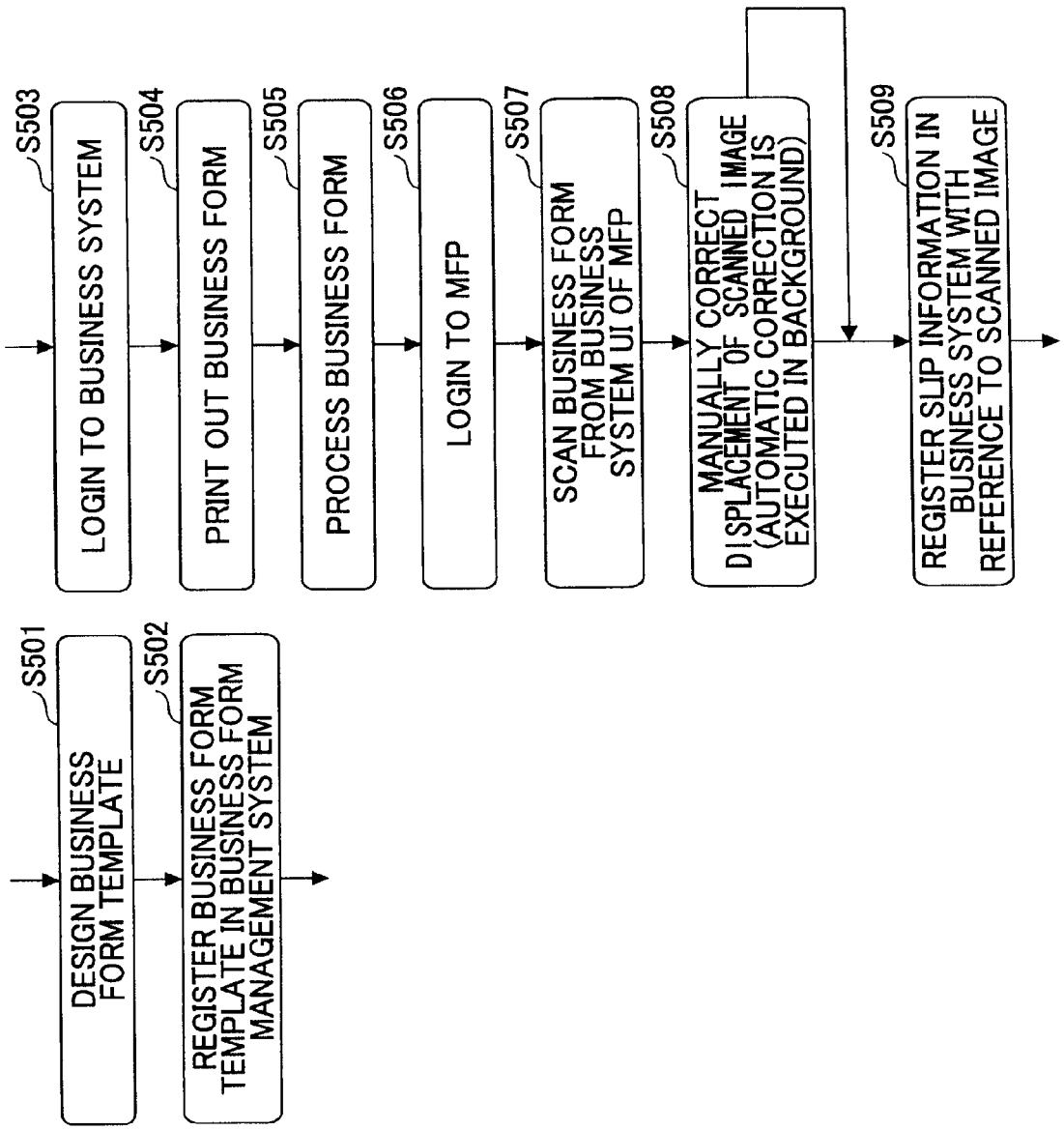
FIG. 39 shows a general flow of user's operation in the input assistance scan solution system.

FIG. 39 shows a general flow of an operation carried out by a user in the input assistance scan solution system. In FIG. 39, first, when creating the business form template, the business management user carries out design of the business form template with the use of the business form designer 201 of the business form management system 2 (Step S501), the thus-created business form template is registered in the business form template storage part 216 of the business form management system 2 (Step S502), and thus, the business form template is created.

On the other hand, as in processing including printing out of the business form, an ordinary user logins to the business system 3 (Step S503), and prints out the business form (Step S504).

After that, on the thus-printed-out business form, the user carries out processing such as modification, adding information thereto or such (Step S505). In this case, the user who carries out the processing such as modification, adding information thereto or such, may be a person other than the person who has thus printed out the business form.

Next, as a business flow after the modification, adding information thereto or such has been carried out, the user logins to the MFP 4 (Step S506), and scans the thus-processed business form, according to the business system UI provided on the MFP 4 (Step S507).

After that, a displacement of the scanned image thus obtained, if any, is corrected manually (Step S508). It is noted that the automatic correction is carried out in the background automatically.

Then, with viewing the scanned image and an image part excised therefrom for an item unit, the user registers the corresponding business form information (Step S509).

Figure 40:
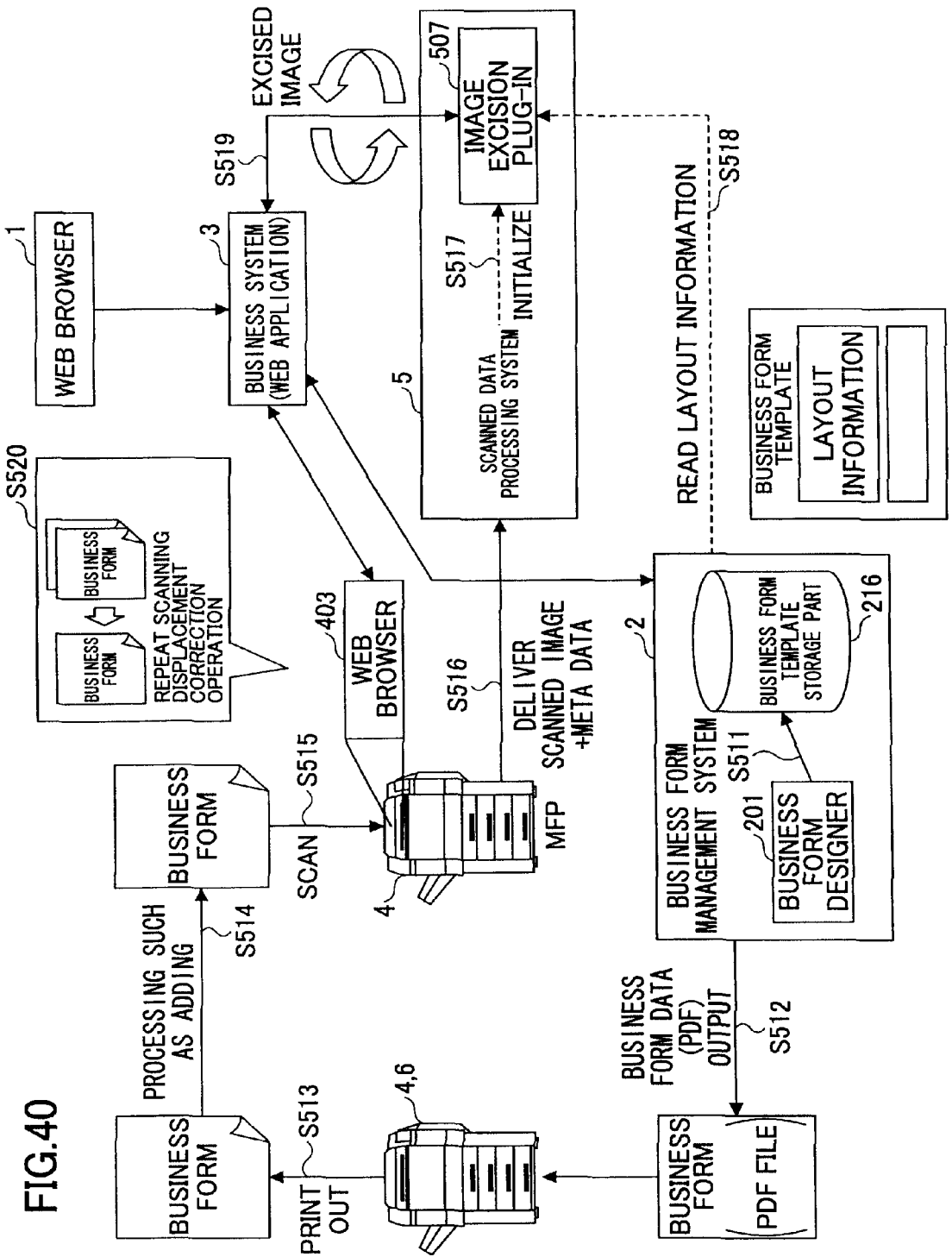
FIG. 40 shows a general configuration of processing of the input assistance scan solution system.

FIG. 40 generally shows processing of the input assistance scan solution system in the second embodiment. In FIG. 40, the business management user creates the business form template with the use of the business form designer 201 of the business form management part 2, and stores the thus-created business form template in the business form template storage part 216 (Step S511).

Next, an ordinary user accesses the business system 3 from the Web browser 1, and gives instructions for outputting (printing out) the business form. Thereby, under the control of the business system 3, the business form management system 2 then generates the business form data and generates the meta data based on the business form template stored in the business form template storage part 216 and the data source 304, and outputs the same (Step S512).

The business form data is thus printed out by means of the MFP 4 or the printer 6, via the Web browser 1 or such, or, directly from the business form management system 2 (Step S513).

The thus-printed out business form undergoes modification, adding information thereto, or such, appropriately carried out by a user (Step S514). It is noted that the modification, adding information thereto, or such, may be carried out by the user at a location near the location at which the business form is thus printed out, or may be carried out by a person after the business form is sent thereto via mail, by hand, via face mile, or such.

Figure 41:
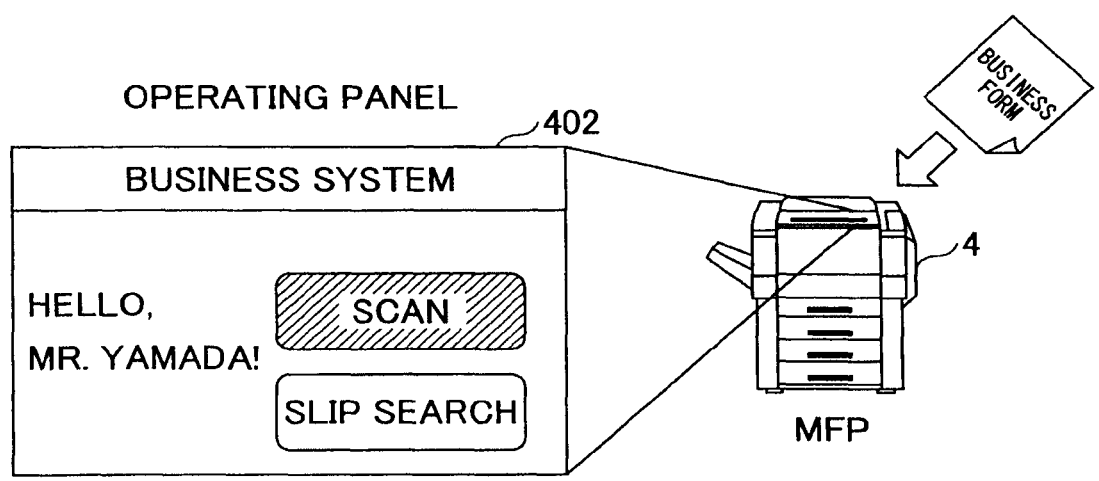
FIGS. 41 and 42 show examples of an interface page when scanning is carried out by an MFP.
Figure 42:
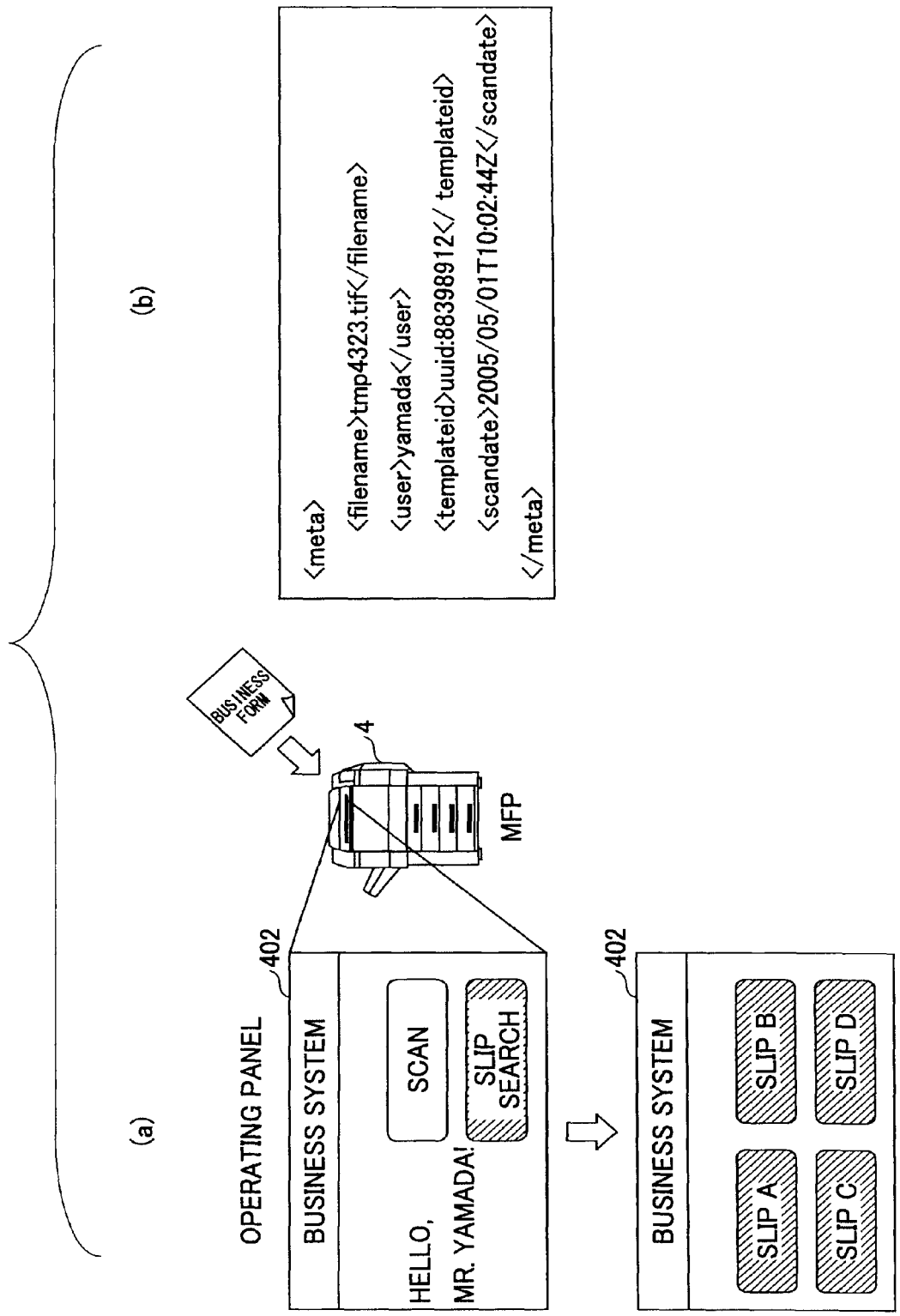

Next, as a business flow carried out after the modification, adding information thereto or such is carried out, the thus-obtained business form is scanned by the MFP 4 (Step S515). At this time, the Web browser 403 connects to the business system 3, and displays an interface image according to the business flow. FIG. 41 shows an example of the interface page displayed when the scanning is carried out from the MFP 4. When the business form is of such a type that the meta data (such as the template ID) is included (corresponding to FIG. 32 or 35), the scanning can be executed only as a result of the user selecting a 'scan' button from the operating panel 402. FIG. 42 (*a*) shows another example of the interface page displayed when the scanning is carried out from the MFP 4, and, for when the business form is of such a type that the meta data is not included (corresponding to FIG. 36), the page is changed into a page for selecting a slip type when the user selects 'slip search' button from the operating panel 402, and then, the scanning can be executed as a result of the user selecting from this page a corresponding type. The thus-selected type is then included in the data to be delivered to the scanned data processing system 5 from the MFP 4 as the meta data, as shown in FIG. 42 (*b*).

Return to FIG. 40, the MFP 4 thus obtains the scanned image of the business form, and also, attaches to the file name of the scanned image, or as a separate file of XML or such, the login user information, the operation date/time, the contents selected on the operation panel 402 by the user (including the template ID indicating the type of the business form), the IP address of the MFP 4 itself, and so forth, as the meta data, and then, delivers the same to the scanned data processing system 5 (Step S516).

The scanned data processing system 5 then extracts the meta data from the received data (i.e., the scanned image data, the file name, the attached file or such), also transfers the scanned image and the meta data to the image excision processing plug-in 507, and initializes the same, whereby causing this plug-in to carry out image excision processing (Step S517).

Figure 43:
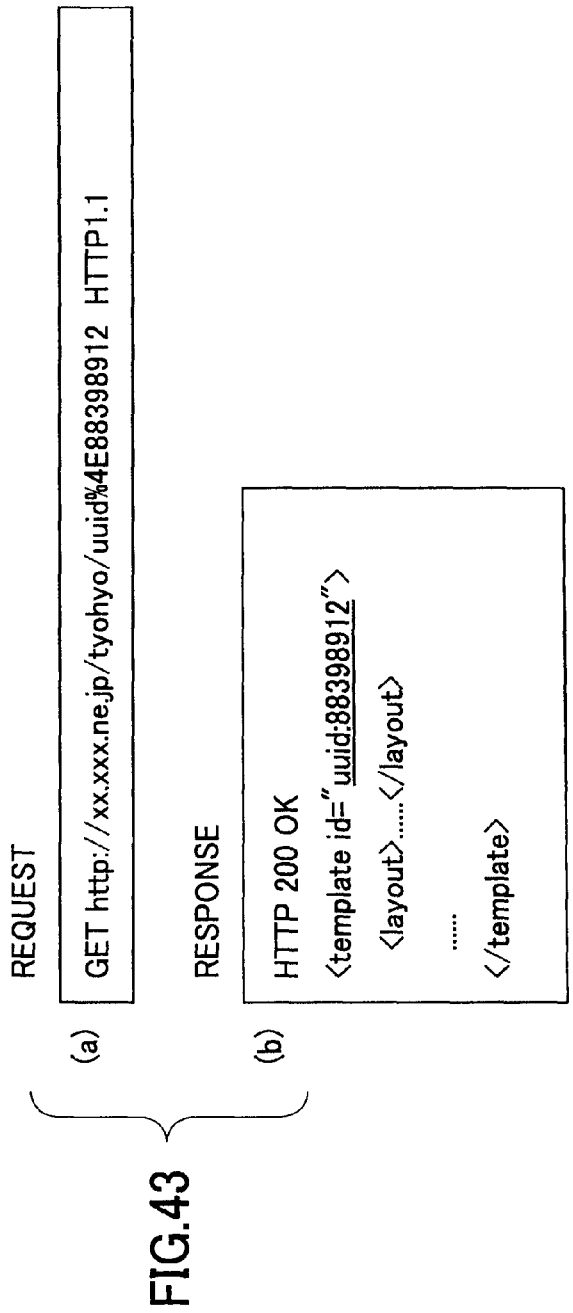
FIG. 43 shows an example of an inquiry for the business form template including the layout information by means of an ID.
Figure 44:
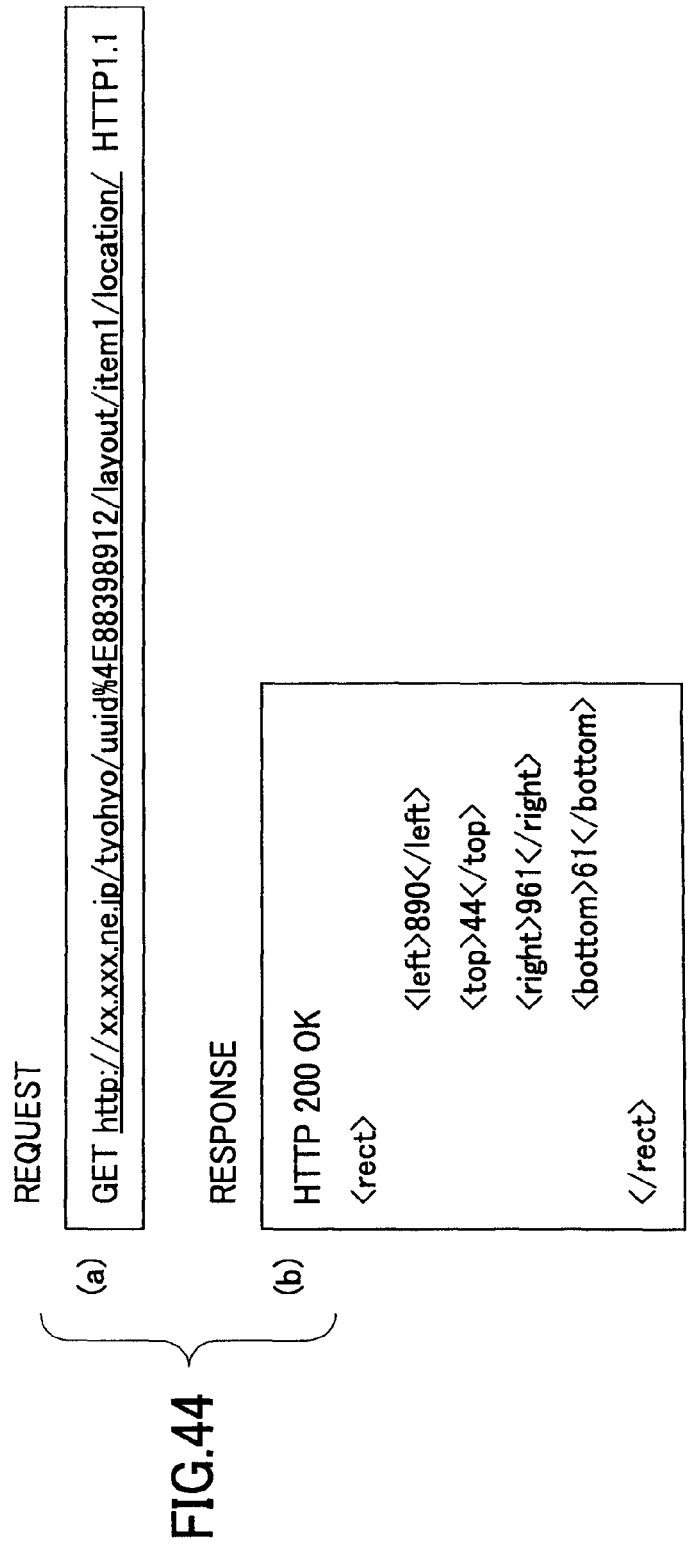
FIG. 44 shows an example of an inquiry for an item coordinate by means of an ID.

It is noted that, in the meta data extracting processing carried out by the scanned data processing system 5, when the business form template should be referred to, an inquiry of the business form management system 2 is made based on the template ID (Step S518). FIG. 43 shows an example of inquiring the business form template including the layout information, with the use of the ID. FIG. 43 (*a*) shows an example of the request in HTTP (Hyper text transfer protocol) and FIG. 43 (*b*) shows an example of the response thereto. It is also possible to inquire only corresponding coordinate information by designating the item of the business form without inquiring the entirety of the business form template itself. FIG. 44 shows an example of the item coordinate inquiry with the use of the ID. FIG. 44 (*a*) shows an example of the request in HTTP (Hyper text transfer protocol) and FIG. 44 (*b*) shows an example of the response thereto.

Figure 45:
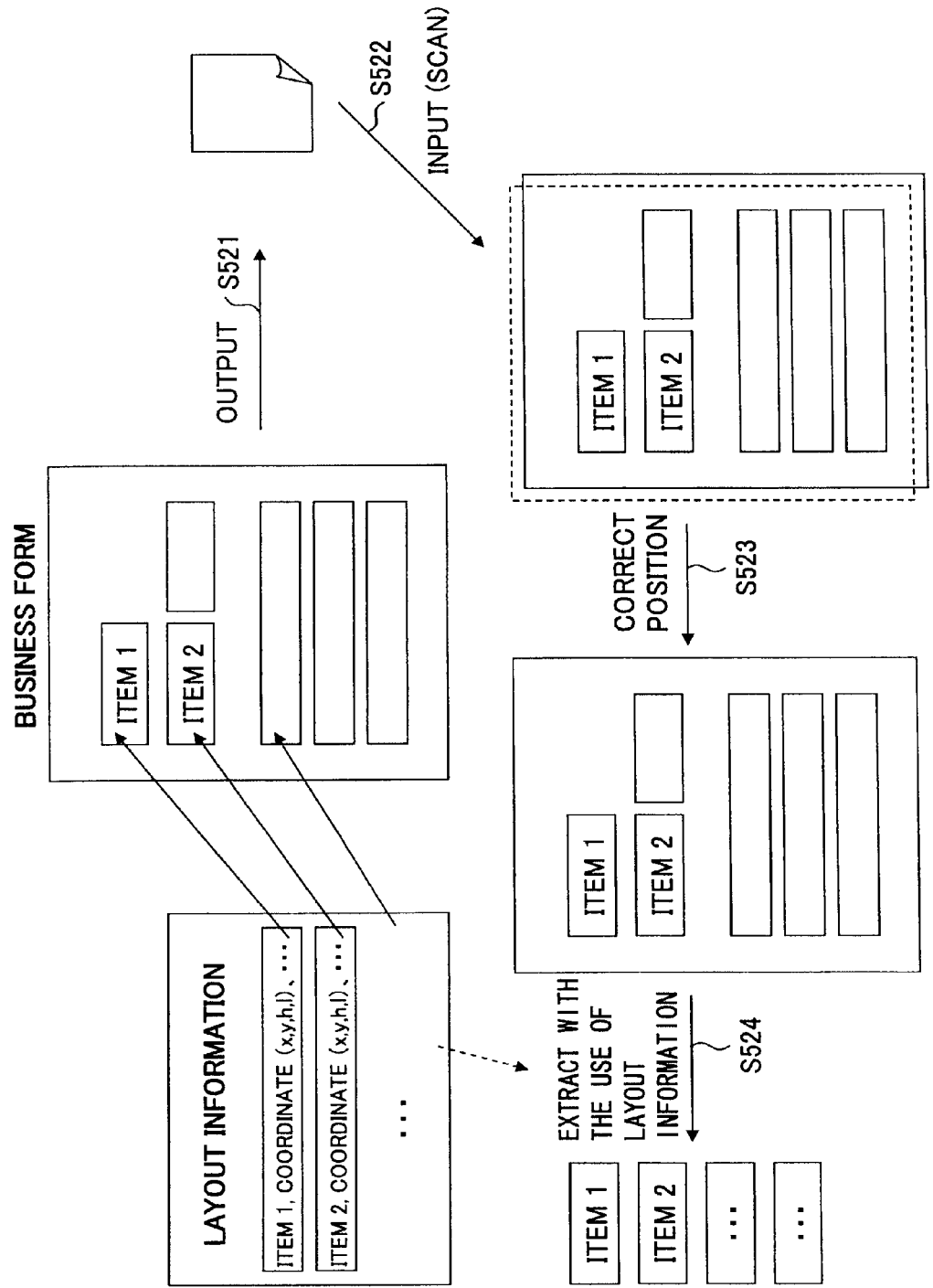

Return to FIG. 40, the image excision plug-in 507 automatically corrects the displacement in the scanned image, after that the item image is excised from the scanned image based on the coordinate information, and the excision result is informed of to the business system 3 (Step S519). Further, the image excision plug-in 507 allows the user to carry out manual correction (Step S520) from the Web browser 1 via the business system 3 or from the MFP 4. Then, the image excision is repeated each time after the correction is carried out. FIG. 45 shows a general configuration of image excision processing carried out by the image excision plug-in 507. when the scanned image of the business form, generated based on the layout information and then output (Step S521), is then input (Step S522), positional correction of the displacement (only automatic correction at the first time) is carried out (Step S523), and then, excision is carried out with the use of the coordinate information for each item of the layout information (Step S534). After that, the user's manual correction (Step S523) and after that excision (Step S524) are repeated each time after the manual correction is carried out.

Figure 46:
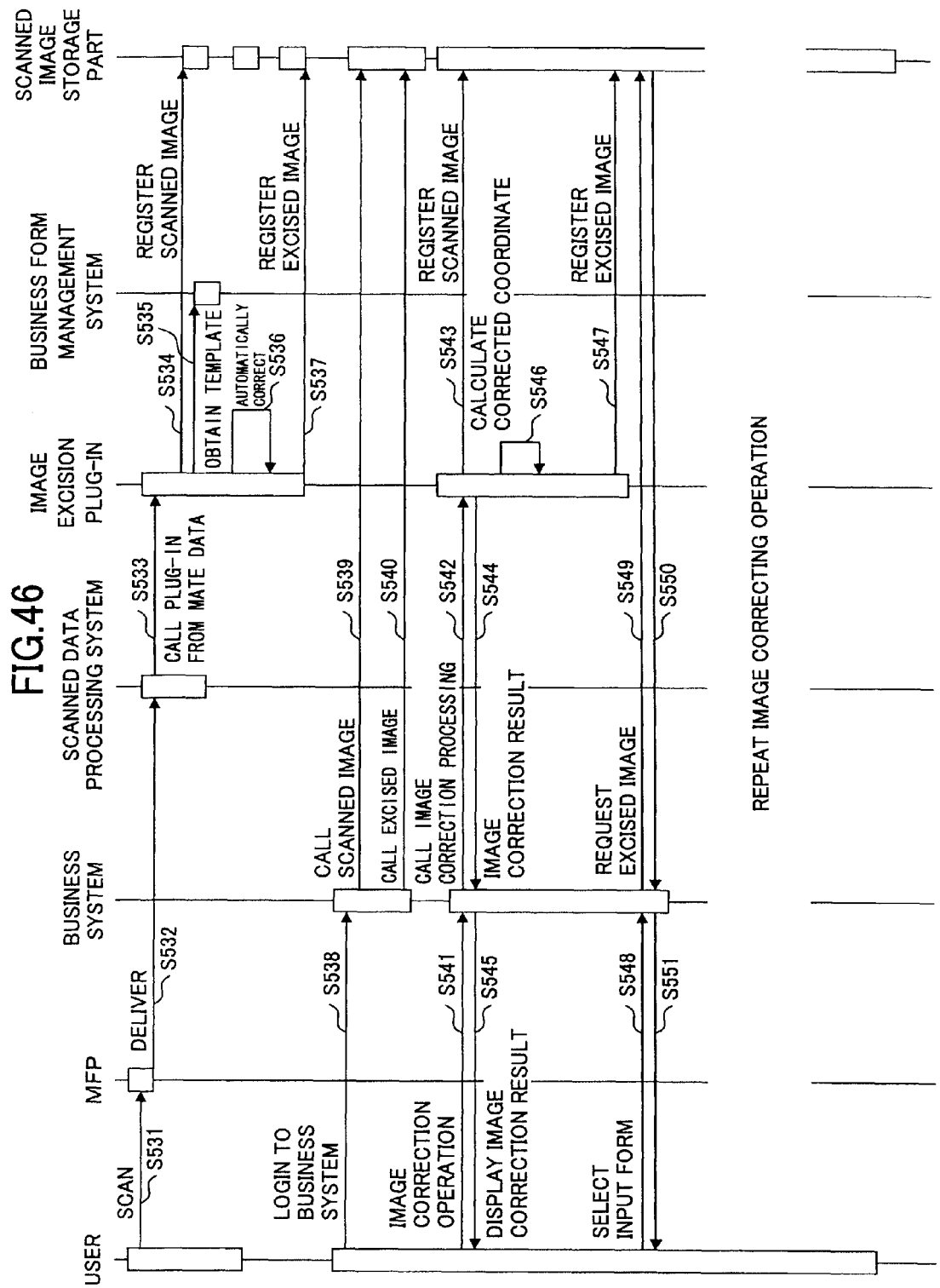
FIG. 46 shows a sequence diagram of an example of processing, from scanning to data input, including automatic correction and manual correction.

FIG. 46 shows a sequence diagram of an example of processing, from the scanning to the data input, including the automatic correction and manual correction. In FIG. 46, when the user scans the business form by means of the MFP 4 (Step S531), the MFP 4 delivers the thus-obtained scanned image and meta data to the scanned data processing system 5 (Step S532).

The scanned data processing system 5 calls the image excision plug-in 507 according to the meta data (Step S533).

The image excision plug-in 507 registers the scanned image of the business form in the images storage part 305 (Step S534), and also, obtains the corresponding business form template from the business form management system 2 (Step S535).

Next, the image excision plug-in 507 carries out the automatic correction on the scanned image (Step S536). Specifically, positional adjustment, distortion (skew) correction, top-and-bottom inverting correction, or such, based on an edge part or a characteristic image part included in the business form. It is noted that, after the automatic correction is thus carried out, corresponding modification is carried out on the coordinate information of the item obtained from the business form template.

Next, the image excision plug-in 507 carries out excision of the item from the scanned image, and registers the thus-obtained information, i.e., the excised image, in the scanned image storage part 305 (Step S537).

After that, when the user logins to the business system 3 from the Web browser 1 (Step S538), the business system 3 calls the scanned image and the excised image continuously, from the scanned image storage part 305 (Steps S539, S540).

Figure 47:
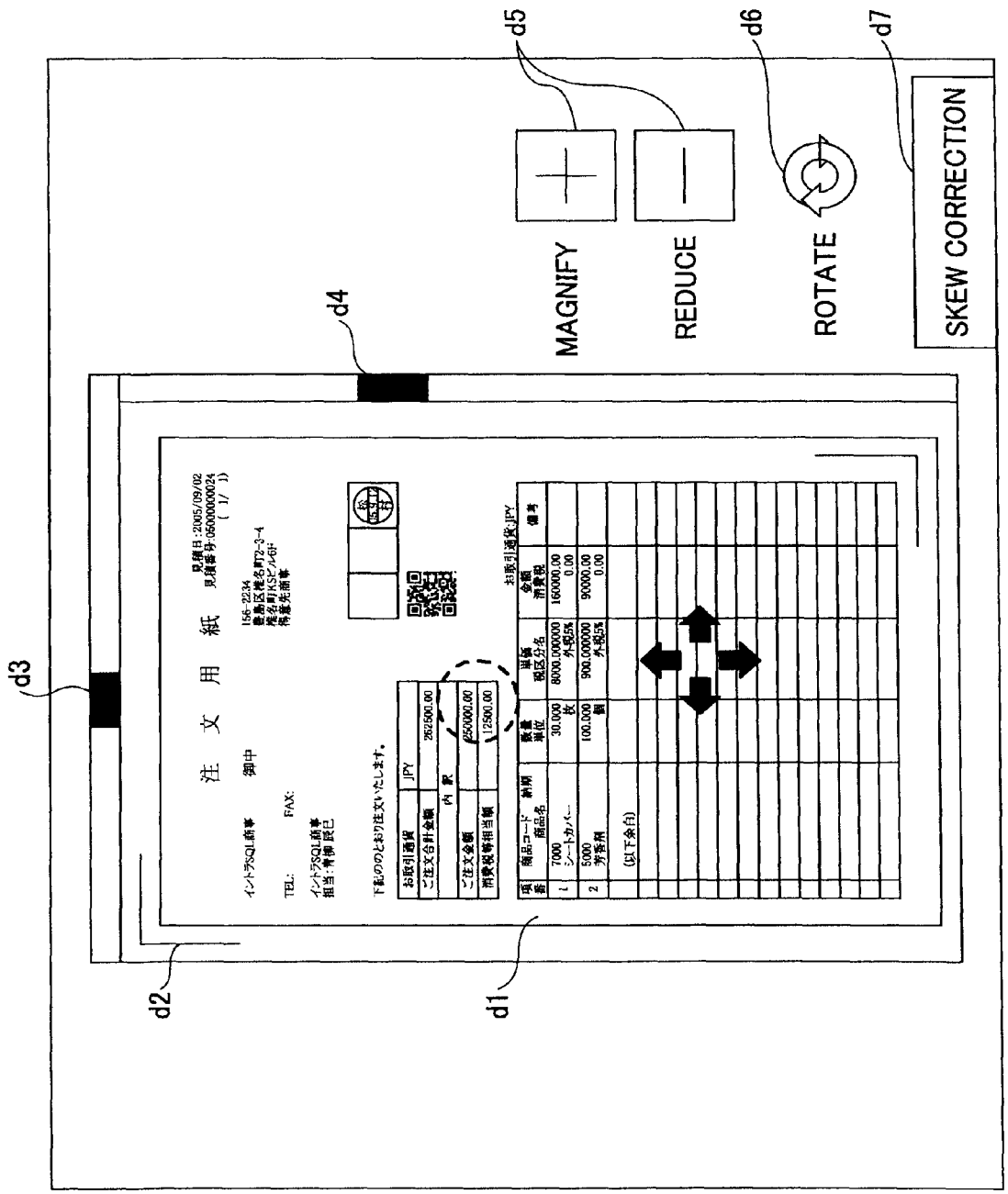
FIG. 47 shows an example of an interface page for the manual correction.

Then, when the user carries out the image correction operation on the business system 3 (Step S541), the business system 3 calls image correction processing of the image excision plug-in 507 (Step S542), and the image excision plug-in 507 registers the thus-corrected scanned image in the scanned image storage part 305 (Step S543), and also, displays the image correction result to the user via the business system 3 (Steps S544, S545). FIG. 47 shows an example of an interface page for the manual correction. The positional correction is carried out in such a manner that, the scanned image d1 is drugged (i.e., it is gripped by means of a mouse, and is shifted) or, scrolling bars d3, d4 are moved, so that the scanned image is moved so that an edge part of the scanned image d1 is aligned to a guiding part d2. When a slight positional correction is to be carried out, it is possible to magnify or reduce a target image part for a desired display size by moving a magnify/reduce button d5. Further, when a rotated displacement (including a state in which the top and the bottom have been inverted) should be corrected, a rotation button d6 is used. For a distortion, a skew button d7 is used to correct it. It is noted that, although the case where the manual correction is made from the Web browser 1 has been described above, the same operation may be made from the operating panel 402 of the MFP 4 after the scanning is made in the MFP 4.

Return to FIG. 46, the image excision plug-in 507 calculates positional information of the excised image resulting from the above-mentioned correction (Step S546), carries out excision of the item image, and resisters the excised item image in the scanned image storage part 305 (Step S547).

Figure 48:
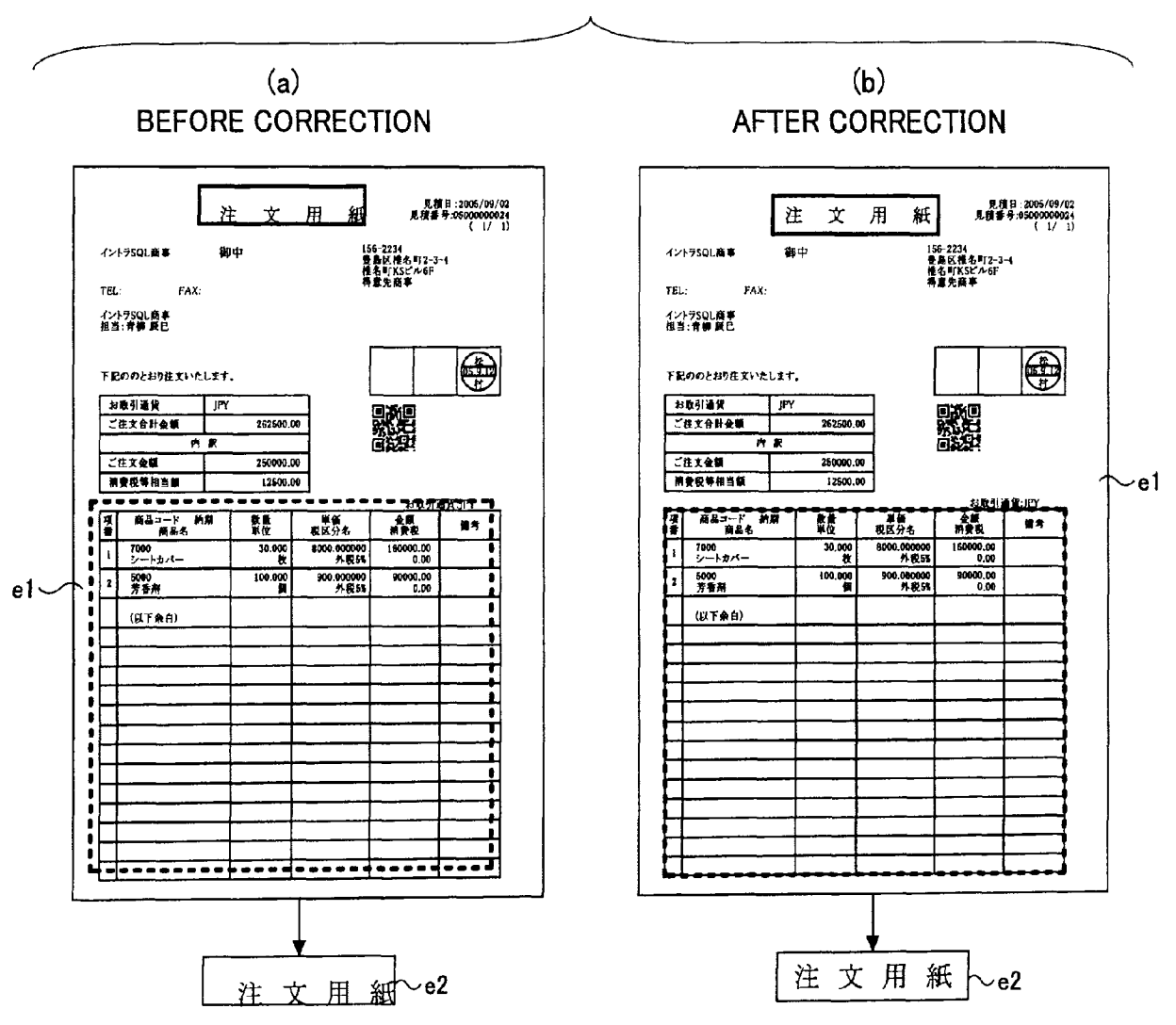

After that, when the user selects an input form for carrying out a slip input from the business system 3 (Step S548), the business system 3 requests the scanned image storage part 305 for the excised image (Step S549), displays the excised image in such a manner that the correspondence to each item is provided (Steps S550, S551), and thus, carries out an input assistance for the user. FIG. 48 shows an example of the scanned image before and after the correction. As shown in FIG. 48 (a), before the correction, the scanned image e1 has a displacement an thus, the excised image e2 is not a properly excised one, while, as shown in FIG. 48 (b), after the correction, the excised image e2 is one properly excised.

Return to FIG. 46, when the user views the excised image thus displayed with the correspondence to the input form and determines that a displacement occurs, the user should repeat the same image correction processing (Steps S541 through S547).

Figure 49:
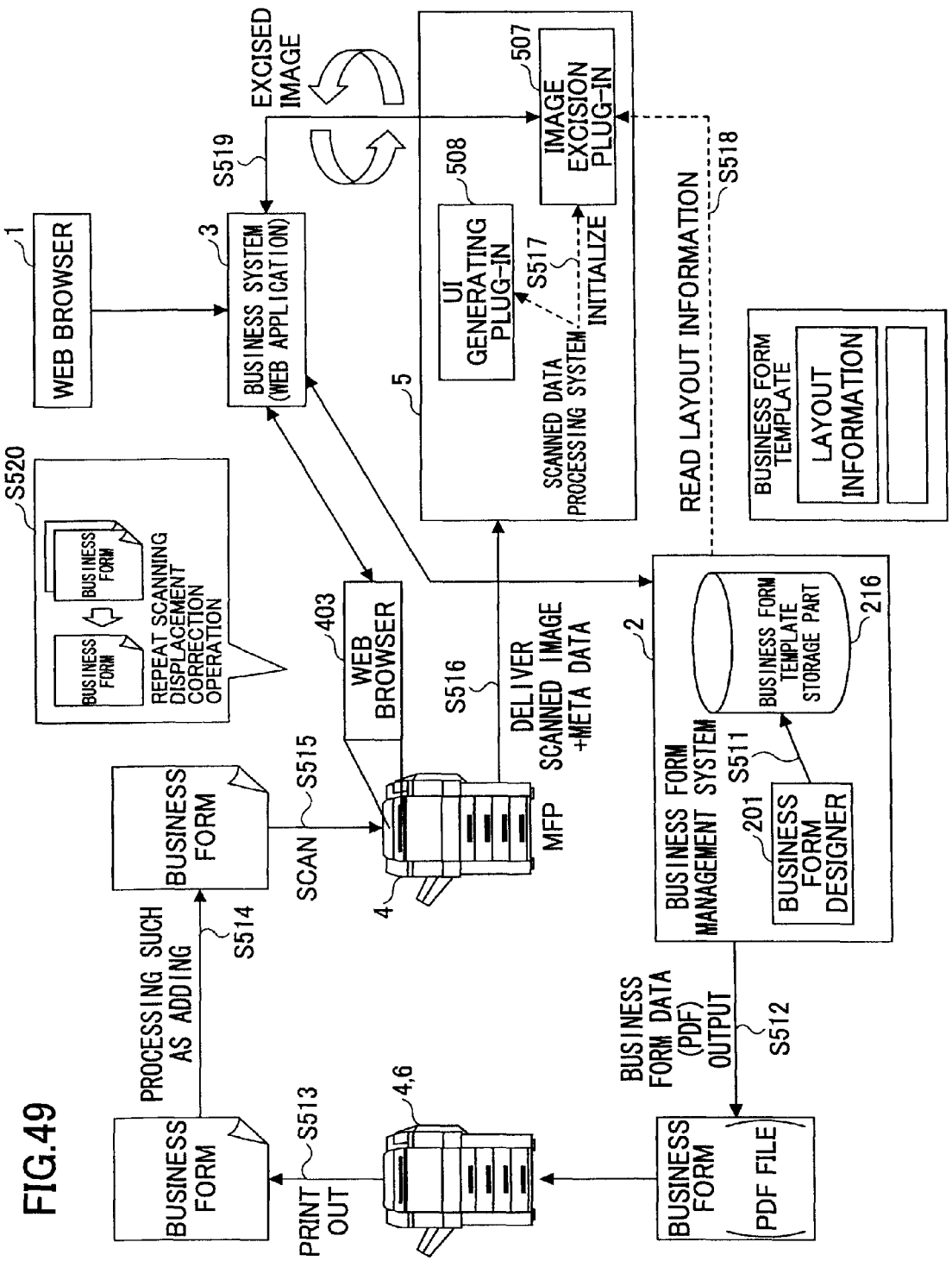
FIG. 49 shows an example in which a UI generating plug-in is added.

Next, FIG. 49 shows an example in which a UI generation plug-in 508 is added to the scanned data processing system 5. That is, when the UI data such as those shown in FIGS. 37 and 38 are embedded in the business form, and the UI generation plug-in 508 is provided by which the UI is displayed on the MFP 4, it is possible to display the UI corresponding to the business flow, when the business form is scanned.

Figure 50:
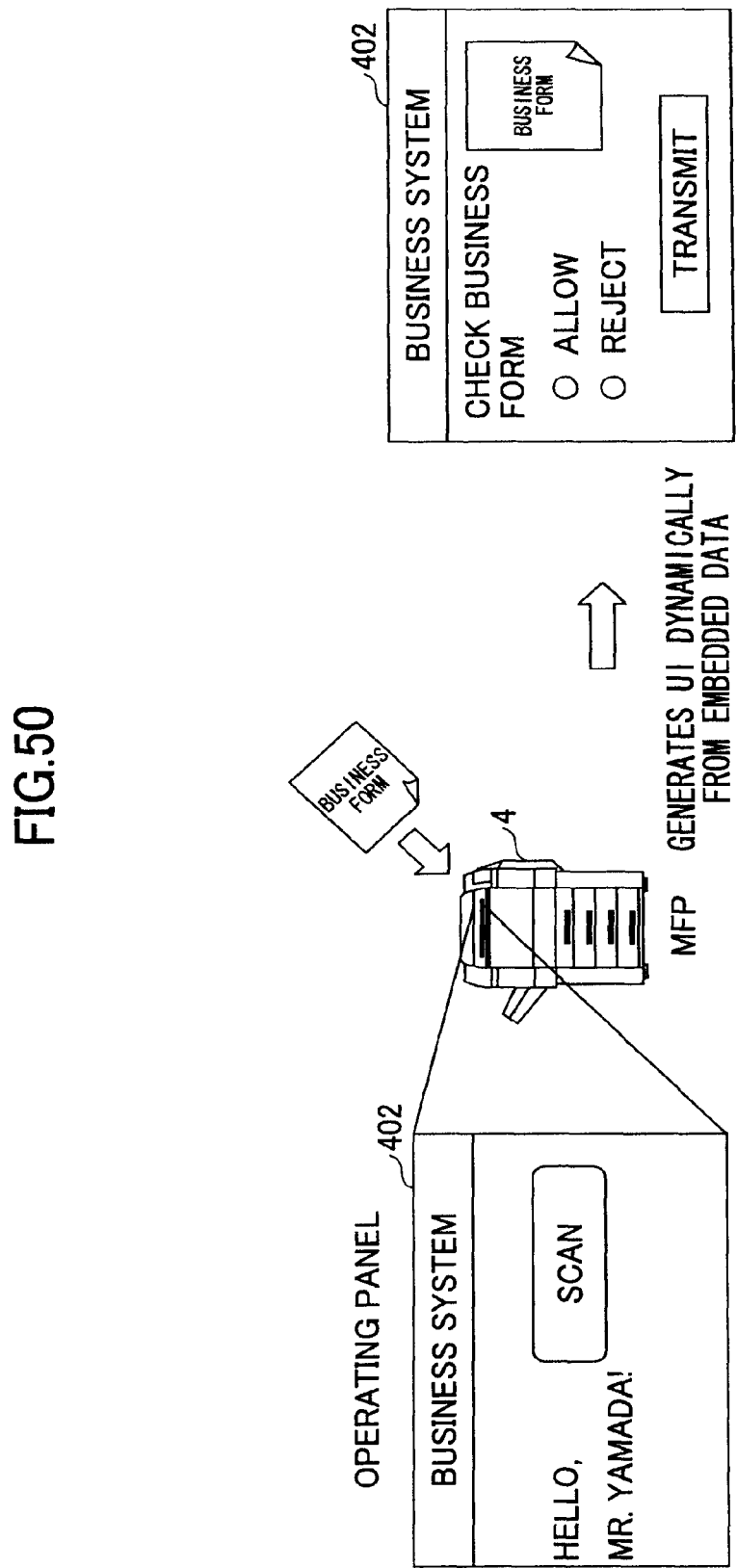
FIG. 50 shows an example of an interface page for dynamic correction when the scanning is carried out.
Figure 51:
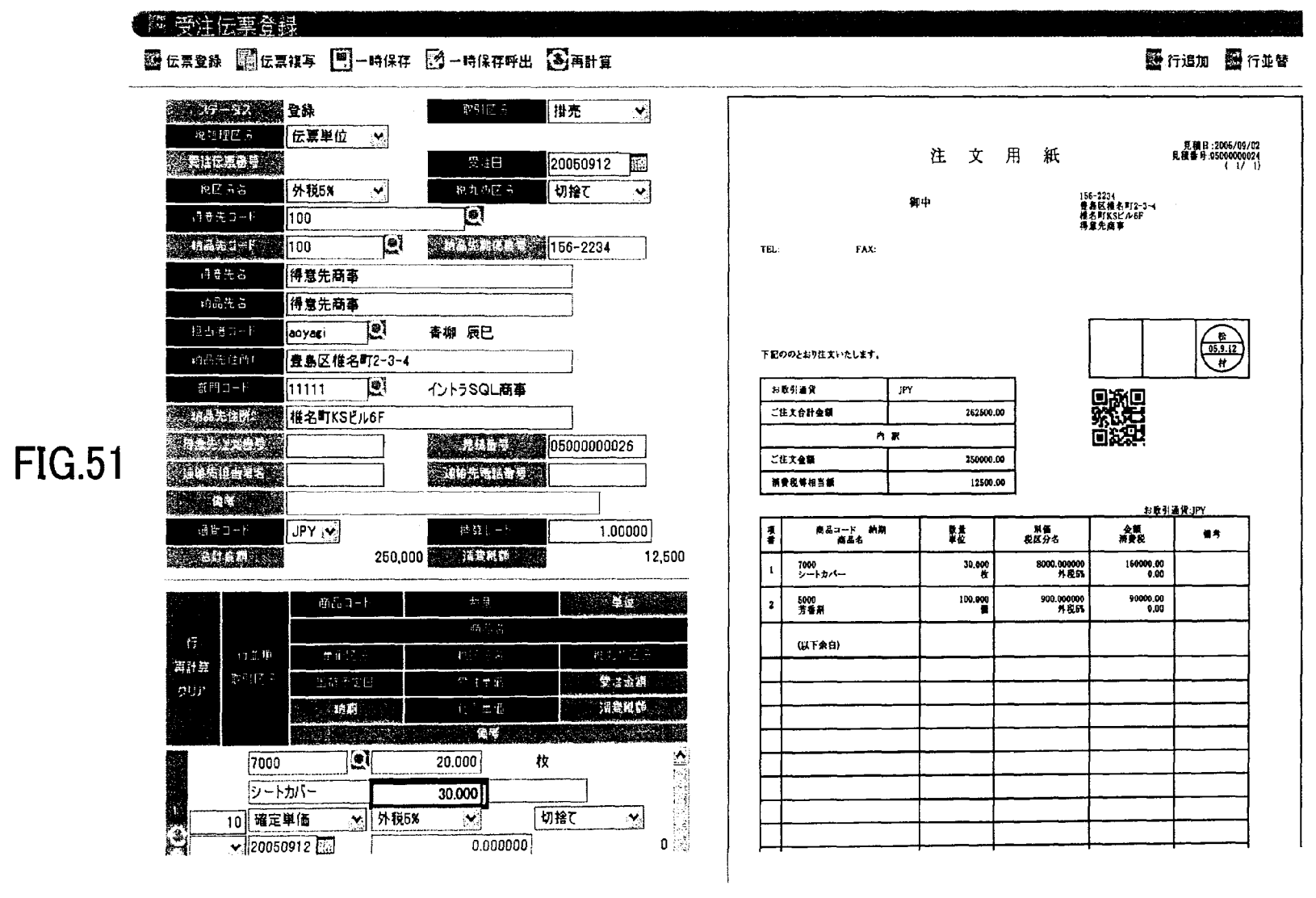

In FIG. 49, what is different from FIG. 40 is that, in generation and output of the business form data by the business form management system 2 (Step S512), the UI data such as that shown in FIG. 38, is embedded in the business form, and, also, the scanned data processing system 5, when receiving the scanned image and meta data from the MFP 4, starts up (initializes) the UI generation plug-in 508 based on the meta data accordingly. FIG. 50 shows an example of an interface page for a dynamic generation when the scanning is carried out. As a result of the user's selecting 'scan' from the operating panel 402 of the MFP 4, the scanning is started up, and, following thereto, the UI generation plug-in 508 displays the UI for the user to make allowance or rejection for a 'business form check' which is a part of the business flow in the business system 3 on the operating panel 402. Further, FIG. 51 shows an example where an input form corresponding to each business form is automatically generated. In this example, the UI generation plug-in 508 displays the corresponding input form for a case where, after the scanning, a slip input is carried out.

Figure 52:
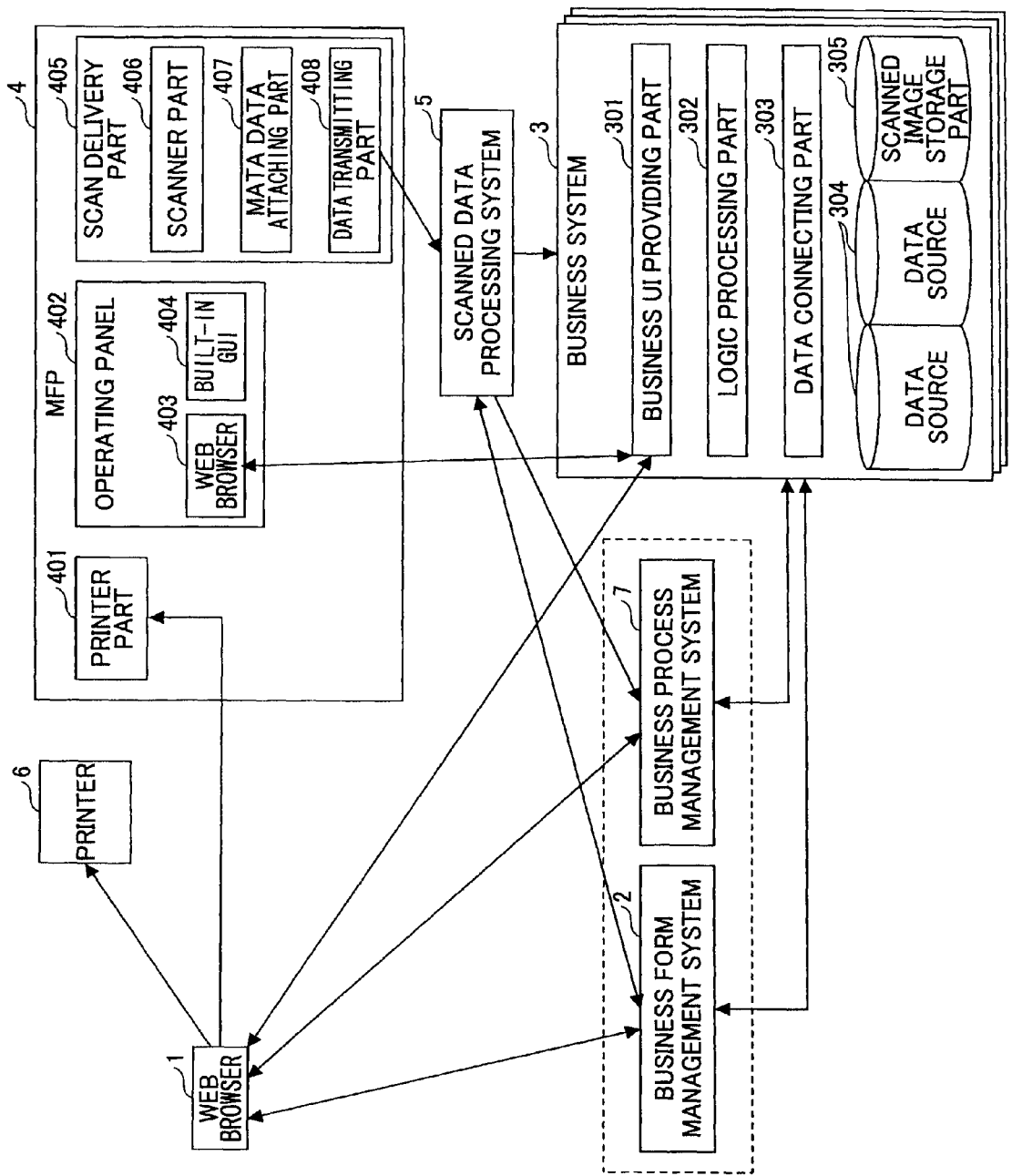
FIG. 52 shows an example of a configuration of a business associating scan solution system according to a third embodiment of the present invention.

FIG. 52 shows an example of a configuration of a business associating scan solution system according to a third embodiment of a scan solution system according to the present invention. In FIG. 52, the business associating scan solution system includes a Web browser 1 acting as a client a user operates; a business form management system 2 generating business form data; a business system 3 managing a business including issuance of business forms and reception of the same; an MFP (Mufti-function printer) 4 carrying out printing out of the business form and scanning of the same; a scanned data processing system 5 carrying out predetermined processing based on a scanned image and meta data (described later) delivered from the MFP 4, and a business process management system 7 carrying out management of business processing among a plurality of business systems in a manner of unifying the processing.

The MFP 4 includes a printer part 401 carrying out printing out of the business form; an operating panel 402 a user operates; and a scan delivery part 405 carrying out scanning of the business form and delivery of the scanned image and meta data. The operating panel 402 has a Web browser 403 displaying a UI (user interface); and a built-in GUI (Graphical user interface) 404. The scan delivery part 405 includes a scanner part 406 scanning the business form; a meta data attaching part 407 attaching various sorts of information (login user information, operating date/time, selected contents from the operating panel 402, an IP address of the MFP 4, or such) when the business form is scanned, to a file name of the scanned image as the meta data, or attaching the same as a form of a separate file of XML (extendible markup language) or such; and a data transmitting part 408 transmitting the scanned image and the meta data to the scanned data processing system 5.

The business system 3 includes a business UI providing part 301 providing a business UI; a logic processing part 302 carrying out data processing according to a logic in line with business contents; a data connecting part 303 connecting to a data storage inside or outside of the system; a data source 304 such as various sorts of databases; and a scanned image storage part 305 storing scanned images of the business forms.

Figure 53:
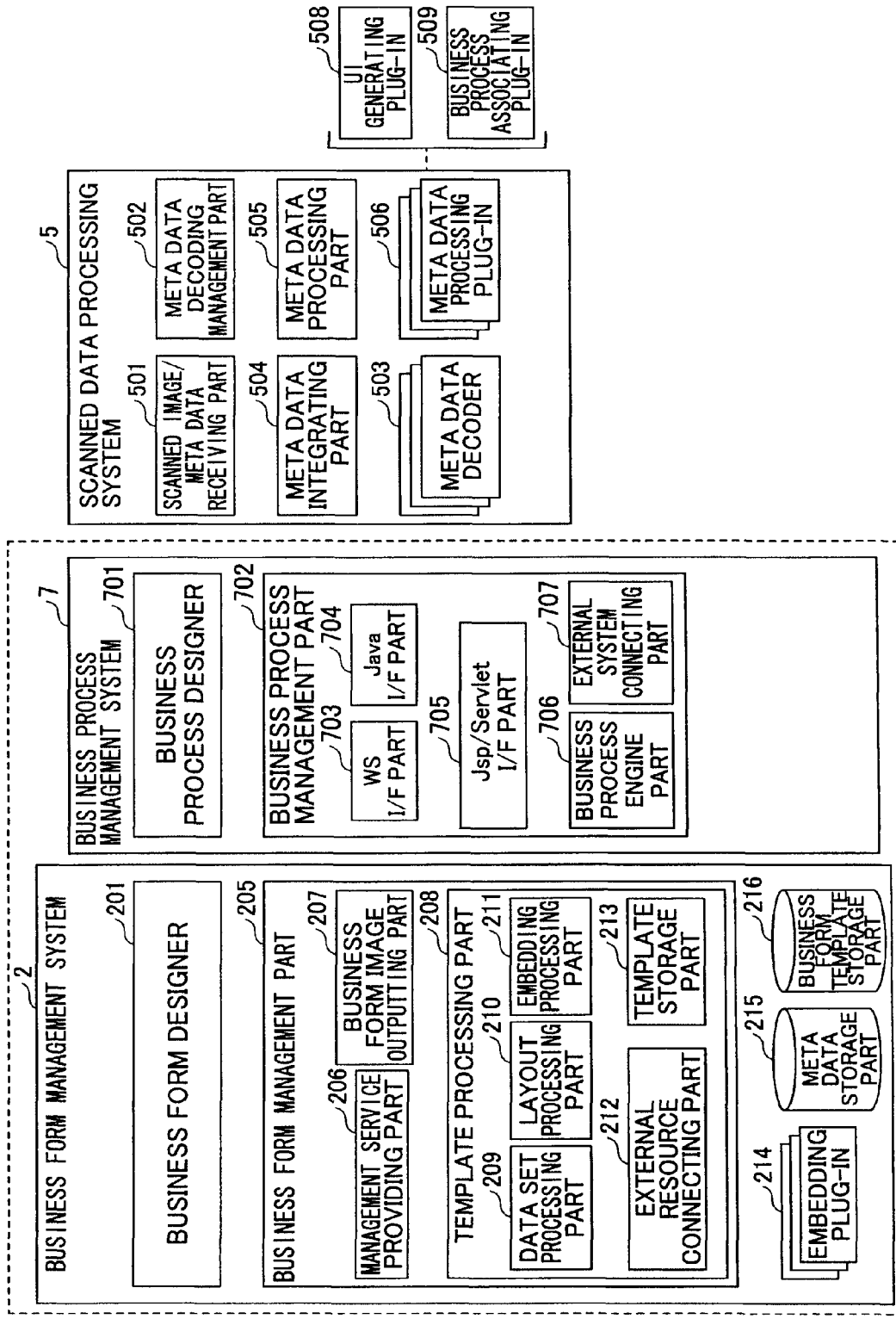
FIG. 53 shows an example of a configuration of a business form management system, a business process management system and a scanned data processing system.

FIG. 53 shows an example of a configuration of the business form management system 2, the business process management system 7 and the scanned data processing system 5. In FIG. 53, the business form management system 2 includes a business form designer 201 carrying out design of the business form according to an operation of a business management user; a business form management part 205 carrying out management of the business forms; an embedding plug-in 214 executing embedding of the meta data in a business form image; a meta data storage part 215 holding the meta data embedded in the business form image; and a business form template storage part 216 holding a business form template. The business form designer 201 includes, although not shown, a UI providing part 202 providing a UI; a template creating part 203 creating the business form template; and a management part calling part 204 calling the business form management part 205 for processing various sorts of inquiries or registration of the created business form template. The business form management part 250 includes a management service providing part 206 providing a business form management service; a business form image outputting part 207 outputting the created business form data in a form of a PDF (Portable document file) or such; a template processing part 208 carrying out processing of generating a business form according to the business form template; an external resource connecting part 212 connecting to an external resource for including data of the external resource in the business form; and a template storage part 213 storing the business form template created by the business form designer 210 in the business form template storage part 216. The template processing part 208 includes a data set processing part 209 carrying out processing for a data set which is used as a source of the data included in the business form; a layout processing part 210 carrying out layout processing for respective items of the business form; and an embedding processing part 211 carrying out embedding data in the business form in various sorts of manners such as that for a two-dimensional barcode (QR code) or such.

The business process management system 7 includes a business process designer 701 carrying out design of a business process according to a business management user's operation; and a business process management part 702 carrying out management of the business process according to the thus-designed business process. The business process management part 702 includes a WS I/F part 703 providing an interface for a Web service (WS); a Java I/F part 704 providing an interface for a Java program; a Jsp/Servlet I/F part 705 providing an interface for a JSP (Java server pages)/Servlet; a business process engine part 706 carrying out main control operation of the business process; and an external system connecting part 707 for connecting to an external system.

The scanned data processing part 5 includes a scanned image/meta data receiving part 501 receiving the scanned data or the meta data from the MFP 5; a meta data decoding management part 502 managing decoding of the meta data which is embedded in the scanned image or the file name, or, attached in a form of a separate file; a meta data decoder 503 including various types of decoders for decoding, such as a two-dimension barcode decoder, a barcode decoder, a dot embedding decoder; a file name meta data decoder, an invisible way decoder, an XML decoder and so forth; and a meta data integrating part 504 integrating the meta data thus decoded by the various types of decoders. Further, the scanned data processing system 5 includes a meta data processing part 505 carrying out predetermined processing corresponding to the thus-integrated meta data; and a meta data processing plug-in 506 including various types of plug-ins for actually executing the predetermined processing corresponding to the meta data. In the third embodiment, in particular, a UI generation plug-in 508 generating UI corresponding to a business flow when the business form is scanned; and a business process associating plug-in 509 which stores the scanned image of the business from in the business system 3, and also, reflects the corresponding status on the business process management system 7, as a processing of one activity, with the use of the meta data as a parameter, are provided.

Figure 54:
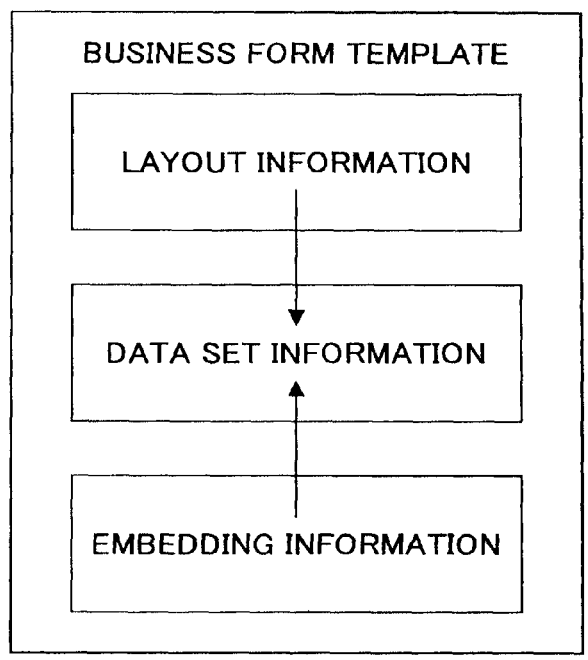
FIG. 54 shows an example of a business form template.

FIG. 54 shows an example of the business form template managed by the business form management system 2. in FIG. 54, the business form template includes the layout information for internally referring to the data set information and designating a location of each item; the data set information for dynamically generating a data value by connecting to the data source; and embedding information for supporting various types of embedding formats, and describing the embedding meta data. It is noted that, the embedding information may be configured in such a manner that it merely refer to the data set information.

Figure 55:
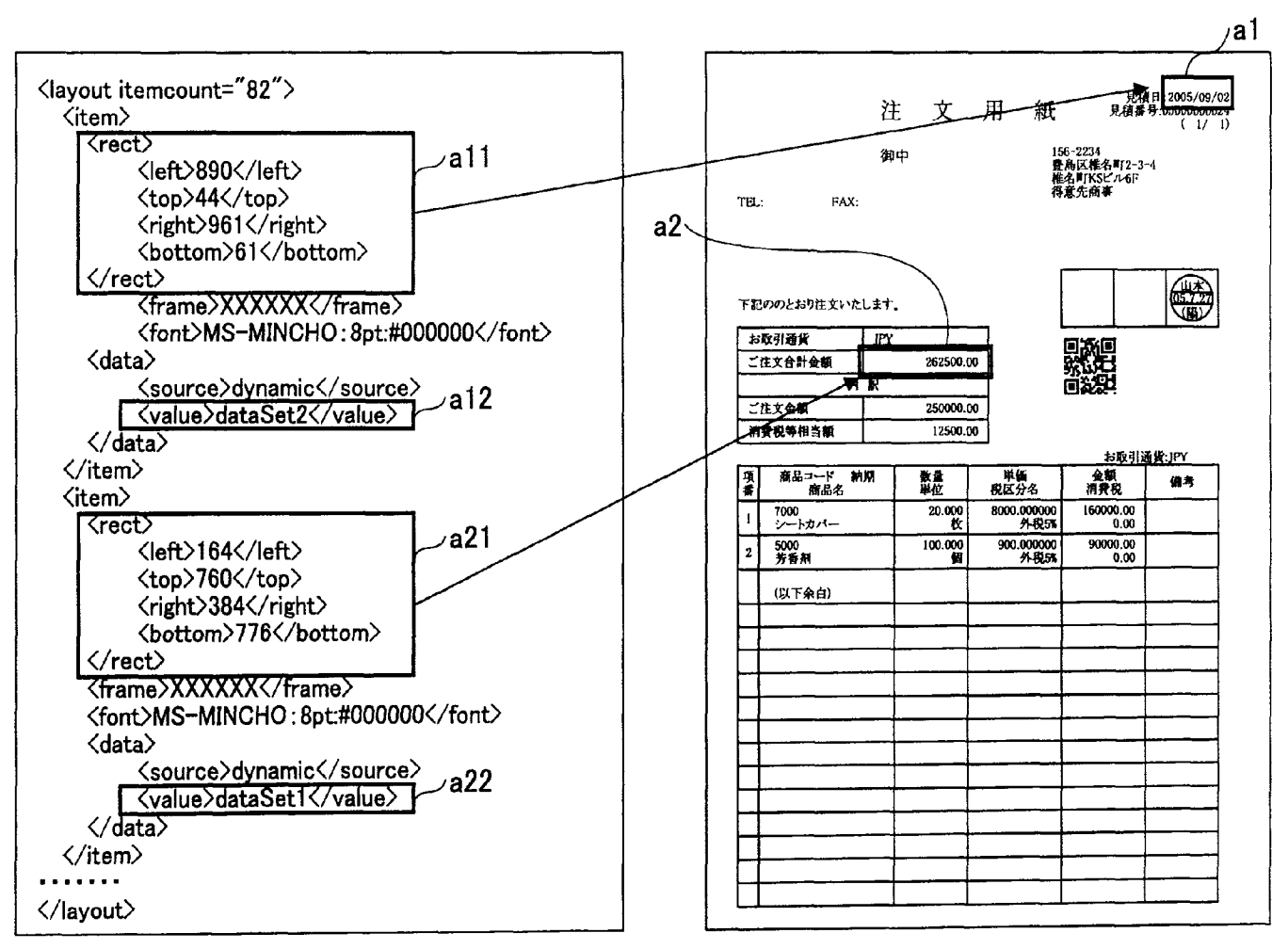

FIG. 55 shows an example of the layout information. The left side shows the layout information, and the right side shows a corresponding business form. In this example, a position corresponding to an item a1 of the business form and the data set to refer are described by a11 and a12, respectively, and a position corresponding to an item a2 of the business form and the data set to refer are described by a21 and a22, respectively.

Figure 56:
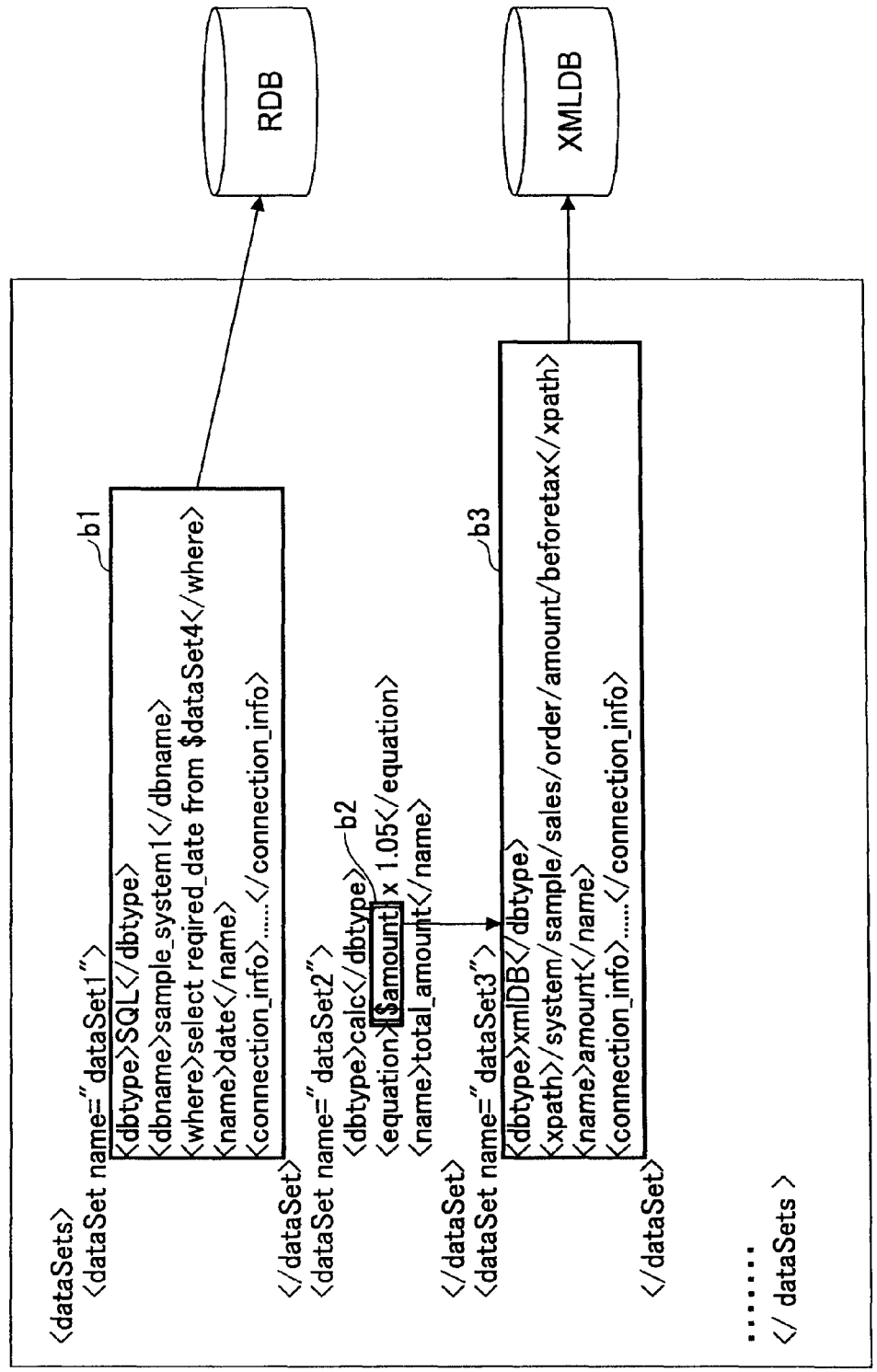
FIG. 56 shows an example of data set information.

FIG. 56 shows an example of the data set information, which includes a description b1 for referring to an external RDB (Relational database), a description b3 for referring to an external XMLDB, and a description b2 for referring to the data set from the description b3.

Figure 57:
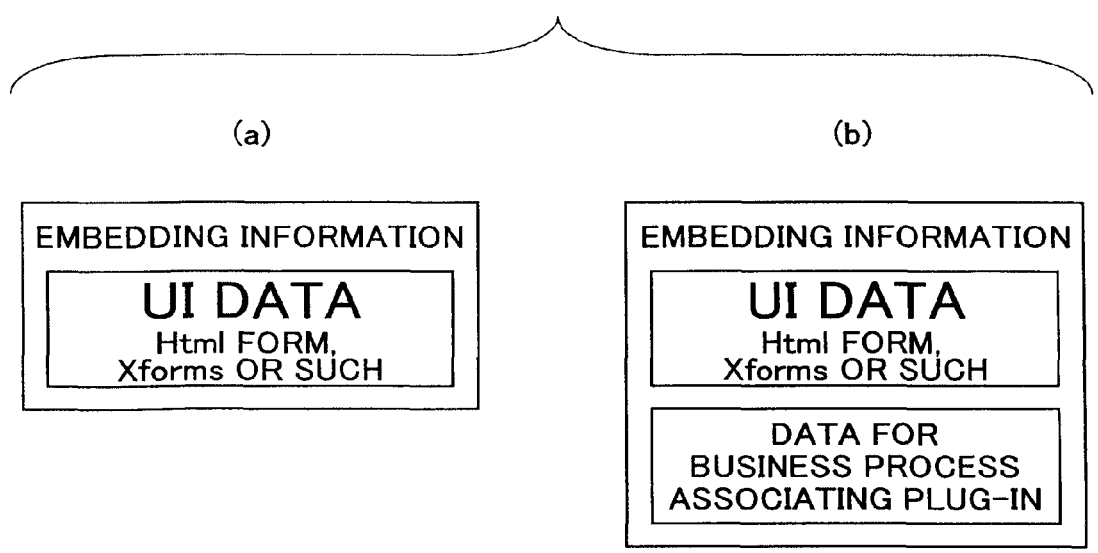
FIG. 57 shows an example of embedding information.

FIG. 57 shows an example of the embedding information, FIG. 57 (*a*) shows an example in which the embedding information includes UI data made in an Html (Hyper text makeup language) form, an Xforms or such. In this example, a transmission destination URL can be described in the form, and thus, this example corresponds to a case where the business process associating plug-in is not required. However, in this case, the business process management system should have a jsp I/F, and should be able to directly carry out process updating.

FIG. 57 (*b*) shows an example in which the embedding information includes, other than the UI data, data for the business process associating plug-in. This example corresponds to a case where the business process management system requires data conversion, protocol conversion or such, since it does not have the jsp I/F or so. Therefore, data for starting up the business process associating plug-in is embedded.

Figure 58:
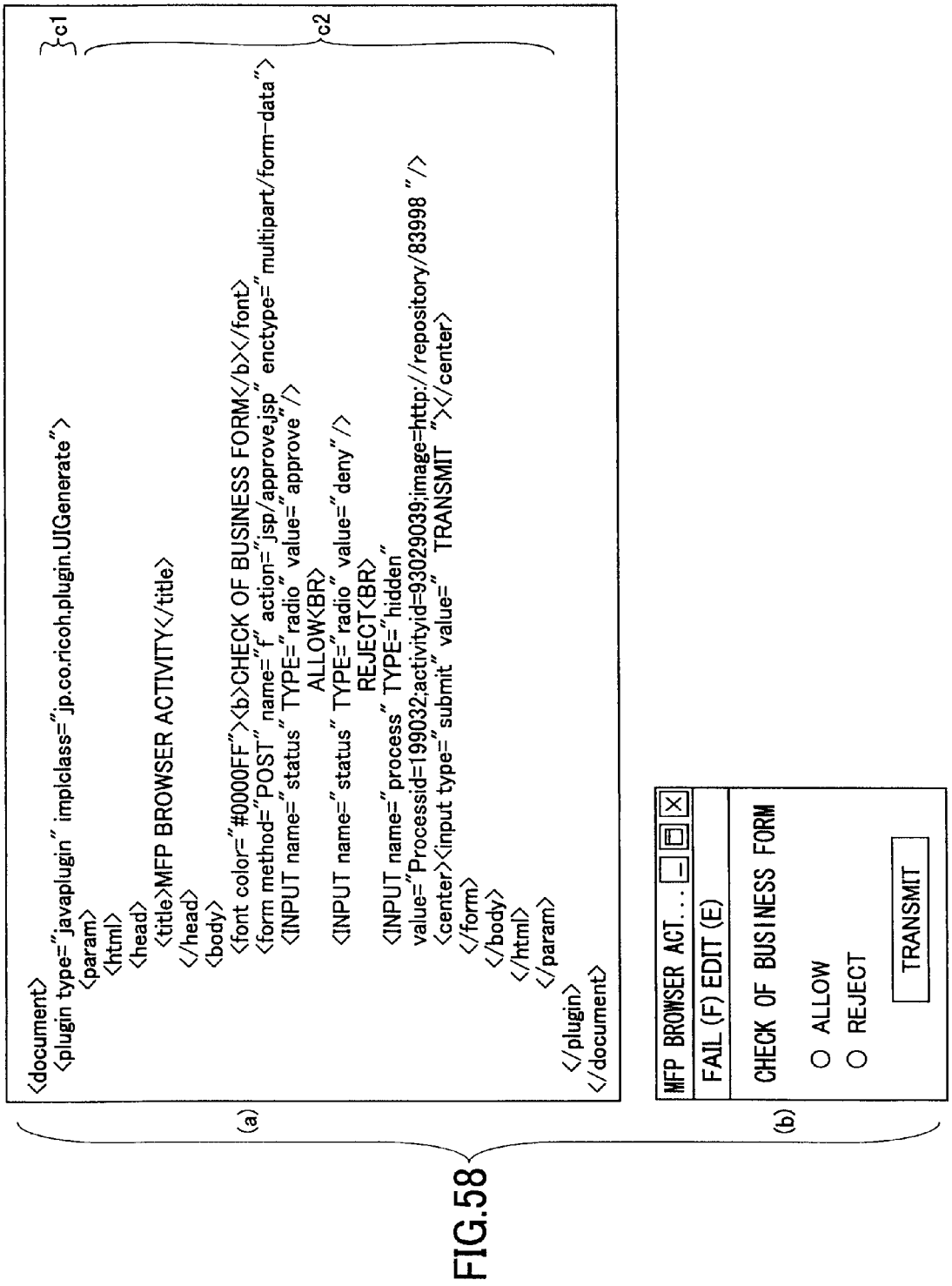
FIG. 58 shows an example of UI data.

FIG. 58 (*a*) shows an example of the UI data which includes a description c1 indicating a plug-in type, and a description c2 in Html indicating the contents of the UI. FIG. 58 (*b*) shows the UI displayed based on the UI data.

FIGS. 59 through 61 show examples of data for the business process associating plug-in. FIG. 59 shows an example in which data obtained by JSP is transferred to the business process management system 7 designed by 'destination'. FIG. 60 shows an example in which a SOAP (Simple object access protocol) message for calling a service is embedded. In this example, SOAP messaging by means of the business form via a communication network can be achieved, and also, a SOAP processing system can be utilized. Accordingly, the developing costs can be reduced. FIG. 61 shows an example in which a collaboration among a plurality of services by means of BPEL (Business process execution language) or such is described.

Below, operation of the third embodiment will be described.

FIG. 62 shows an example of a business flow including processing of the business form, carried out by a human being, which is assumed in the third embodiment of the present invention. In FIG. 62, e1 through e9 denote particular activities included in the business flow. Each particular activity (excluding the root activity e1) becomes a standby state when an immediately preceding activity is completed, and then, is completed when predetermined corresponding processing is carried out. There, e4 through e7 are activities using the business system, and are completed when the predetermined processing is carried out for the business system. The activities e2 and e3 are activities in which processing of the business form carried out by human beings is included. That is, the person creates the business form, carries out a check, modification, adding information thereto, or such, which activities cannot be understood by the system in the related art. However, by defining such a rule that, the business form should be printed out under the control of the system, and scanning by means of the MFP 4 should be carried out each time when the check, modification, adding information to the business form or such is carried out, the system can thus understand that the business form is created when the business form is printed out under the control of the system, and also, the system can understand that the activity is completed when the scanning is made, with the use of the meta data embedded in the business form or the meta data obtained when the scanning is carried out.

FIG. 63 shows a specific example of the business flow. In FIG. 63, when a user (Ms. Tanaka) carries out a check, modification, adding information to the business form or such, on the business form, and selects a predetermined task with the use of a function of the business system 3, the MFP 4 or the printer 6 prints out the business form in which the meta data is embedded (Step S601). The thus-printed-out business form is then handed to a predetermined person (Mr. Yamada), and thus, transmission is carried out for Mr. Yamada (Step S602).

The person (Mr. Yamada) receiving the business form carries out a check, modification, adding information thereto, or such, on the business form (Step S603), and then, the MFP 4 is used to scan the business form (Step S604). At this time, necessary instructions for the scanning are input by Mr. Yamada to the MFP 4 from the operating panel 402 of the MFP 4 according to the UI displayed on the operating panel 402. As a result, the UI, provided for selecting a check on the business form, is displayed dynamically from the UI data embedded in the business form (Step S605), and Mr. Yamada should make allowance/rejection of the business form, according to the UI, which allowance/rejection is automatically described in form data or such in the MFP 4.

Then, from the MFP 4, the scanned data of the business form and the meta data of the form data or such in which the Mr. Yamada's allowance/rejection is thus described, are transmitted to the scanned data processing system 5 (Step S606). Thus, the meta data is used as a parameter, which is reflected on the business process management system 7, as the processing of the activity, and the scanned image of the business form is stored in the scanned image storage part 305 (Step S607).

Figure 64:
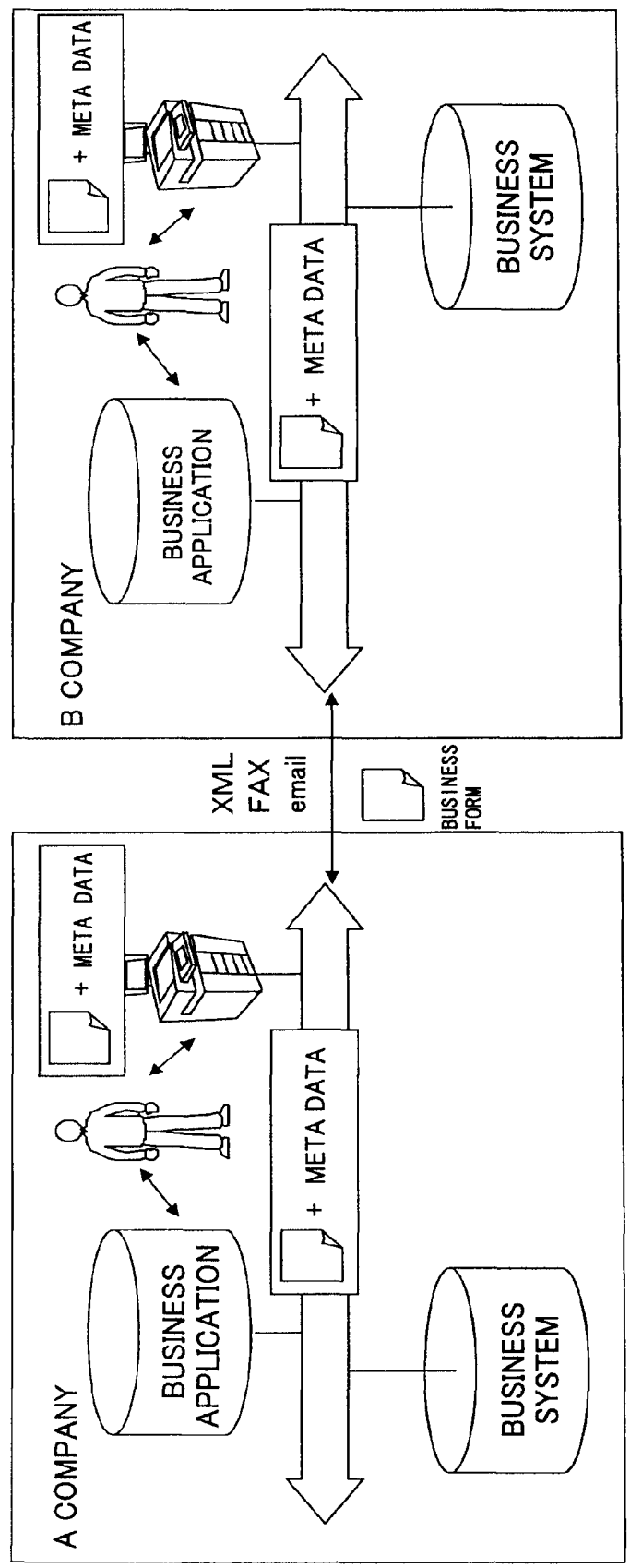
FIG. 64 shows an example in which the third embodiment of the present invention is applied between different business enterprises.

FIG. 64 shows an example in which the third embodiment of the present invention is applied between different business enterprises. In this example, in a business association with the other company, a sub-flow of BPEL can be executed even when paper is received, and thus, it is possible to provide incremental solution at low cost even for such a business which should inevitably use paper. Further, since it is possible to provide a frame work taking advantage of standard technology and image related technology, it is possible to effectively lower the total integration cost.

Figure 65:
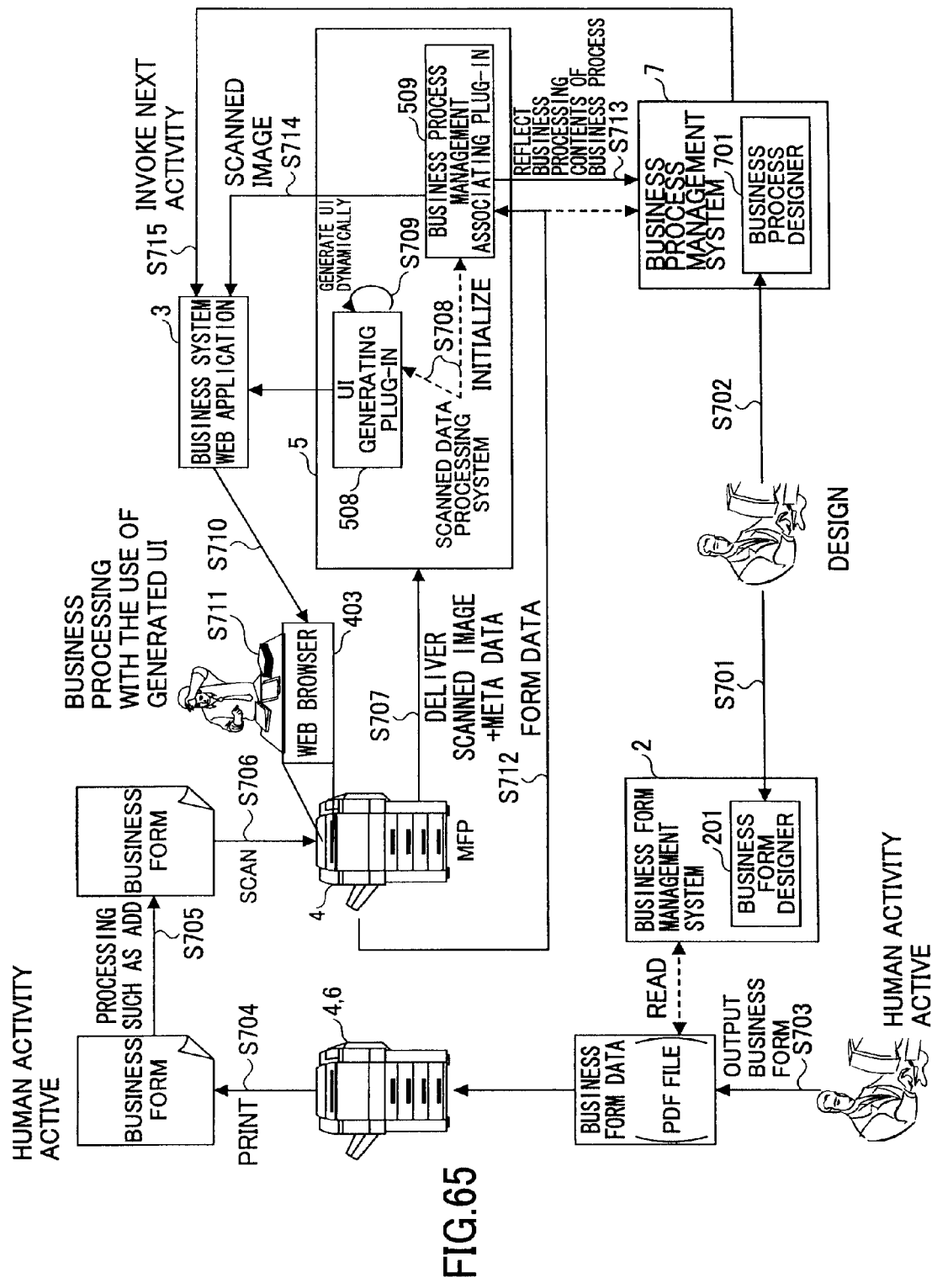
FIG. 65 shows an example of processing of the business associating scan solution system.
Figure 66:
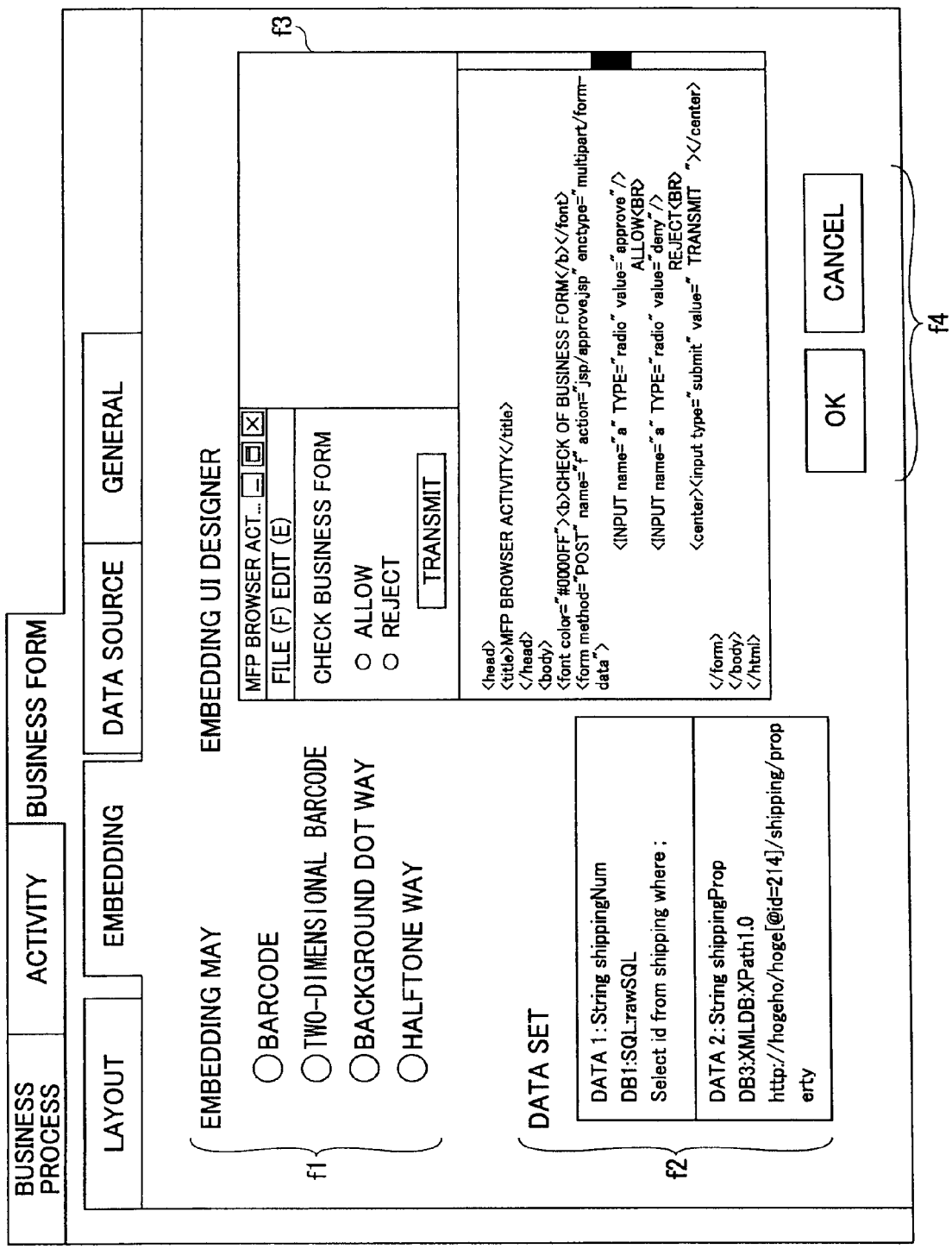
FIG. 66 shows an example of a page from a business form designer.
Figure 67:
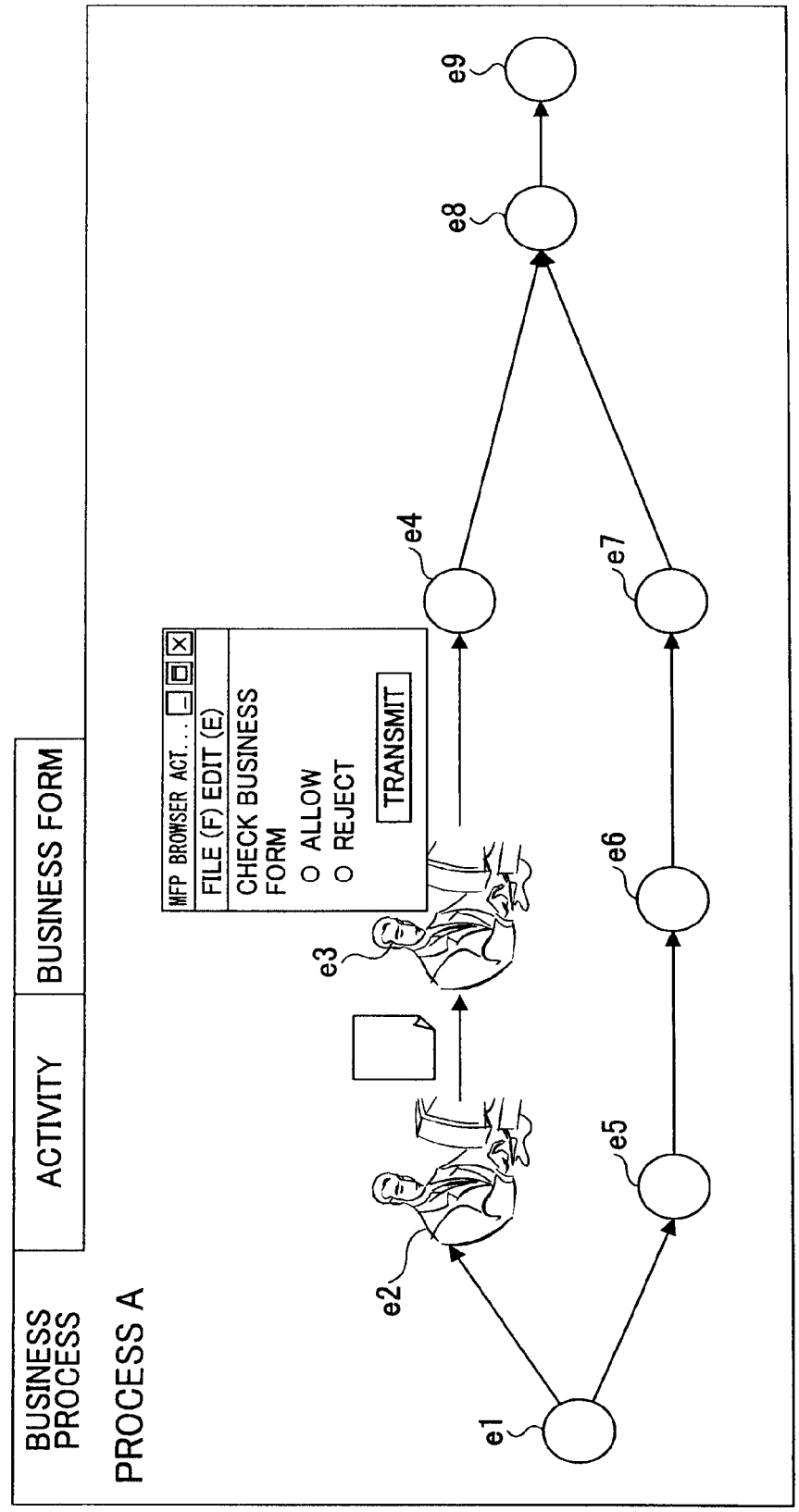
FIG. 67 shows an example of a page from a business process designer.

FIG. 65 shows an example of processing of the business associating scan solution system in the third embodiment. In FIG. 65, a business management user uses the business form designer 201 of the business form management system 2, to design the business form template (Step S701), and also, uses the business process designer 701 of the business process management system 7 to design the business process (Step S702). FIG. 66 shows an example of a page in the business form designer 201, which includes a radio button f1 for selecting the embedding way, a display f2 for referring to the data set, an area f3 for designing the embedding UI, and a button f4 for inputting instructions for storage or cancelling. FIG. 67 shows an example of a page in the business process designer 701. From this page, the activities e1 through e9, corresponding to the business flow shown in FIG. 62, can be graphically designed, and also, it is possible to define UI for transferring paper between the activities e2 and e3, and returning the same to the business system.

Return to FIG. 65, an ordinary user accesses the business system 3 from the Web browser 1, and gives instructions for outputting (printing out) the business form. Thereby, under the control of the business system 3, the business form management system 2 creates the business form data, also creates the meta data based on the business form template stored in the business form template storage part 216 and the data source 304, embeds the meta data in the business form image by means of the embedding plug-in 214, and outputs the same (Step S703).

The business form data is thus printed out by means of the MFP 4, or the printer 6, via the Web browser 1 or such, or, directly, from the business form management system 2 (Step S704).

The thus-printed out business form undergoes modification, adding information thereto, or such, appropriately by a user (Step S705). It is noted that the modification, adding information thereto, or such, may be carried out by the user at a location near the location at which the business form is thus printed out, or may be carried out by a person after the business form is sent thereto via mail, by hand, via face mile, or such.

Next, as a business flow after the modification, adding information thereto or such is carried out by the user, the thus-obtained business form is scanned by the MFP 4 (Step S706). At this time, the Web browser 403 of the MFP 4 connects to the business system 3, and provides an interface page according to the business flow.

Next, the MFP 4 thus obtains the scanned image of the business form, and also, attaches to the file name of the image, or as a separate file of XML or such, login user information, operation date/time, the contents selected on the operation panel 402 (the Web browser 403) by the user (including the template ID indicating the type of the business form, the process ID and so forth), the IP address of the MFP 4 itself, and so forth, as the meta data, and then, delivers the same to the scanned data processing system 5 (Step S707).

The scanned data processing system 5 then extracts the meta data from the received data (scanned image file, the file name, the attached file or such), and starts up (initializes) the UI generation plug-in 508 and the business process associating plug-in 509 (Step S708). The UI generation plug-in 508 dynamically generates the UI (Step S709), displays the same on the Web browser 403 of the MFP 4 via the business system 3 (Step S710), and the user carries out corresponding business processing (allowance/rejection, or such) based on the thus-generated-and-displayed UI (Step S711). Then, a result of the business processing is transmitted to the scanned data processing system 5 from the MFP 4 as the form data (Step S712). FIG. 68 shows an example of the transmission message.

Figure 69:
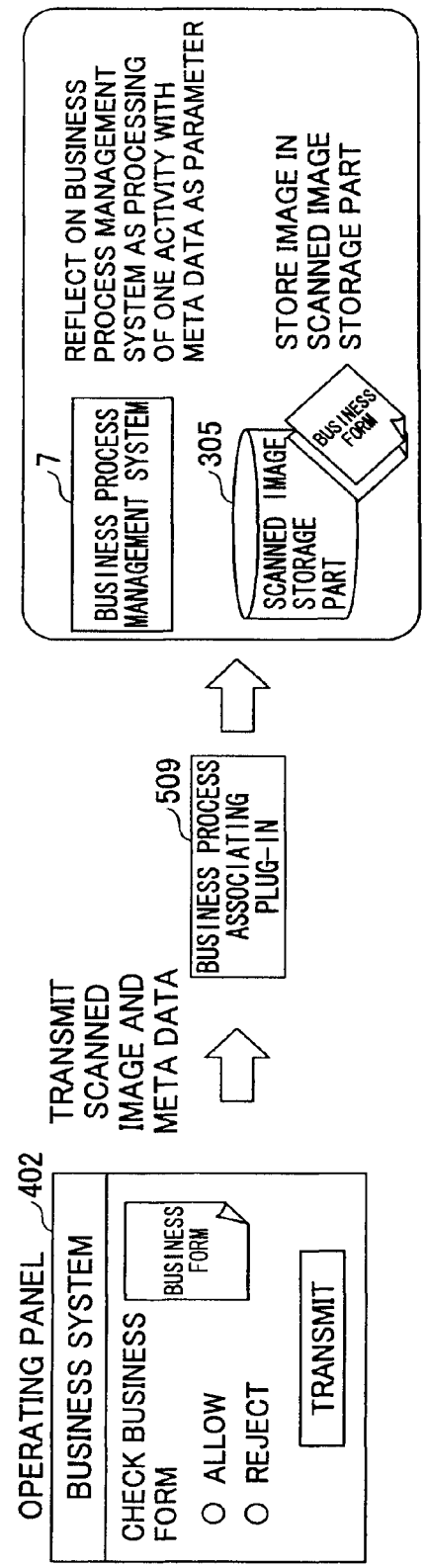
FIG. 69 shows an example of processing of the business process associating scan solution system.

Return to FIG. 65, the business process associating plug-in 509 reflects the business processing contents on the business process, in the business process management system 7 (Step S713), and stores the scanned image of the business form in the scanned image storage part 305 (Step S714). FIG. 69 shows an example of processing of the business process associating plug-in 509.

It is noted that, the business form data, the business form and the business form template in each of the first through third embodiments of the present invention described above correspond to respective examples of document data, a paper document and a document template of the present invention, respectively, for example.

The present invention is not limited to the above-described embodiments, and variations and modifications may be made without departing from the basic concept of the present invention claimed below.

What is claimed is:

1. A system comprising:
   a document template storing part configured to store a document template corresponding to first meta data;
   a scanning part configured to scan a paper document including an image of document data including the first meta data and to obtain a scanned image;
   an extracting part configured to extract the first meta data from the obtained scanned image;

a document template obtaining part configured to obtain from the document template storing part the document template corresponding to the first meta data that has been extracted by the extracting part; and an image correction part configured to refer to the obtained document template and correct the scanned image, wherein the document template storing part is different from the scanned image.

2. The system as claimed in claim 1, further comprising:
a designing part to design the document template.

3. The system as claimed in claim 1, wherein said document template comprises:
layout information indicating a position of an item;
data set information connecting to a data source and generating a data value dynamically; and
embedding information supporting multiple embedding formats, and describing meta data to embed.

4. The system as claimed in claim 3, wherein said embedding information comprises:
a description indicating an encode type;
a description indicating a place to embed at;
a description indicating a type of data to embed; and
a description indicating the data to embed.

5. The system as claimed in claim 4, wherein:
the data to embed comprises a description indicating a template ID specifying the document template.

6. The system as claimed in claim 4, wherein:
the data to embed comprises UI data generating a UI for a user to carry out processing according to a business flow at a time of scanning the paper document.

7. The system as claimed in claim 1, wherein:
the image correction part is to perform automatic correction comprising any one of a position adjustment, a distortion correction and a vertically inverting correction based on an edge part of the paper document or a characteristic image part thereof, and also to allow a user to manually carry out a correction comprising any one of moving, magnifying, reducing, rotating and making a distortion correction in the image.

8. A system comprising:
a memory to store a document template corresponding to first meta data;
a scanner to scan a paper document including an image of document data including the first meta data and to obtain a scanned image;
a processor configured to extract the first meta data from the obtained scanned image;
a processor configured to obtain from the memory the document template corresponding to the first meta data that has been extracted; and
a processor to refer to the obtained document template and correct the scanned image.

9. The system as claimed in claim 8, further comprising:
a processor configured to design the document template.

10. The system as claimed in claim 8, wherein said document template comprises:
layout information indicating a position of an item;
data set information connecting to a data source and generating a data value dynamically; and
embedding information supporting multiple embedding formats, and describing meta data to embed.

11. The system as claimed in claim 10, wherein said embedding information comprises:
a description indicating an encode type;
a description indicating a place to embed at;
a description indicating a type of data to embed; and
a description indicating the data to embed.

12. The system as claimed in claim 11, wherein:
the data to embed comprises a description indicating a template ID specifying the document template.

13. The system as claimed in claim 11, wherein:
the data to embed comprises UI data generating a UI for a user to carry out processing according to a business flow at a time of scanning the paper document.

14. The system as claimed in claim 8, wherein:
the processor to refer to the obtained document template and correct the scanned image is to perform an automatic correction comprising any one of a position adjustment, a distortion correction and a vertically inverting correction based on an edge part of the paper document or a characteristic image part thereof, and also to allow a user to manually carry out au correction comprising any one of moving, magnifying, reducing, rotating and making a distortion correction in the image.

* * * * *